United States Patent
Ichino et al.

(10) Patent No.: US 6,175,694 B1
(45) Date of Patent: Jan. 16, 2001

(54) CAMERA FEATURING A SINGLE DRIVE SOURCE AND A PLURALITY OF SELECTABLE DRIVE TRANSMISSION MECHANISMS

(75) Inventors: Kazushige Ichino, Tokyo; Ryoichi Suzuki; Takayuki Tsuboi, both of Yokohama; Yoshiaki Hamada, Kawasaki; Yuji Fujihara, Kawasaki; Yoshiyuki Kaneko, Kawasaki, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/334,604

(22) Filed: Jun. 17, 1999

Related U.S. Application Data

(62) Division of application No. 09/014,096, filed on Jan. 27, 1998, which is a division of application No. 08/731,920, filed on Oct. 22, 1996, now Pat. No. 5,752,096, which is a continuation of application No. 08/580,276, filed on Dec. 27, 1995, now abandoned, which is a continuation of application No. 08/323,710, filed on Oct. 18, 1994, now abandoned, which is a continuation of application No. 07/834,167, filed on Feb. 11, 1992, now abandoned.

(30) Foreign Application Priority Data

| Feb. 14, 1991 | (JP) | 3-040864 |
| Feb. 14, 1991 | (JP) | 3-040865 |
| Feb. 14, 1991 | (JP) | 3-040866 |
| Feb. 14, 1991 | (JP) | 3-040867 |
| Feb. 14, 1991 | (JP) | 3-040868 |
| Feb. 14, 1991 | (JP) | 3-040869 |
| Feb. 14, 1991 | (JP) | 3-040870 |
| Feb. 14, 1991 | (JP) | 3-040871 |
| Feb. 14, 1991 | (JP) | 3-040872 |
| Feb. 14, 1991 | (JP) | 3-040873 |
| Feb. 14, 1991 | (JP) | 3-040875 |

(51) Int. Cl.$^7$ .............. G03B 3/10; G03B 13/34
(52) U.S. Cl. ................... 396/132; 396/418
(58) Field of Search .................. 396/72, 79, 83, 396/85, 89, 132, 387, 406, 411, 418

(56) References Cited

U.S. PATENT DOCUMENTS 5,168,295   12/1992   Yoshihara et al. ............ 354/173.1

FOREIGN PATENT DOCUMENTS

| 55-103545 | 8/1980 | (JP) . |
| 60-97329 | 5/1985 | (JP) . |
| 61-73137 | 4/1986 | (JP) . |
| 61-172127 | 8/1986 | (JP) . |
| 61-292623 | 12/1986 | (JP) . |
| 63-13713 | 3/1988 | (JP) . |
| 1-196013 | 8/1989 | (JP) . |
| 1-287648 | 11/1989 | (JP) . |
| 3-125948 | 12/1991 | (JP) . |
| 3-280026 | 12/1991 | (JP) . |
| 4-247415 | 9/1992 | (JP) . |

*Primary Examiner*—David M. Gray
(74) *Attorney, Agent, or Firm*—Fitzpatrick, Cella, Harper & Scinto

(57) ABSTRACT

A camera includes a plurality of camera operation mechanisms, a sun gear which rotates by means of a motor, a planetary gear which revolves around the sun gear, and a plurality of output gears each capable of meshing with the planetary gear by means of revolution of the planetary gear. The plurality of output gears transmit power to the plurality of camera operation mechanisms, respectively. A holding member is switchable from a first state, in which the planetary gear is allowed to revolve freely, to a second state, in which the planetary gear is held at a revolution position where the planetary gear is in mesh with one of the plurality of output gears. A controller causes the planetary gear to revolve so as to mesh with a selected one of the plurality of output gears, and switches the holding member from the first state to the second state, after completion of a power transmitting operation.

35 Claims, 41 Drawing Sheets

FIG.9(a)
FIG.9(b)
FIG.9(c)
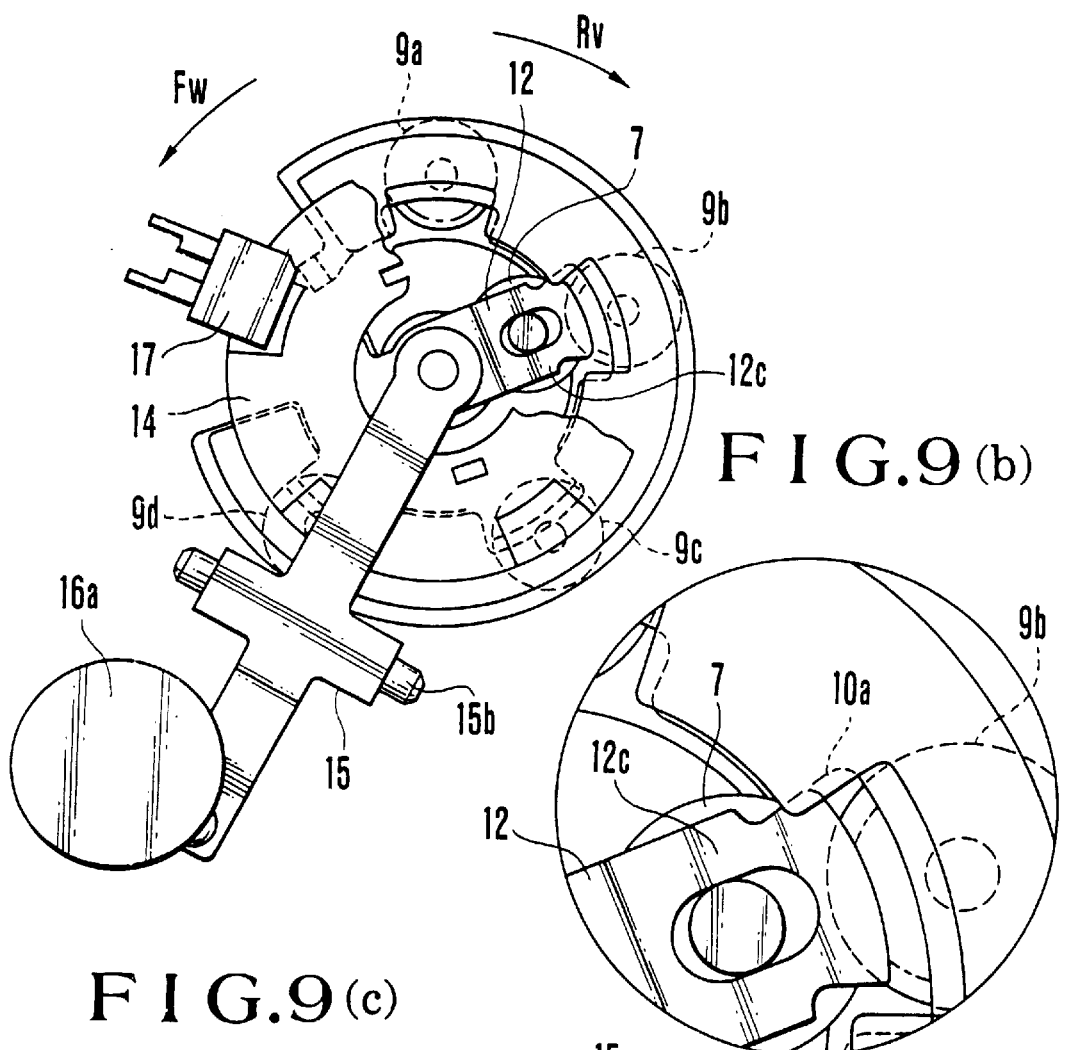
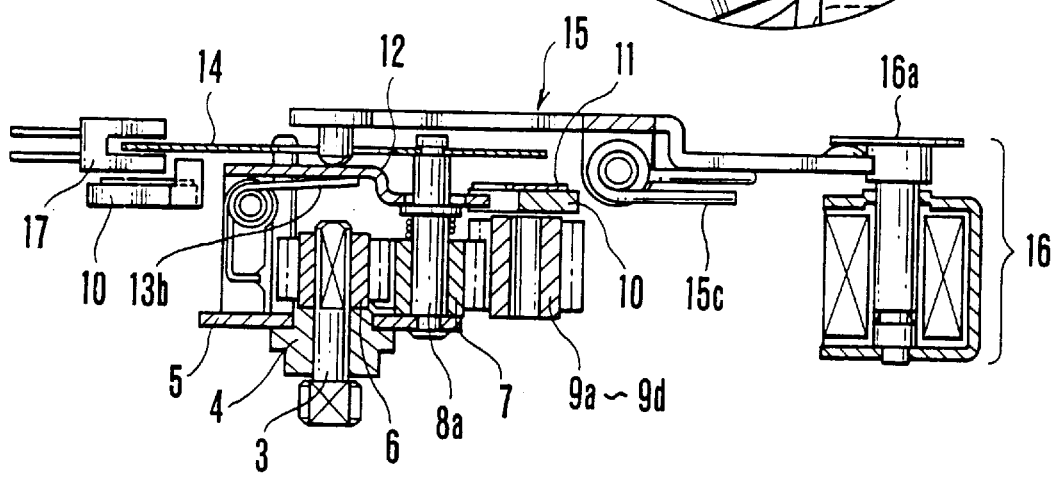

FIG.31

| DRIVING OPERATION | DIVIDING POSITION | MOTOR DIRECTION |
|---|---|---|
| FILM REWINDING | 1 | FW |
| FILM WINDING | 1 | RV |
| TELEPHOTO ZOOMING | 3 | FW |
| WIDE-ANGLE ZOOMING | 3 | RV |
| BAYONET UNLOCKING | 5 | FW |
| BAYONET LOCKING | 5 | RV |
| FORWARD MOVEMENT OF LENS BARREL | 7 | FW |
| BACKWARD MOVEMENT OF LENS BARREL | 7 | RV |

$P_0$=POSITION WHERE PLANETARY GEAR 7 IS PRESENTLY LOCATED
$M_0$=DIRECTION OF PAST ROTATION OF MOTOR 1
$P_1$=POSITION TO WHICH PLANETARY GEAR 7 IS TO MOVE
$M_1$=DIRECTION OF MOTOR ROTATION OF LOAD AT POSITION TO WHICH PLANETARY GEAR 7 IS TO MOVE
$M_2$=DIRECTION IN WHICH ROTATING ARM 5 IS TO BE MOVED

CAMERA FEATURING A SINGLE DRIVE SOURCE AND A PLURALITY OF SELECTABLE DRIVE TRANSMISSION MECHANISMS

The present application is a divisional application of U.S. patent application Ser. No. 09/014,096 filed Jan. 27, 1998, which is a divisional application of U.S. patent application Ser. No. 08/731,920 filed Oct. 22, 1996, now U.S. Pat. No. 5,752,096 issued May 12, 1998, which is a continuation of U.S. patent application Ser. No. 08/580,276 filed Dec. 27, 1995 (abandoned), which is a continuation of U.S. patent application Ser. No. 08/323,710 filed Oct. 18, 1994 (abandoned), which is a continuation of U.S. patent application Ser. No. 07/834,167 filed Feb. 11, 1992 (abandoned).

BACKGROUND OF THE INVENTION

1. Field of the Invention

The present invention relates to an optical apparatus capable of selectively supplying power from a drive source to a plurality of power transmission mechanisms.

2. Description of the Related Art

A conventional general planetary gear mechanism includes, as shown in FIGS. 32(*a*) and 32(*b*), a sun gear 101 which rotates by means of a certain power, an arm 102 which rotates about a shaft 108 common to the sun gear 101 independently of the sun gear 101, and a planetary gear 103, which is secured to the arm 102 by a shaft 107 for rotation with respect to the arm 102 against the resistance of a spring 106 and in mesh with the sun gear 101.

In the shown mechanism, the planetary gear 103 can turn (revolve) about the sun gear 101, and can also turn (rotate) on its axis.

Such a planetary gear mechanism is generally used for a switching mechanism for selectively transmitting power for winding or rewinding of film in a camera or the like. In the planetary gear mechanism, as shown in FIG. 33, the extent of revolution of the planetary gear 103 is not an angle of 360 degrees, and is limited by two gears: a gear 104 for transmitting power to a winding system and a gear 105 for transmitting power to a rewinding system. In practice, however, since the gears may bite into each other, the extent of revolution of the planetary gear 103 is limited by bringing the shaft 107 of the planetary gear 103 into abutment with a portion 109 or 110. In this arrangement, if the sun gear 101 rotates toward the left as viewed in FIG. 33, the planetary gear 103 meshes with the gear 105 to cause the gear 105 to rotate in the direction indicated by a solid arrow. If the sun gear 101 rotates toward the right, the planetary gear 103 meshes with the gear 104 to cause the gear 104 to rotate in the direction indicated by a dashed arrow. A number of states brought about by the above-described operation are enumerated below:

1) Whether power is switched to the gear 104 or 105 is determined only by whether the sun gear 101 rotates toward the right or the left.

2) Each of the gear 104 and the gear 105 to which power is transmitted rotates in one direction only. That is to say, two lines are available for force transmission.

3) During power transmission or if gear backlash occurs in the direction of power transmission, the abutment portion 109 is subjected to a force F-109 from the shaft 107. In the opposite case, the abutment portion 110 is subjected to a force F-110.

4) If the planetary gear 103 is switched from the gear 105 to the gear 104 while power is being transmitted to the gear 105 as shown in FIG. 33, the planetary gear 103 only rotation (left-handed rotation) immediately after the right-handed rotation of the sun gear 101 is started, until the backlash is removed and the force F-109 disappears. Subsequently, the planetary gear 103 starts revolution.

The reasons why only two lines are available for force transmission as described above in Paragraph 2) are:

a) Since the conventional planetary gear mechanism is arranged in such a manner that the extent of revolution of the planetary gear 103 is limited by the gear 104 and the gear 105 as shown in FIG. 33, it is impossible to mesh the planetary gear 103 with any gear other than the gear 104 and the gear 105.

b) The direction of rotation of either one of the gears 104 and 105 is the direction of power transmission, while the direction of rotation of the other is the direction in which the planetary gear 103 is switched. As a result, either one of the gears 104 and 105 can transmit a force in one direction only.

For the above reasons, the number of transmission lines of force is two.

To realize the number of transmission lines of force which is greater than two, a planetary gear mechanism such as that shown in FIG. 34 may also be considered. In the shown mechanism, a plurality of (four, in this example) gears 111*a* to 111*d* are disposed circumferentially, and the positional relation between each of the gears 111*a* to 111*d*, the sun gear 101 and the planetary gear 103 is selected so that they can be arranged in a straight line to prevent each of the gears 111*a* to 111*d* from hindering the planetary gear 103. Stoppers 112*a* to 112*d* each of which prevents the left-handed revolution of the planetary gear 103 are disposed in the vicinity of the respective gears 111*a* to 111*d* for movement toward and away from the planetary gear 103. In this arrangement, by causing the sun gear 101 to rotate toward the right, a gear with which the planetary gear 103 is to be meshed is selected from among the gears 111*a* to 111*d*, and by causing the sun gear 103 to rotate toward the left, the shaft 107 is brought into abutment with the associated one of the stoppers 112*a* to 112*d* so that force is transmitted to the selected one of the gears 111*a* to 111*d*. However, this arrangement merely solves the problem stated in paragraph a), and the problem of paragraph b) remains. The direction in which force can be transmitted to each of the gears 111*a* to 111*d* is limited to one direction only as shown in FIG. 34, and no force can be transmitted through rotation in the opposite direction.

However, the arrangement of FIG. 34 which uses four gears 111*a* to 111*d* and four gear trains which can be coupled to the respective gears 111*a* to 111*d* has a problem: Since force can be transmitted in one direction only, it is difficult to use the arrangement as a mechanism which requires rotation in both right-handed and left-handed directions. If there is a planetary gear mechanism which can transmit force in both right-handed and left-handed direction by means of one gear train, it is possible to selectively transmit power from a single power source to a plurality of gear trains by causing a sun gear to rotate toward the right or the left.

FIG. 35 shows a model diagram of the basic concept of such a planetary gear mechanism.

In the arrangement shown in FIG. 35, the revolution of the planetary gear 103 is stopped by an arbitrary one of stoppers 113*a* to 113*d* and the adjacent one of stoppers 114*a* to 114*d*, whereby both the right-handed and left-handed revolutions of the planetary gear 103 are stopped and power can be transmitted to the desired one of the gears 111*a* to 111*d* in either direction of rotation thereof.

Consideration will be given below to a case where, in such an arrangement, an element to which power is to be transmitted is switched, for example, from the gear 111a which is presently in mesh with the planetary gear 103 to the gear 111b. It is assumed that the direction of rotation of the output gear 111b after switching is desired to be made left-handed (the direction of rotation of the sun gear 101 is also made left-handed).

In this case, the sun gear 101 is made to rotate toward the right to cause the planetary gear 103 to revolve toward the right and mesh with the gear 111b. However, since it is desired that the direction of rotation of the output gear 111b be made left-handed, it is necessary to cause the sun gear 101 to rotate in the opposite direction (toward the left) after the gears 103 and 111b have meshed with each other. This means that at the time when the gears 103 and 111b mesh with each other, a driving force is instantaneously transmitted to the gear 111b in the direction opposite to the desired direction. At this time, if the gear 111b is coupled to, for example, a power transmission mechanism for effecting zooming, the angle of view will shift in the direction opposite the desired direction and a photographer will have a sense of incompatibility.

To realize the above-described mechanism, the following problems must also be solved.

1) It is necessary to design a mechanism in which while the planetary gear 113 is revolving to mesh with any one of the gears 111a to 111d, the stoppers 113a to 113d and 114a to 114d are made to move backward so as not to limit the revolution of the planetary gear 113.

2) If power transmission is performed or backlash occurs with the planetary gear 103 meshed with any one of the gears 111a to 111d, a force F-115 or F-116 will be generated and applied to the adjacent one of the stoppers 113a to 113d or 114a to 114d. Each of the forces F-115 and F-116 must be controlled so as not to influence the revolution of the planetary gear 103.

The state shown in FIG. 35 will be considered below. In FIG. 35, the gear 111a is being made to rotate toward the left, or the sun gear 101 is stopped with the gear 111a driven to rotate toward the left. During this time, the stopper 113a stops the shaft 107 from rotating around the sun gear 101 toward the left. To switch the line of power transmission, if the stopper 113a in that state is released by means of the mechanism mentioned above in paragraph 1), the planetary gear 103 will revolve independently toward the left by the force indicated by the arrow F-115. As a result, the control of the planetary gear 103 is hindered. For this reason, it is necessary to design a mechanism capable of controlling the revolving force of the planetary gear 103 without error.

FIG. 35 also shows the state wherein the driving force of the sun gear 101 which is rotating toward the left is being transmitted to the gear 111a. In this state, since none of the other gears 111b to 111d is meshed with the planetary gear 103, there is not a member which limits their rotation. In a case where an element to which power is to be transited from an arbitrary one of the gears 111b to 111d, for example, the gear 111c, is a mechanism which may be subjected to an external force by accident, for example, a zoom barrel mechanism in a camera, if a certain external force is applied to the zoom barrel mechanism from the outside of the camera, the zoom barrel mechanism will move independently. Of course, if the mechanism to which power is to be transmitted from the gear 111a is easily subjected to an external force by accident, when the planetary gear 103 revolves to another position after the completion of power transmission, a similar problem will arise.

In the arrangement shown in FIG. 35, the revolution of the planetary gear 103 is stopped by bringing any one of the stoppers 113a to 113d and 114a to 114d into abutment with the shaft 107, and the planetary gear 103 meshes with an arbitrary one of the gears 111a to 111d. The revolving force of the planetary gear 103, which is generated in the right-handed or left-handed direction during power transmission is cancelled by limiting the revolution of the shaft 107 in the same direction by means of the associated one of the stoppers 113a to 113d and 114a to 114d. In such an arrangement, if it is desired that the planetary gear 103 be made to mesh with another gear among the gears 111a to 111d by causing the planetary gear 103 to revolve toward the right or the left, it is necessary to cause the stoppers 113a to 113d and 114a to 114d to move backward so as not to limit the revolution of the shaft 107. In other words, a mechanism is needed in which none of the stoppers 113a to 113d and 114a to 114d interfere with the shaft 107 rotating around the sun gear 101. To realize such a mechanism, it is necessary to adopt one of the following arrangements:

A) An arrangement in which the stoppers 113a to 113d and 114a to 114d can move backward from the shaft 107.

B) An arrangement in which the shaft 107 can move backward from the stoppers 113a to 113d and 114a to 114d.

However, the arrangement of paragraph A) has the following disadvantages. Four pairs of stoppers must be operated, and if they are to be operated separately, a complicated construction is needed. If the four pairs are to be operated simultaneously, the size of the entire mechanism must be made large, with the result that the mass increases and the response of control deteriorates.

The arrangement of paragraph B) has also a number of problems. Since the shaft 107 rotates with the revolution of the planetary gear 103, the position of the shaft 107 during rotation must be detected. To operate a member which changes its position while rotating every moment, a complicated construction will be needed.

In the arrangement shown in FIG. 35, the revolution of the planetary gear 103 is stopped in such a way that the stoppers 113a to 113d and 114a to 114d which are arranged for movement toward and away from the shaft 107 are selectively brought into abutment with the shaft 107. However, if the stoppers 113a to 113d and 114a to 114d move backward and stops limiting the shaft 107, the revolution of the planetary gear 103 is not limited at all and the planetary gear 103 revolves unlimitedly as long as the sun gear 101 continues rotating. In such an arrangement, if it is desired to cause the planetary gear 103 to mesh with an arbitrary one of the gears 111a to 111d so that power transmission is performed with the revolution limited, it is necessary to use a device for detecting in which position the planetary gear 103 is revolving or which of the gears 111a to 111d is in mesh with the planetary gear 103. In this case, it is desirable to use a device capable of detecting the position of the planetary gear 103 during revolution as an absolute position. However, the number of such detecting devices must be increased according to the number of gears for power (in FIG. 35, four for the gears 111a to 111d), with the result that the complexity of the apparatus will increase.

For the above-described reasons, it is common practice to adopt a method of preparing a pulse disc (not shown) secured to an arm 102 or the shaft 107 and provided with a pattern of bright and dark segments provided and detecting the amount of rotation of the pulse disc by means of a photocoupler or the like, thereby solving the above-described disadvantages. More specifically, an arrangement adopting such a method makes it possible to reduce the number of parts used and also to use a simple detection method which merely detects "bright" and "dark" signals. The bright and dark segments may be formed so that the state where the planetary gear 103 is in mesh with any one of the gears 111a to 111d can be distinguished from the state where the planetary gear 103 is in mesh with none of the gears 111a to 111d.

In the above-described method of finding a position from the "bright" and "dark" signals, since a relative position is only detected, it is necessary to determine the first position (initial position) in advance, and this initial position serves also as a revolution abutment position beyond which the planetary gear 103 does not revolve.

Referring to the arrangement shown in FIG. 33, the revolution abutment position corresponds to the position where the planetary gear 103 is meshed with the gear 104 or 105. If the operation of bringing the planetary gear 103 into abutment with the gear 104 or 105 to find the initial position, the gear 104 or 105 may be rotated by accident at the revolution abutment position (initial position). It is necessary, therefore, to prevent such accidental rotation. Similarly, in the arrangement shown in FIG. 35, while the planetary gear 103 is making rotation with its revolution limited at the revolution abutment position, it is necessary to prevent the rotation from being transmitted to any of the gears 111a to 111d.

In the arrangement shown in FIG. 35, to detect the position of the planetary gear 103 during revolution, a method may be employed in which a pulse disc (not shown) provided with a pattern consisting of bright and dark segments is secured to the arm 102 or the shaft 107 and the amount of rotation of the pulse disc is detected by means of a photocoupler or the like. In this method, the number of parts can be reduced, and it is only necessary to detect "bright" and "dark" signals. The "bright" and "dark" segments of the pattern may be provided so that the state of the planetary gear 103 being meshed with any one of the gears 111a to 111d can be distinguished from the state of the planetary gear 103 being meshed with none of them. In the arrangement of FIG. 35, since the planetary gear 103 can selectively mesh with four gears, if the "bright" segments are made to correspond to the state of the planetary gear 103 being in mesh, four "bright" segments may be provided on the pulse disc. In a method of finding a position while detecting a relative transition such as a transition between brightness and darkness, it is necessary to determine the first position (initial position) as shown in FIG. 36. The sun gear 101 is made to rotate unconditionally during a predetermined time period in one direction to cause the planetary gear 103 to revolve, thereby bringing the shaft 107 into abutment with a revolution abutment member 117. The position at which the shaft 107 comes into abutment with the revolution abutment member 117 is determined as the initial position. (The revolution abutment member 117 may be provided not in the shown position but in any position, and any of the stoppers 113a to 113d and 114a to 114d can also be easily used as the revolution abutment member 117.) After the initial position has been determined, the amount of revolution of the planetary gear 103 is detected on the basis of the relative transition of a pulse signal and the planetary gear 103 is made to mesh with an arbitrary one of the gears 111a to 111d, and the rotation of the sun gear 101 is selectively transmitted to the meshed one of the gears 111a to 111d. In the above-described mechanism in which the revolution of the planetary gear 103 is controlled not sequentially in time but selectively while the position of the planetary gear 103 during revolution is being detected on the basis of the relative transition obtained from a pulse transition, the initial position is essential to the control of the revolution of the planetary gear 103. Accordingly, if, in each power transmission operation, power can be transmitted by bringing the planetary gear 103 into mesh with an arbitrary one of the gears 111a to 111d after the confirmation of the initial position, power transmission with improved reliability will be able to be realized.

However, if such "initial positioning" is performed each time an element to which power is to be transmitted is changed, since the "initial positioning" operation itself is not an actual operation for power transmission but a switching operation, a switching operation of extremely long time will be needed and no desired control will be not be able to be achieved; for example, the response speed of a photographic operation is impaired.

In general and in a camera provided with a power dividing device employing a planetary gear mechanism, after the completion of photography, a planetary gear is made to mesh with an output gear coupled to a film transportation mechanism and film is wound by an exposed frame. Subsequently, in general and, for example, in a camera provided with a zooming mechanism (or a focal-length varying mechanism which is switchable between two different focal lengths), the planetary gear is brought into mesh with the output gear coupled to the zooming mechanism in preparation for the next photographic cycle. However, in the case of a camera capable of continuous-shooting photography, if the above-described operation is performed, the response speed of a photographic operation is impaired.

It has conventionally been proposed to provide several kinds of systems capable of detecting an abnormality of a camera and inhibiting the operation of the camera or performing the same operation again.

In one typical example of such a system, if a position detecting means detects that shutter blades do not open, the subsequent shutter release operation is inhibited. In another example, if it is detected that a signal indicative of the feed of a perforation has not come during the automatic loading of a film, an error indication of the occurrence of an automatic-loading error is displayed.

In either example, the above-described operation is merely subjected to inhibition because the operation is a relatively simple operation and because when an error occurs in such an operation, even if the same operation is performed again, the probability that a similar error will occur again is extremely high.

Cameras provided with an increasingly large number of functions have recently been developed, and a complicated mechanism such as a zooming mechanism or a retracting mechanism may be incorporated or a mechanism for dividing power from a single driving source among various output elements may also be adopted for the purpose of making a camera body more compact. As a result, the sequence of operations has become more complex and attention has been drawn to the following two serious problems:

1) The length of the sequence increases, and hence the time period for the sequence to proceed from beginning to end becomes long. As a result, the influence of the outside world on a camera becomes serious and, for example, during the operation of the camera, an unduly large force may be applied to a zooming mechanism or the like by the application of an external force, or the probability that noise may be introduced into a control part becomes high.

2) With an increase in the complexity of each device, an operation error of a device which seldom takes place and hence may be ignored in a single-function apparatus becomes more and more serious. A typical example of the operation error is an operation error due to the biting of the teeth tips of a planetary gear and an output gear into each other.

In a conventional camera provided with an autofocus (AF) device, when a shutter button is pressed to its first stroke position, a distance measurement operation is performed. Then, when the shutter button is pressed to its second stroke position, a photographic lens is driven to move from its initial position to a desired position on the basis of the distance measurement information obtained from the distance measurement operation. Subsequently, the shutter is made to open and close, and further after the completion of the resetting operation of causing the photographic lens to return to the initial position, a film winding operation is performed.

In recent years, high-magnification zoom lenses have been incorporated into compact AF cameras of the type described above. Accordingly, to achieve a predetermined photographic resolution in such an AF camera, for example, if a stepping motor is used to drive the photographic lens, it is necessary to increase the number of driving steps in which the photographic lens is driven during AF driving, compared to a single-focus camera.

For this reason, there is a tendency for a longer time to be taken to set the photographic lens before a shutter opening and closing operation. This tendency naturally leads to the problem of a shutter time lag. In addition, since the driving sound of the stepping motor or the shutter is not too large in itself, there is no substantial driving sound due to a shutter release operation when the shutter button reaches the second stroke position. After the completion of the shutter opening and closing operation, the photographic lens is reset to the initial position, and when a film winding operation is started, the driving sound is generated for the first time.

Accordingly, in a considerably noisy circumstance, a photographer cannot hear a shutter release sound and often becomes uneasy about the state of the shutter release operation and the like. In other words, even though exposure is completed at the timing of the shutter opening and closing operation, the photographer hears the sound of a film winding operation and can feel that photography is completed. As a result, the photographer is afraid that the shutter release operation might have ended or the camera might have failed, and feels anxious during the period from the time he operates a shutter release button until he hears the sound of a film winding operation.

FIG. 35 shows the state wherein the driving force of the sun gear 101 which is rotating toward the left is being transmitted to the gear 111a. In this state, since none of the other gears 111b to 111d is meshed with the planetary gear 103, there is not a member which limits their rotation. In a case where an element to which power is to be transmitted from an arbitrary one of the gears 111b to 111d, for example, the gear 111c, is a mechanism which may be subjected to an external force by accident, for example, a focal-length varying mechanism in a camera, if a certain external force is applied to this mechanism from the outside of the camera, the mechanism will move independently. Of course, if the mechanism to which power is to be transmitted from the gear 111a is easily subjected to an external force by accident, when the planetary gear 103 revolves to another position after the completion of power transmission, a similar problem will arise.

To solve the above-described problem, after the completion of transmission, the planetary gear 103 may be made to selectively mesh with a gear which is coupled to a mechanism which is easily subjected to an external force by accident, and this meshed state may be held. However, the method of causing the planetary gear 103 to selectively mesh with the gear has the following problems:

In the arrangement shown in FIG. 35, the stoppers 113a to 113d and 114a to 114d serve to lock the revolution of the planetary gear 103, as described previously, and is arranged for movement toward and away from the planetary gear 103 and the shaft 107. It is assumed here that in a case where the planetary gear 103 is allowed to revolve with the stoppers 113a to 113d and 114a to 114d moved backward, the planetary gear 103 is made to mesh with the gear 111a to prevent idling of the mechanism coupled to the gear 111a, as shown in FIG. 36.

In this case, a device (not shown) detects that the planetary gear 103 has revolved up to and meshed with the gear 111a, and the stoppers 113a and 114a are made to move forward as shown, thereby locking the revolution of the planetary gear 103. At the moment the revolution of the planetary gear 103 is locked, it starts rotating. If the rotation of the sun gear 101 is stopped at the moment the revolution of 103 is locked, the rotation of the sun gear 101 causes the gear 111a to rotate. Accordingly, if the timing to stop the rotation of the sun gear 101 and the timing to perform locking of the revolution by the stoppers 113a and 114a are not accurately established, the mechanism coupled to the gear 111a will move if it is a "mechanism which is capable of functioning even during a state other than an abutment state".

A typical example of a mechanism utilizing only the abutment state is a mechanism utilizing a telephoto end or a wide-angle end, as in the case of the lens barrel of a bifocal camera. A typical example of the mechanism which is capable of functioning even during a state other than the abutment state is a mechanism capable of performing a zooming function even if the lens barrel is in the middle position other than the telephoto end and wide-angle end positions, as in a camera having a zooming mechanism.

If the planetary gear 103 is made to mesh with a gear coupled to the above-described zooming mechanism, at the moment the stoppers 113a and 114a for preventing idling engage with the shaft 107, the zooming mechanism may move accidentally. To prevent occurrence of such a problem, the rotation of the planetary gear 103 may be stopped before the locking of the revolution is started. This state is substantially identical to the state of the stoppers 113a and 114a being omitted, and it may be impossible to lock the zooming mechanism or to perform power transmission.

SUMMARY OF THE INVENTION

It is, therefore, an object of the present invention to provide an optical apparatus arranged to cause a planetary gear to selectively mesh with at least two output gears by causing the planetary gear to revolve by means of the rotation of a sun gear, the optical apparatus including a member which follows the revolution of the planetary gear and which is arranged for movement along a thrust axis in opposite directions, one of the aforesaid at least two output gears with which the planetary gear is meshed being capable of rotating selectively in forward and reverse directions by means of the forward or reverse rotation of the planetary gear due to the forward or reverse rotation of the sun gear, the planetary gear being meshed with the aforesaid output gear with the aforesaid member being held in a predetermined position by holding means.

Another object of the present invention is to provide an optical apparatus arranged to cause a planetary gear to mesh with a selected output gear and selectively transmit the power of the sun gear to the selected output gear. In the optical apparatus, it is determined whether the direction in which the planetary gear is made to revolve for selection of the output gear is the same as the direction in which the output gear rotates after the planetary gear has been held by holding means, and if both directions differ, the direction of rotation of the planetary gear is made coincident with the direction of rotation of the output gear and, then, the planetary gear and the output gear are made to mesh with each other.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 9(a), 9(b) and 9(c) are plan views and a vertical sectional view, respectively, showing the state in which the planetary gear is located in the region ⑤ in the first embodiment of the present invention;

FIG. 31 is a table showing the symbols used in the explanations of various kinds of operations of the control circuit 24 of FIG. 17, as well as the relationships between driving operations, dividing positions and motor directions;

DETAILED DESCRIPTION OF THE PREFERRED EMBODIMENTS

Preferred embodiments of the present invention will be described below with reference to the accompanying drawings.

Figure 16:
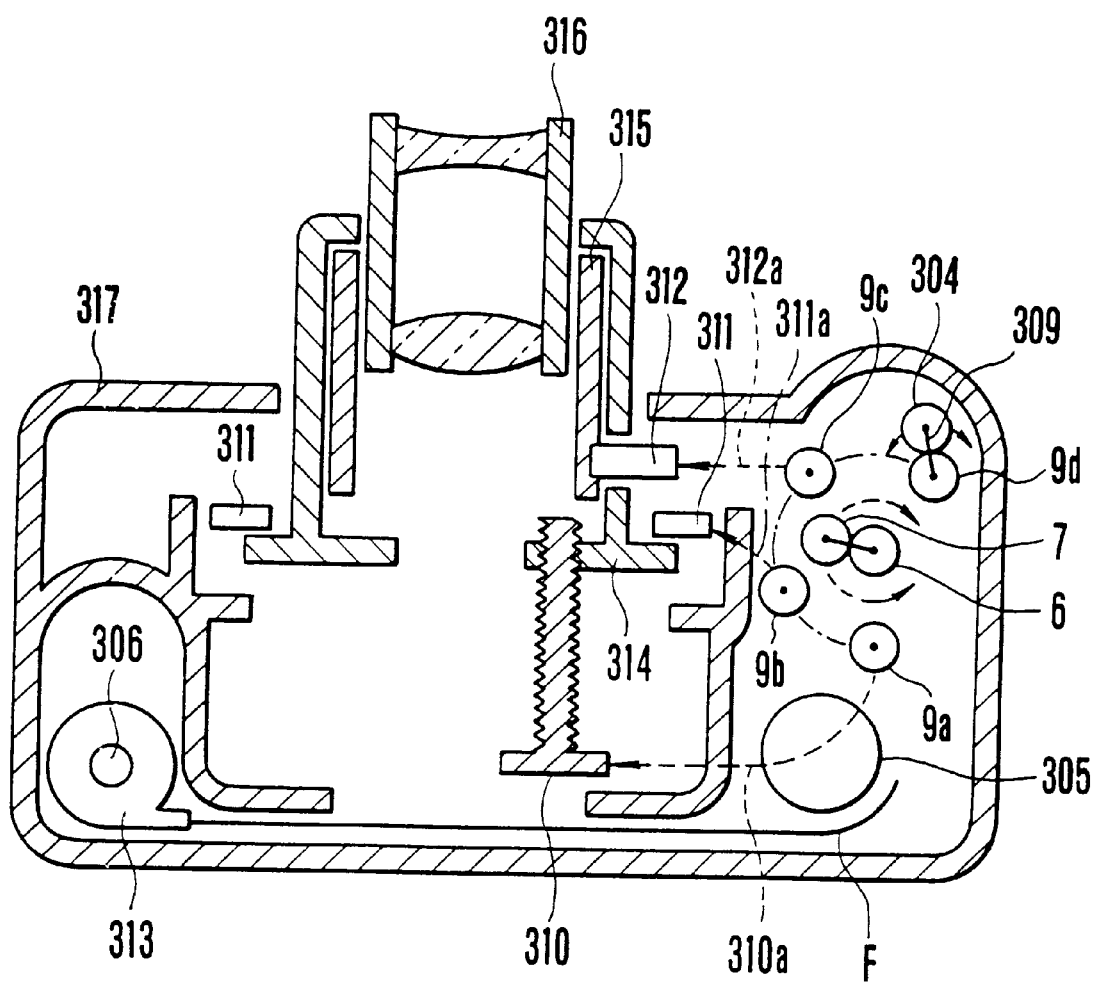
FIG. 16 is a schematic cross sectional view showing the mechanical construction of a camera in which the device according to the first embodiment of the present invention is incorporated.

FIG. 16 is a schematic cross-sectional view showing the mechanical essential parts of a camera provided with a power dividing device according to a first embodiment of the present invention.

The arrangement shown in FIG. 16 includes a sun gear 6, a planetary gear 7, and output gears 9a to 9d each of which constitutes a power source which will be described later. These elements 6, 7 and 9a to 9d constitute part of the power dividing device.

The output gear 9a causes a gear train 310a (not shown in detail in FIG. 16) to rotate a helicoid gear 310 operative to effect forward movement or backward movement of a lens barrel 314 which holds lens driving mechanisms such as a lens tube 316 and a cam ring 315.

The output gear 9b causes a gear train 311a (not shown in detail in FIG. 16) to rotate a bayonet ring 311 which serves to secure the lens barrel 314 placed in its forward position to a body 317 and inhibit the lens barrel 314 from moving toward its retracted position.

The output gear 9c causes a gear train 312a (not shown in detail in FIG. 16) to rotate a zoom driving gear 312 which causes the cam ring 315 in the lens barrel 314 to move, thereby effecting zooming.

The output gear 9d is meshed with a planetary gear 304 for film transportation via an arm 309. The elements 9d, 304 and 309 constitute a planetary gear mechanism for film transportation, and the output gear 9d itself serves as a sun gear. The left-handed or right-handed rotation of the output gear 9d causes a fork 306 or a spool 305 to rotate selectively, thereby effecting winding of a film F from a film cartridge 313 or rewinding of the film F into the film cartridge 313.

The construction of the power dividing device including the sun gear 6, the planetary gear 7 and the output gears 9a to 9d will be described below with reference to FIGS. 1 to 3 and other associated figures. Throughout these figures, only the parts (gears, springs, etc.) required for power division are shown, but for simplification of illustration, the other parts such as a base plate for mounting or positioning them are not shown.

Figure 1:
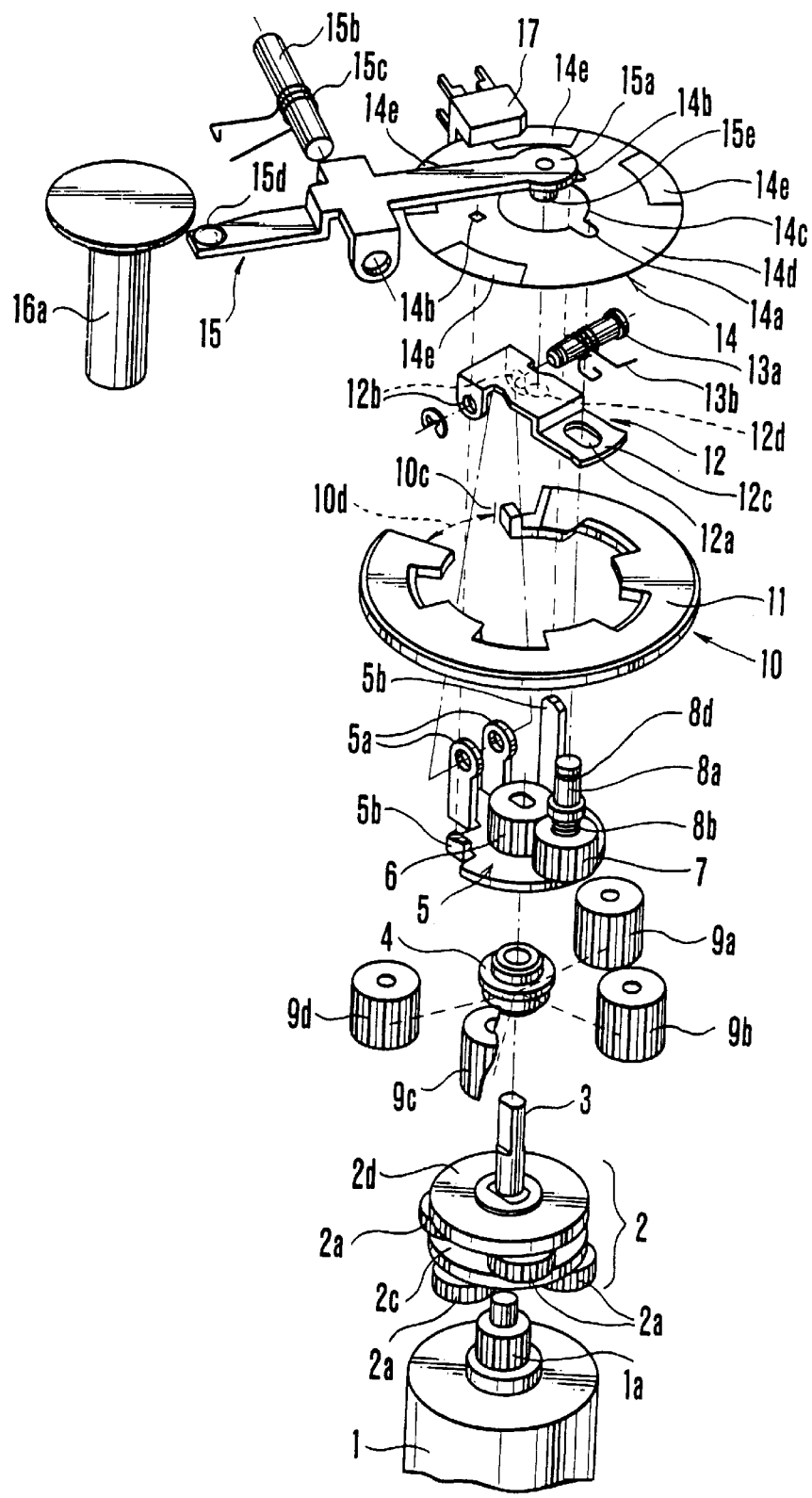
FIG. 1 is a diagrammatic exploded perspective view of the power dividing device of a camera, showing a first embodiment of the present invention.
Figure 3:
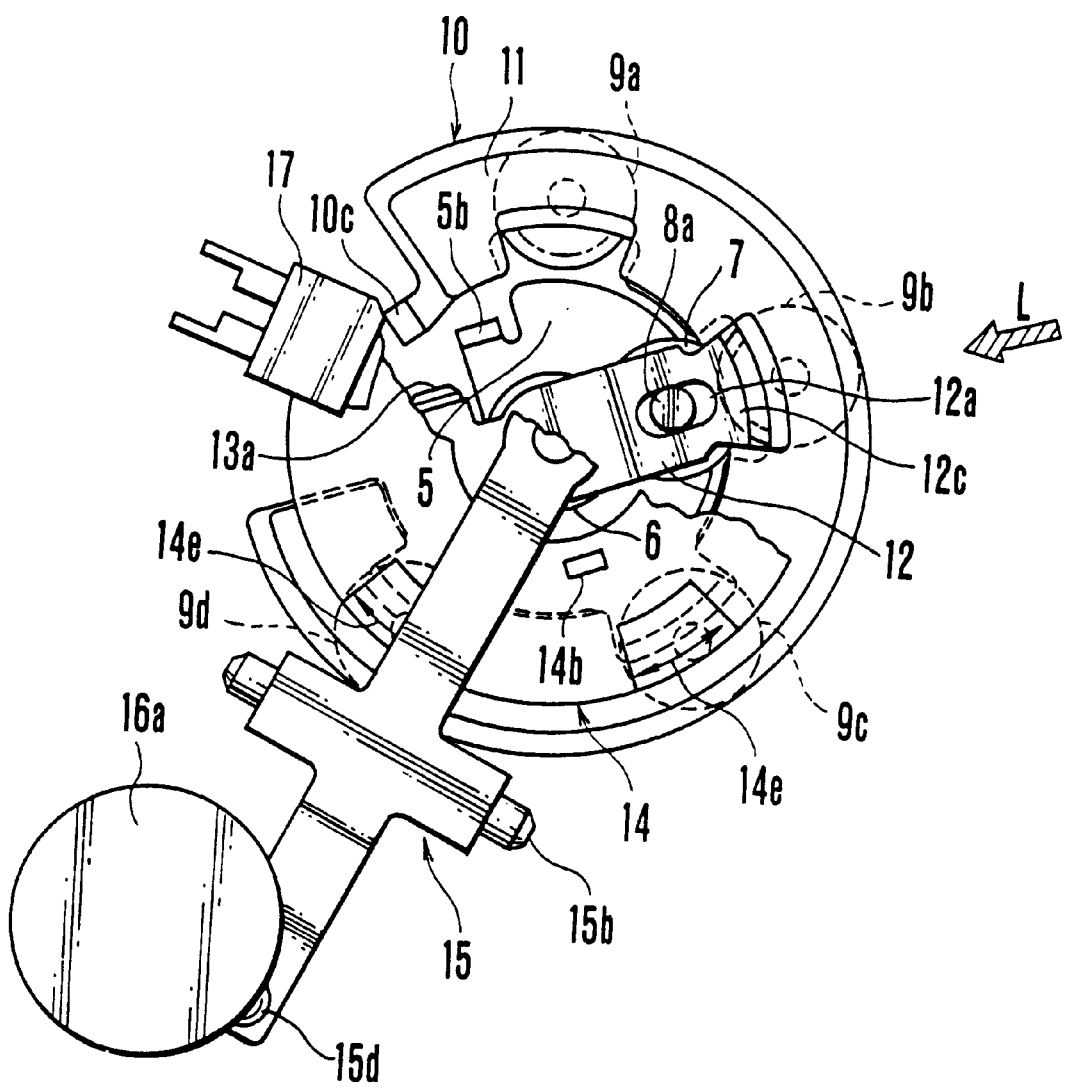
FIG. 3 is a diagrammatic plan view of the power dividing device of a camera, showing the first embodiment of the present invention.

As shown in FIGS. 1 and 3, the output gears 9a to 9d to which power is selectively transmitted from the planetary gear 7 are circumferentially arranged so that the planetary gear 7 can revolve through 360 degrees. Although four output gears are used in the shown embodiment, the number of output gears is not limited to four, and two or more output gears may be employed.

The planetary gear 7 is arranged to rotate about a planetary shaft 8a, and the rotation of the planetary gear 7 on its axis undergoes a certain degree of resistance due to a spring 8b fitted onto the planetary shaft 8a. The planetary shaft 8a and the planetary gear 7 are secured to a rotating arm 5, and the sun gear 6 is disposed on the rotating arm 5. The sun gear 6 is arranged to rotate by the rotation of an output shaft 3.

The output shaft 3 is made to rotate by the power of a motor 1. Since the output shaft 3 needs to have a certain degree of rotational torque, the power of the motor 1, which, in the first embodiment, is of a known type for use in a camera, is transmitted to the output shaft 3 through a speed reducing mechanism 2.

The rotating arm 5 and the output shaft 3 are rotatably secured to a bearing 4, and the rotating arm 5 and the output shaft 3 rotate in sliding contact with the external and internal peripheries of the bearing 4, respectively. The bearing 4 is formed, as by insert molding, integrally with a base plate (not shown) having shafts to which the output gears 9a to 9b are rotatably secured respectively. A force which causes the rotating arm 5 to rotate about the sun gear 6 is generated only by the revolving force of the planetary gear 7.

The rotating arm 5 has several erected portions, and each erected portion 5a has a hole. A rotation-stopping arm 12, which is disposed above the rotating arm 5 as viewed in FIG. 1, has holes 12b. The rotation-stopping arm 12 is secured rotatably with respect to the rotating arm 5 by a rotating-arm shaft 13a which is inserted through the holes, so that the rotation-stopping arm 12 is capable of swinging about the rotating-arm shaft 13a. Since the rotation-stopping arm 12 swings in an approximately horizontal state, an end portion 12c of the rotation-stopping arm 12c makes motion close to vertical motion (motion along a thrust axis). The rotation-stopping arm 12 has a hole 12a, and the above-described planetary shaft 8a is inserted through the hole 12a (the state shown in FIG. 2). In this state, since the hole 12a has a slot-like shape, the planetary shaft 8a does not restrict the vertical rotation of the rotation-stopping arm 12 (the vertical motion of the end portion 12c) and can rotate the rotation-stopping arm 12 horizontally in interlocked relation to the horizontal rotation of the rotating arm 5 integral with the planetary shaft 8a. A torsion spring 13b is fitted onto the rotating-arm shaft 13a and urges the end portion 12c of the rotation-stopping arm 12 in the upward direction.

A pulse disc 14 is disposed above the rotation-stopping arm 12. Erected portions 5b of the rotating arm 5 are respectively inserted through and fixed in holes 14b formed in the pulse disc 14, and a cutout 8d of the planetary shaft 8a is fixed in a slot 14a, whereby the pulse disc 14 rotates horizontally integrally with the horizontal rotation of the rotating arm 5.

An arm 15 is disposed above the pulse disc 14 and is rotatably secured by an arm shaft 15b which is fixed by a base plate (not shown). A torsion spring 15c which is similar to the torsion spring 13b is fitted onto the arm shaft 15b, and urges the arm 15 in the direction in which one end 15a applies a force downward as viewed in FIG. 1 or 2. A projection 15e is fixed to the end 15a and urges a central portion 12d of the rotation-stopping arm 12 in the downward direction through a large hole 14c formed in the pulse disc 14.

A movable yoke 16a of a plunger 16 is disposed at another end 15d of the arm 15. When the plunger 16 is energized to pull the movable yoke 16a downward as viewed in FIG. 1 or 2, the projection 15e moves upward as viewed in FIG. 1 or 2. The balance between the spring strength of the torsion spring 13b and that of the torsion spring 15c is selected so that the vertical motion of the rotation-stopping arm 12 can follow the motion of the projection 15e of the arm 15.

The reason why the projection 15e of the arm 15 presses the central portion of the rotation-stopping arm 12 during the downward urging thereof as viewed in FIG. 1 as well as several advantages obtainable from such an arrangement will be described below.

The center of the horizontal rotation of the rotation-stopping arm 12, which rotates in interlocked relation to the rotating arm 5 which rotates horizontally in interlocked relation to the revolution of the planetary gear 7, is positioned immediately above the output shaft 3, that is, the sun gear 6 (around the central portion 12d in FIG. 1). In whatever position the planetary gear 7 is revolving, the central portion (12d) of the rotation-stopping arm 12 coincides with the center of rotation. Accordingly, in whatever position the planetary gear 12 is located in interlocked relation to the sun gear 6, the planetary gear 7, the rotating arm 5 and the like (for example, any of the states shown in FIGS. 5(a) to 9(a)), the projection 15e of the arm 15 can press the central portion 12d under the same conditions and move the end portion 12c of the rotation-stopping arm 12 vertically. Accordingly, an operation for bringing the end 12c of the rotation-stopping arm 12 into engagement with any one of the cutouts of a crown stopper 10 to stop the revolution of the planetary gear 7 and transmit power to any one of the output gears 9a to 9d, is implemented by a simple mechanism in which the projection 15e of the arm 15 urges the central portion 12d of the rotation-stopping arm 12 irrespective of the state of rotation of the rotation-stopping arm 12.

The crown stopper 10 and a holding stopper 11 are secured to a base plate (not shown) on top of each other immediately above the output gears 9a to 9d, that is, between the rotating arm 5 and the rotation-stopping arm 12. Each of the stoppers 10 and 11 is provided with cutouts each having a shape through which the end portion 12c of the rotation-stopping arm 12 can pass.

Figure 4:
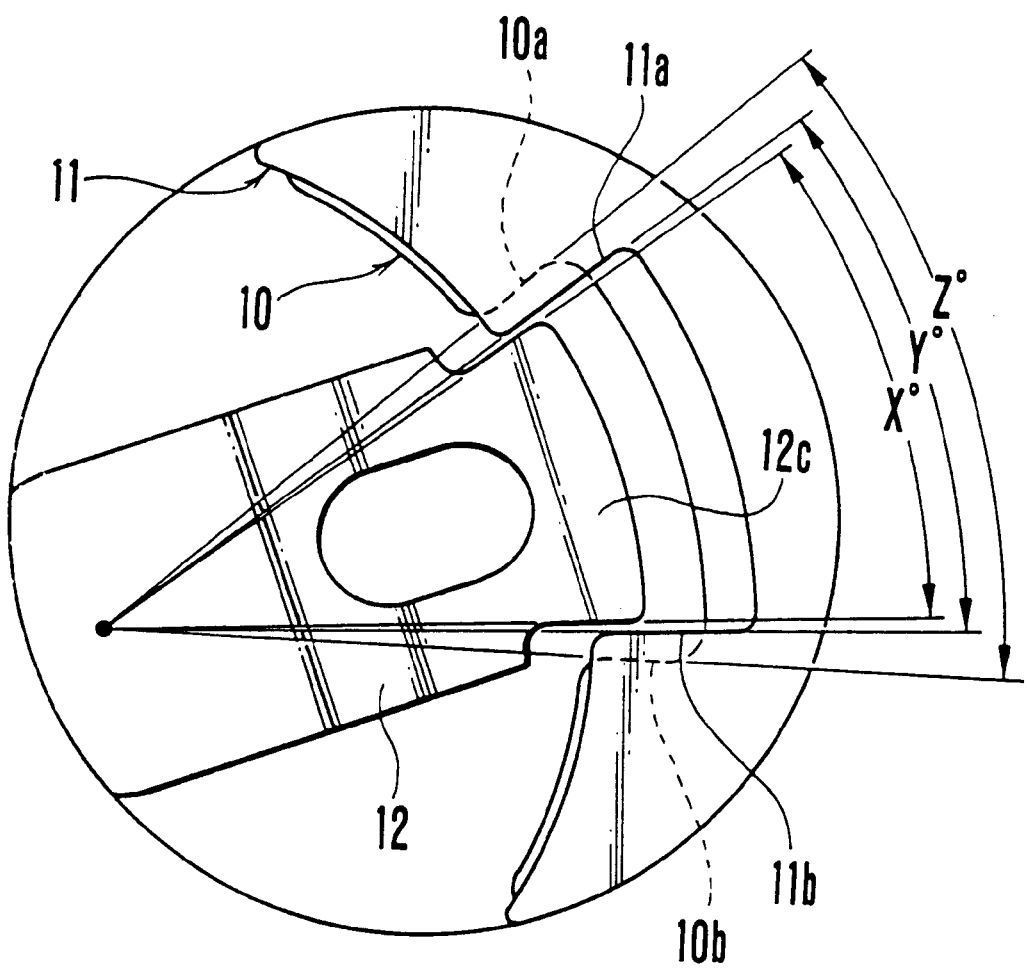
FIG. 4 is a fragmentary enlarged view illustrating the shapes of a crown stopper, a holding stopper and a rotation-stopping arm in the first embodiment of the present invention.

As shown in FIG. 4 (a partial enlarged view of FIG. 3), the Z° angle of the cutout of the crown stopper 10 which is defined between end faces 10a and 10b, the Y° angle of the cutout of the holding stopper 11 which is defined between end faces 11a and 11b, and the X° angle of the end portion 12c of the rotation-stopping arm 12 are selected to meet the relationship:

$$Z > Y > X.$$

Thus, the cutout of the holding stopper 11 lies above the cutout of the crown stopper 10 in such a manner that an edge portion of the holding stopper 11 partially covers the cutout of the crown stopper 10, as shown in FIG. 4. These cutouts are positioned above the respective output gears 9a to 9d. The height at which each of the stoppers 10 and 11 is fixed (the vertical height in FIG. 2) is selected so that the following two states are possible:

1) When the end portion 12c of the rotation-stopping arm 12 moves upward in interlocked relation to the pulling operation of the plunger 16, the end portion 12c of the rotation-stopping arm 12 does not engage with any of the cutouts of the stoppers 10 and 11 (refer to FIGS. 6(a), 6(b) and 6(c) which will be referred to later); and 2) If the plunger 16 is not performing a pulling operation, the projection 15e of the arm 15 urges the rotation-stopping arm 12 downward to locate the end portion 12c of the rotation-stopping arm 12 at a height flush with the end faces 10a and 10b which define the cutout of the crown stopper 10 (refer to the state of FIG. 2).

In the case of the state 1) (the state shown in FIGS. 6(a), 6(b) and 6(c) which will be referred to later), the rotating arm 5, the parts secured thereto (the rotation-stopping arm 12, the planetary shaft 8a, the pulse disc 14, etc.) and the planetary gear 7 can rotate about the bearing 4 freely and integrally. The planetary gear 7 freely revolves with the rotation of the output shaft 3 and hence with the rotation of the sun gear 6. During this time, the planetary gear 7 revolves while selectively meshing with the circumferentially arranged output gears 9a to 9d.

In the case of the state 2), the horizontal rotation of the rotation-stopping arm 12 is limited by the end faces 10a and 10b of the crown stopper 10. The rotating arm 5 which is integral with the rotation-stopping arm 12 is inhibited from rotating, thereby stopping the revolution of the planetary gear 7. This state corresponds to the state shown in FIGS. 2, 3 and 9(a), 9(b), 9(c).

The planetary gear 7 whose revolution has been limited in the above-described manner is allowed to rotate on its axis at that position, that is, at a position corresponding to any one of the cutouts of the stoppers 10 and 11. During this time, the planetary gear 7 is in mesh with any one of the output gears 9a to 9d and constitutes a gear train, whereby the planetary gear 7 can transmit the rotation of the sun gear 6 to the output gear in mesh. Whether the direction of rotation of the sun gear 6 is right-handed or left-handed, the planetary gear 7 can transmit the rotation to the output gear in mesh.

The crown stopper 10 has an erected portion 10c. The erected portion 10c inhibits the planetary gear 7 from freely rotating through an angle not less than 360°, and allows the planetary gear 7 to make only one left-handed or right-handed revolution. Specifically, the end portion 12c of the rotation-stopping arm 12 is positioned above the crown stopper 10 and the holding stopper 11 by the pulling operation of the plunger 16 (the state of FIGS. 6(a), 6(b) and 6(c) which will be referred to), and the planetary gear 7 is placed in a freely revolvable state. However, since the erected portion 10c serves as a stopper for the end portion 12c of the rotation-stopping arm 12, the free revolution of the planetary gear 7 is inhibited. The state of the free revolution being inhibited is shown in FIGS. 5(a), 5(b), 5(c) and 7(a), 7(b), 7(c). At this position, since the erected portion 10c works as a stopper and the planetary gear 7 initiates rotation on its axis, the erected portion 10c is provided at a location where the planetary gear 7 does not mesh with any of the output gears 9a to 9d.

As the planetary gear 7 revolves, the rotating arm 5 and the planetary shaft 8a rotate about the sun gear 6. The pulse disc 14 which rotates integrally with the rotating arm 5 and the planetary shaft 8a rotates in interlocked relation to the revolution of the planetary gear 7. The pulse disc 14 has a circumferentially alternate pattern of bright and dark segments, and a bright or dark signal (pulse) derived from a bright or dark segment is detected by a photocoupler 17 and a pulse signal detecting circuit 22 which will be described later (refer to FIG. 17). The pattern of the bright and dark segments has a configuration which makes it possible to detect from the output of the photocoupler 17 (and the pulse signal detecting circuit 22 which will be described later) the period in which the planetary gear 7 is in mesh with any one of the output gears 9a to 9d or the period in which the planetary gear 7 is in mesh with none of the output gears 9a to 9d.

In the first embodiment, each bright pattern segment 14e is formed so that a "bright" signal can be produced when the planetary gear 7 and any one of the output gears 9a to 9d are in mesh, and each dark pattern segment 14d is formed so that a "dark" signal can be produced when the planetary gear 7 is in mesh with none of the output gears 9a to 9d (refer to FIG. 1). In the first embodiment, since the output gears 9a to 9d are four in number, the bright pattern segments 14e are provided in four positions. In this construction, the position of the planetary gear 7 which is revolving can be identified from the output of the photocoupler 17 (and the output of the pulse signal detecting circuit 22 which will be described later).

The operation of the power dividing device having the above-described construction will be described below.

Figures 5A, 5B, 5C:
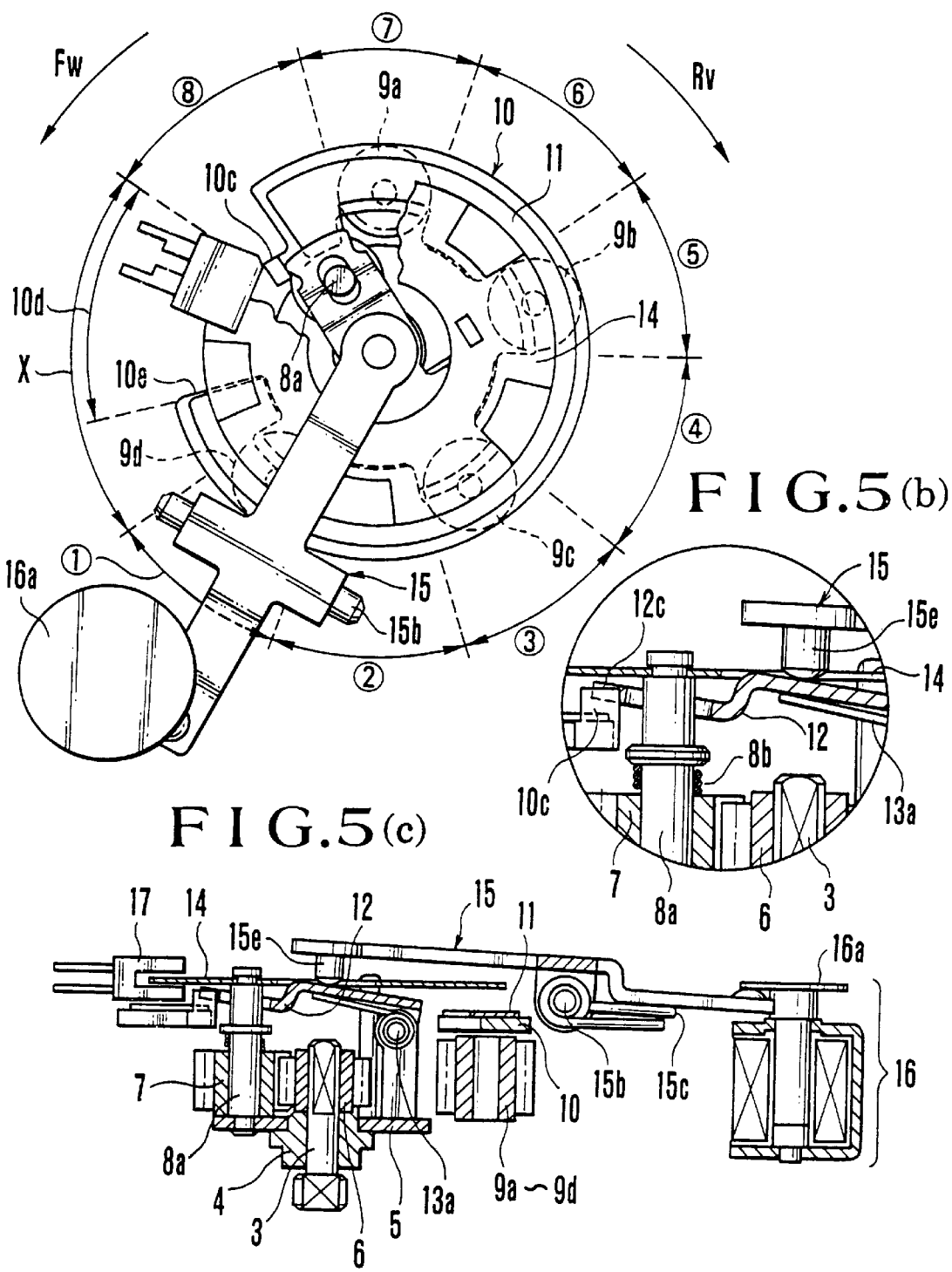
FIGS. 5(a), 5(b) and 5(c) are a plan view and vertical sectional views, respectively, showing the state in which a planetary gear is located in a region ⑧ in the first embodiment of the present invention.

It is assumed here that, as shown in FIG. 5(a), the clockwise rotation of the sun gear 6 is indicated by "Rv" and the counterclockwise rotation, by "Fw". The direction of rotation of the sun gear 6 is the same as the direction of revolution of the planetary gear 7, the direction of rotation of each of the output gears 9a to 9d, the direction of rotation of the rotating arm 5 and the direction of rotation of the rotation-stopping arm 12 and, in addition, the direction of rotation of the motor 1. It is also assumed that the regions around which the planetary gear 7 revolves are indicated by "X" and the numbers ①  to ⑧, respectively. Each of the regions also indicates the position of the end portion 12c of the rotation-stopping arm 12 with respect to the crown stopper 10. The region X is a region including an initial position 10d in which the planetary gear 7 does not mesh with any of the output gears 9a to 9d.

Figure 11:
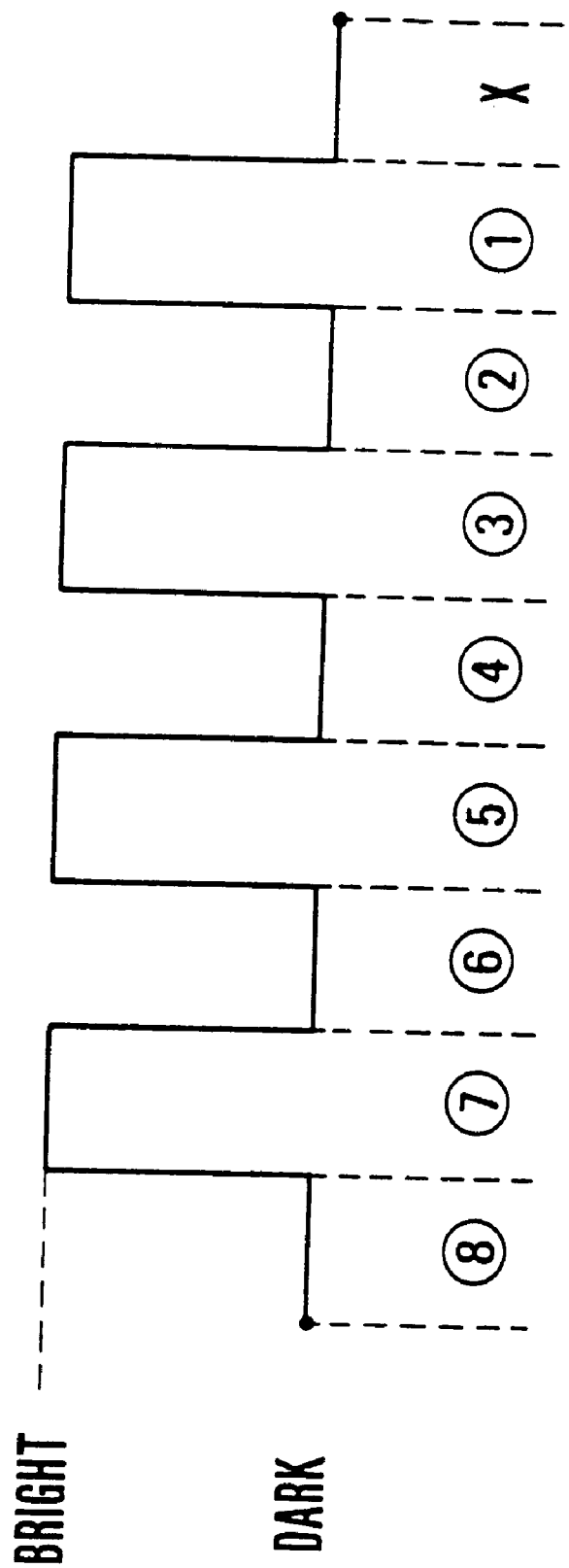
FIG. 11 is a chart illustrating a pulse waveform which serves as a position signal indicative of the position of the planetary gear in the first embodiment of the present invention.

The regions ①, ③, ⑤ and ⑦ are regions in which the planetary gear 7 meshes with the output gears 9d to 9a, respectively. These regions (positions) are identified by a control circuit 24 which will be described later (refer to FIG. 17) on the basis of a result obtained by detecting the number of transitions between "bright" and "dark" pulses from the output of the photocoupler 17. More specifically, as the planetary gear 7 revolves in the "Rv" direction in the order of ⑧→⑦→⑥→. . . (in the order of FIG. (5)→FIG. 6(a)→FIG. 7(a)), the bright and dark pattern segments of the pulse disc 14 are sequentially detected, and "bright" and "dark" signals such as those shown in FIG. 11 are outputted from the photocoupler 17. Accordingly, if a "bright" signal is outputted, this indicates that the planetary gear 7 is positioned in any one of the regions ⑦, ⑤, ③ and ① and is in mesh with any one of the output gears 9a to 9d. If a "dark" signal is outputted, this indicates that the planetary gear 7 is positioned in any one of the regions ②, ④, ⑥ and ⑧ and is in mesh with none of the output gears 9a to 9d.

As described previously, since the erected portion 10c of the crown stopper 10 comes into abutment with the end portion 12c of the rotation-stopping arm 12, the planetary gear 7 is inhibited from revolving from the region X to the region ⑧ or from the region ⑧ to the region X.

When the plunger 16 is energized to make the planetary gear 7 revolve, the planetary gear 7 initiates revolution. Then, if the energization of the plunger 16 is stopped when the gear 7 is positioned in any one of the regions ②, ④, ⑥ and ⑧, the end portion 12c of the rotation-stopping arm 12 stops in the state of riding on the holding stopper 11 (the state shown in FIGS. 8(a), 8(b) and 8(c)).

In this state, parts which rotate about the bearing 4, such as the rotating arm 5, the rotation-stopping arm 12, the planetary gear 7 and the pulse disc 14, are placed in instable positions. More specifically, the end portion 12c of the rotation-stopping arm 12 may slide on the holding stopper 11 and drop into the cutout within any one of the regions ①, ③, ⑤ and ⑦ owing to vibrations or the like (the state shown in FIGS. 9(a), 9(b) and 9(c)). Thus, the planetary gear 7 will mesh with the one of the output gears 9a to 9d with which it should not mesh, owing to vibrations or the like. In contrast, if the energization of the plunger 16 is stopped and the end portion 12c of the rotation-stopping arm 12 enters the region X, particularly the area of the initial position 10d, the end portion 12c enters the area between the erected portion 10c and the end face 10e and the planetary gear 7 becomes unable to revolve, as in the other regions ②, ④, ⑥ and ⑧ of the crown stopper 10 (the state of FIG. 7(a)). Since there is none of the output gears 9a to 9d, no power is transmitted even if the motor 1 operates. Accordingly, the region X (the initial position 10d) may be regarded as a "neutral position".

Since the "initial position" in which the planetary gear 7 is in mesh with none of the output gears 9a to 9d and is allowed to rotate on its axis without revolution is provided in the above-described manner, the device can be placed in a stable stop state.

The basic operation of the power dividing device according to the first embodiment is that "the planetary gear 7 which revolves around the sun gear 6 stops revolving at an arbitrary one of the output gears 9a to 9d which surround the planetary gear 7 circumferentially, and transmits, while rotating only, the power of the sun gear 6 to the arbitrary one of the output gears 9a to 9d". The outline of such a sequential operation will be described below.

First when the plunger 16 is energized, the rotation-stopping arm 12 is removed from any one of the cutouts of the crown stopper 10 and the planetary gear 7 is placed in a freely revolvable state. Then, the motor 1 is activated to make the planetary gear 7 revolve in an arbitrary direction. At this time, the pulse disc 14 is also made to rotate. Then, the amount of rotation of the pulse disc 14 is detected from the output of the photocoupler 17, that is, the number of "bright" and "dark" pulses generated by the rotation of the pulse disc 14 is counted, whereby the region where the planetary gear 7 is positioned is detected from among the regions X to ⑧. When it is detected that the planetary gear 7 has revolved up to the desired one of the output gears 9a to 9d to which power is to be transmitted the energization of the plunger 16 is turned off and the end portion 12c of the rotation-stopping arm 12 is made to enter the associated cutout of the crown stopper 10, thereby limiting the revolution of the planetary gear 7. Then, the rotation of the motor 1 is transmitted to the arbitrary one of the output gears 9a to 9d, whereby the power is transmitted.

As will be described in detail in connection with "entrance operation" and "exit operation" both of which will be described later, since the pulse disc 14 rotates with the revolution of the planetary gear 7, the position of the planetary gear 7 which is revolving is identified from the output of the photocoupler 17 (the number of transitions between "bright" and "dark" pulses). However, in the aforesaid operational step in which "when it is detected that the planetary gear 7 has revolved up to the desired one of the output gears 9a to 9d to which power is to be transmitted, the energization of the plunger 16 is turned off", it is necessary to determine how the planetary gear 7 is meshed with the desired one of the output gears 9a to 9d or where the end portion 12c of the rotation-stopping arm 12 is positioned with respect to the crown stopper 10 and the holding stopper 11. Such a decision is made on the basis of the detection of the falling edge of a pulse changing from its "bright" level to its "dark" level or the rising edge of a pulse changing from the "dark" level to the "bright" level. In other words, by using the pulse disc 14 and the photocoupler 17, it is possible not only to count the number of transitions between the "bright" and "dark" pulses but also to detect the rising and falling edges of each of the "bright" and "dark" pulses. In this arrangement, control of the motor 1 and the plunger 16 is performed to implement fine operational control for "entrance" and "exit" of the rotation-stopping arm 12 into and from any one of the cutout of the crown stopper 10.

The "initial positioning" operation will be described below.

To detect the region where the planetary gear 7 is revolving from among the regions X to ⑧, the pulse disc 14 and the photocoupler 17 are used. However, since there are only two kinds of signals corresponding to "brightness" and "darkness" as shown in FIG. 11, it is only possible to detect how far the planetary gear 7 has revolved since detection was started, that is, the number of transitions indicated by the count of pulse signals. For this reason, immediately after the present device has been activated, it is impossible to detect a position (initial state) where the planetary gear 7 is located at that time. Accordingly, control is provided so that the operation of "necessarily finding the "initial position 10d" in whatever state the device may be placed" can be performed when the present device is activated. Such an operation will be hereinafter referred to as the "initial positioning" operation.

In operation, first, the plunger 16 is energized to place the planetary gear 7 in a freely revolvable state. Then, the planetary gear 7 is made to revolve unconditionally in the "Fw" direction until the end portion 12c comes into abutment with the erected portion 10c, that is, up to the region ⑧. Subsequently, while pulse transitions are being counted, the planetary gear 7 is made to revolve in the "Rv" direction until the end portion 12c enters the "initial position 10d". The energization of the plunger 16 and the motor 1 is stopped and the planetary gear 7 is placed in a stable stop state at that position. Since this state indicates that the end portion 12c is located in the region X, more specifically, the initial position 10d of the crown stopper 10, it is possible to detect where the planetary gear 7 is located from among the regions X to ⑧, on the basis of the initial position 10d by using the "bright" and "dark" signals detected by the combination of the photocoupler 17 and the pulse disc 14.

What is important in the aforesaid operational step is that the erected portion 10c of the crown stopper 10 and the end portion 12c of the rotation-stopping arm 12, which cooperate to serve as an abutment portion for limiting a right-handed or left-handed revolution of the planetary gear 7, have a positional relationship in which the planetary gear 7 is in mesh with none of the output gears 9a to 9d, as described above, (the states shown in FIGS. 5(a) and 7(a)).

The above-described "initial positioning" operation is needed in a number of cases, for example:

when it is impossible to determine in which region of the regions X to ⑧ the planetary gear 7 is located at the time of activation of the present device.

when "erroneous selection of an element to which power is to be transmitted" takes place, that is, when there is a discrepancy between the position of the planetary gear 7 which is memorized in the control circuit which will be described later and the position where the planetary gear 7 is actually located.

For the above-noted and other reasons, since the original position of the planetary gear 7 is not known, even if the pulse disc 14 and the photocoupler 17 are used to perform position detection based on relative pulse transitions of pulses for the purpose of detecting the position of the planetary gear 7, the position thus detected has no substantial meaning.

For this reason, in the first half of the "initial positioning" operation, after the energization of the plunger 16, the motor 1 is driven in the "Fw" direction rotation without detection of pulse transitions, thereby causing the planetary gear 7 to revolve up to the region ⑧, that is, until the end portion 12c comes into abutment with the erected portion 10c (the state of FIG. 5(a). During this time, the motor 1 is driven to rotate only during the time period required for the planetary gear 7 to make one revolution from ⑧ to X or vice versa (500 msec in this example), and the motor 1 is merely driven to rotate unconditionally in the "Fw" direction, thereby bringing the end portion 12c of the rotation-stopping arm 12 into abutment with the erected portion 10c of the crown stopper 10. However, as will be described later in connection with the "exit operation", there are some conditions under which the planetary gear 7 is unable to freely revolve if the planetary gear 7 initially performs no revolution in the "Rv" direction. Accordingly, in some cases, the motor 1 is first driven to rotate in the "Rv" direction during the above-described predetermined time period and makes the planetary gear 7 to revolve in the "Rv" direction up to the position of X (the state of FIG. 7(a)), and then the planetary gear 7 is made to revolve in the "Fw" direction, thereby bringing the end portion 12c into abutment with the erected portion 10c in the region ⑧.

When such an abutment state is reached, the planetary gear 7 may be considered to be located in the region ⑧. Subsequently to the abutment state, the position of the planetary gear 7 during revolution may be determined while pulse transitions between "bright" and "dark" are being detected through the pulse disc 14 and the photocoupler 17 in the known manner.

Accordingly, in the second half of the "initial positioning" operation, the motor 1 is driven to rotate in the "Rv" direction, thereby causing the planetary gear 7 to revolve from the region ⑧ to the region X while pulse transitions are being detected. If the planetary gear 7 is correctly positioned in the region ⑧ in the first half of the "initial positioning" operation and if the planetary gear 7 can revolve from the region ⑧ to the region X, it follows that a pulse transition from the "bright" level to the "dark" level and a pulse transition from the "dark" level to the "bright" level are detected four times each.

In the above-described manner, a limiting member (the erected portion 10c) which places the planetary gear 7 in the state of being meshed with none of the output gears 9a to 9d is provided in the abutment position for limiting the revolution of the planetary gear 7, and this position is rendered the neutral position in which the planetary gear 7 is allowed to rotate without revolution. Accordingly, when the planetary gear 7 is to be revolved, particularly if it is impossible to detect the position of the planetary gear 7 during revolution, the planetary gear 7 can be made to rotate on its axis in mesh with none of the output gears 9a to 9d even if the motor 1 is driven to rotate during a predetermined time period. Accordingly, it is possible to find the neutral position (particularly, the initial position 10d of the crown stopper 10) which serves as the abutment position without the risk of unwanted transmission of power.

The advantages of the "initial positioning" operation will be described below.

The "initial positioning" operation also includes the operation of checking whether the planetary gear 7 can reliably revolve up to each of the regions in the order of ⑧→⑦→⑥→⑤→④→③→②→①→X. Accordingly, the "initial positioning" operation has the function of checking whether the present device can operate correctly. More specifically, if the planetary gear 7 can make one revolution (in this example, one revolution in the "Rv" direction), a pulse transition from the "bright" level to the "dark" level and that from the "dark" level to the "bright" level are detected four times each, as shown in FIG. 11. If such four pulse transitions are not correctly detected, this indicates that the planetary gear 7 has not correctly revolved and a mechanical failure has occurred in the power dividing device.

Figure 19:
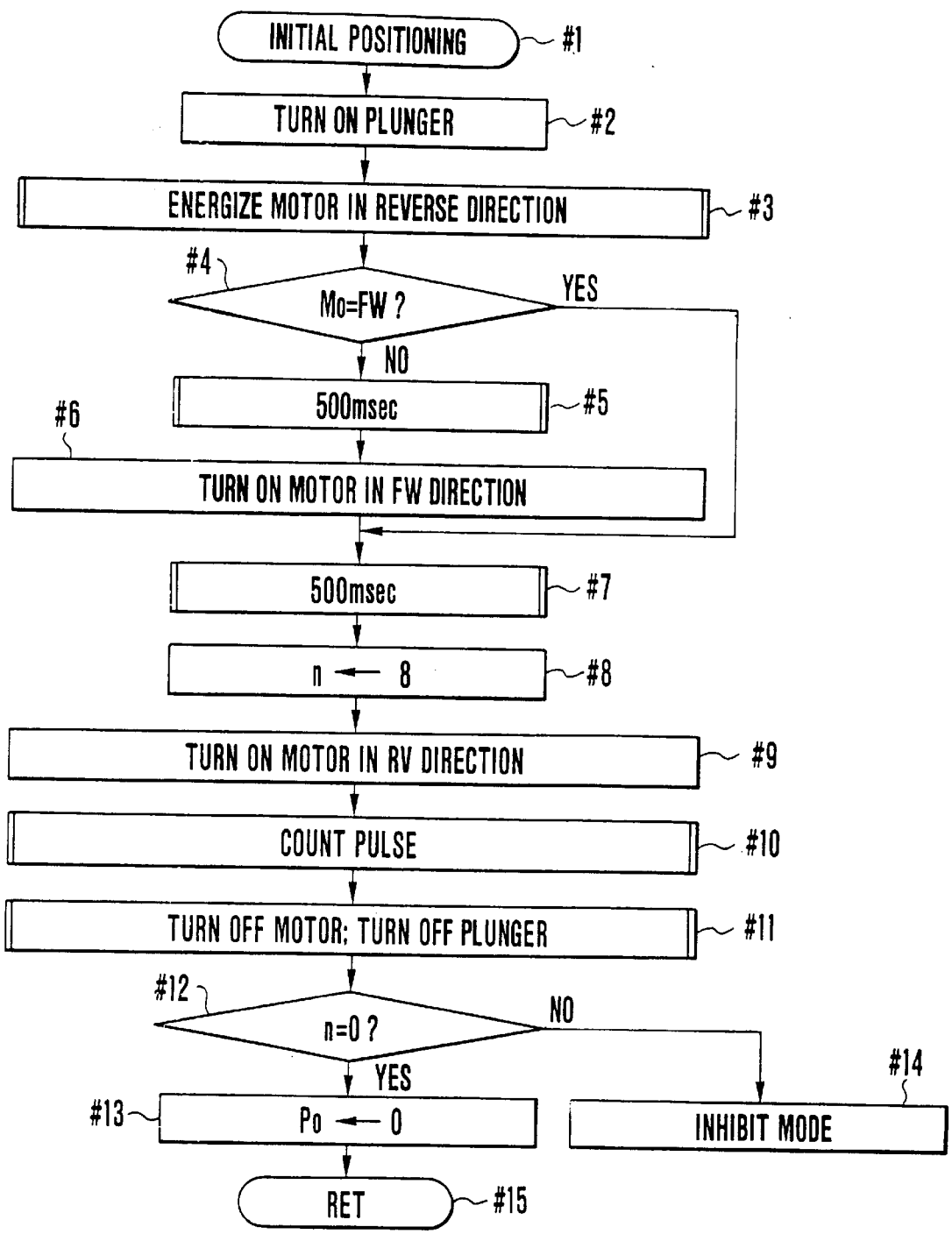
FIG. 19 is a flowchart showing the operation named "INITIAL POSITIONING" of the control circuit 24 of FIG. 17.

Referring to FIG. 19, from Step #10 "COUNT PULSE" to Step #12, pulse counting is performed to detect whether eight pulse transitions between "bright" and "dark" have occurred. Through this pulse counting, it is possible to check the operation of the present device.

In the above-described manner, in the present device which is adapted to detect the position of the planetary gear 7 during revolution on the basis of the number of relative transitions of a pulse signal or the like, when the position of the planetary gear 7 is to be found by "the initial positioning", the motor 1 is energized to rotate unconditionally in one direction during a predetermined time period to perform the abutment operation of bringing the end portion 12c into abutment with the erected portion 10c. Thereafter, when the motor 1 is energized to rotate in the reverse direction, whether a prescribed number of pulse signals have been outputted is detected, whereby it is also possible to check the operation of the present device at the same time.

There is another case where the "initial positioning" operation is needed, in addition to the time of activation of the present device at which the "initial positioning" operation is performed (for simultaneously checking whether the planetary gear 7 can reliably revolve around the regions X to ⑧ and up to each of them). As will be described in detail in connection with FIGS. 17 and 19, mechanisms 25a to 25d for power transmission (refer to FIG. 17) are provided with circuit parts for generating drive signals 26a to 26d (refer to FIG. 17) for feedback of their respective operations. Accordingly, it is possible to again perform selection of an element to which power dividing is to be directed, by executing the "initial positioning" operation, even if such an element is erroneously selected, for example, in a case where while any one of the output gears 9a to 9d is transmitting power to the associated one of the mechanisms 25a to 25d, the corresponding drive signal 26a, 26b, 26c or 26d is not transmitted, or in a case where the drive signal 26a, 26b, 26c or 26d is transmitted from the one of the mechanisms 25a to 25d to which power need not to be transmitted.

As is apparent from the above description, the reason why "initial positioning" operation is needed is to detect the position of the planetary gear 7 during revolution on the basis of the relative pulse transitions obtained from the combination of the photocoupler 17 and the pulse disc 14, as described previously. If the present device is provided with a mechanism capable of detecting the position of the planetary gear 7 during revolution as an absolute position, the above-described "initial positioning" operation is not needed. However, it will be necessary to increase the complexity and size of the present device.

When the "initial positioning" operation is completed, the planetary gear 7 is reliably positioned in the region X, more specifically, the region of the initial position 10d of the crown stopper 10. Accordingly, it is possible to implement a reliable power dividing operation by determining which of the output gears 9a to 9d and the planetary gear 7 are in mesh with each other while "bright" and "dark" signals are being detected through the combination of the photocoupler 17 and the pulse disc 14 during the revolution of the planetary gear 7 from that position. For this reason, in the present device adapted to determine which of the output gears 9a to 9d and the planetary gear 7 are in mesh with each other on the basis of only relative transitions between the "bright" and "dark" signals, if the "initial positioning" operation is performed for each power dividing operation and reliable selection of an element to which power is to be transmitted is carried out, the reliability of the device will improve. However, if the "initial positioning" operation is performed each time the element to which power is to be transmitted is changed, it will require a time-consuming sequence of operations since the "initial positioning" operation itself is not an actual power transmission operation but a switching operation.

Accordingly, if the "initial positioning" operation is performed as actively as possible in the case of an operation which is not seriously affected by the length of an operating time period, except for an operation such as the operation of continuously transmitting power to the output gears 9a to 9d, it is possible to improve the reliability of the device.

As described above, in the device for performing position detection on the basis of the number of relative transitions, particularly in the device whose operation is set so that the "initial positioning" operation is carried out, it is possible to improve the reliability of the device by actively performing the "initial positioning" operation each time the element to which power is to be transmitted is changed, in an operational portion the entire control process of which is not impaired by the "initial positioning" operation.

Figure 18:
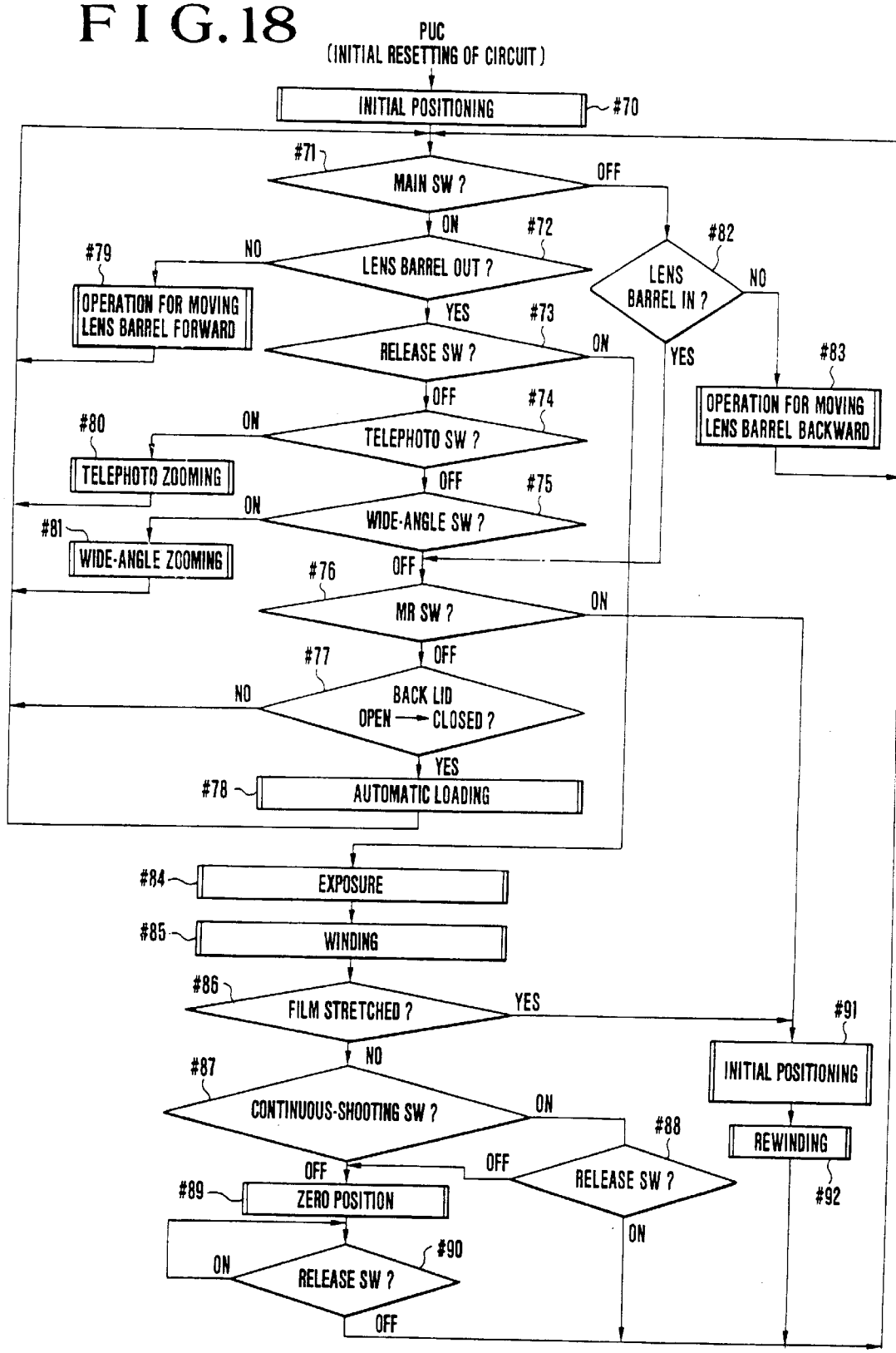
FIG. 18 is a flowchart showing the main operation of the control circuit 24 of FIG. 17.

In practice, the "initial positioning" operation is performed in Step #91 in the main operation of a camera which will be described later (refer to FIG. 18). In the flowchart of FIG. 18, the "initial positioning" operation is performed immediately before a rewinding operation. Switching to the rewinding operation is an operation which takes a certain time period, and since insertion of a short time period in this step offers no substantial problem, the "initial positioning" operation is performed in Step #91. In automatic loading as well, the "initial positioning" operation is performed before the completion of the automatic loading (Steps #141 and

Figure 25:
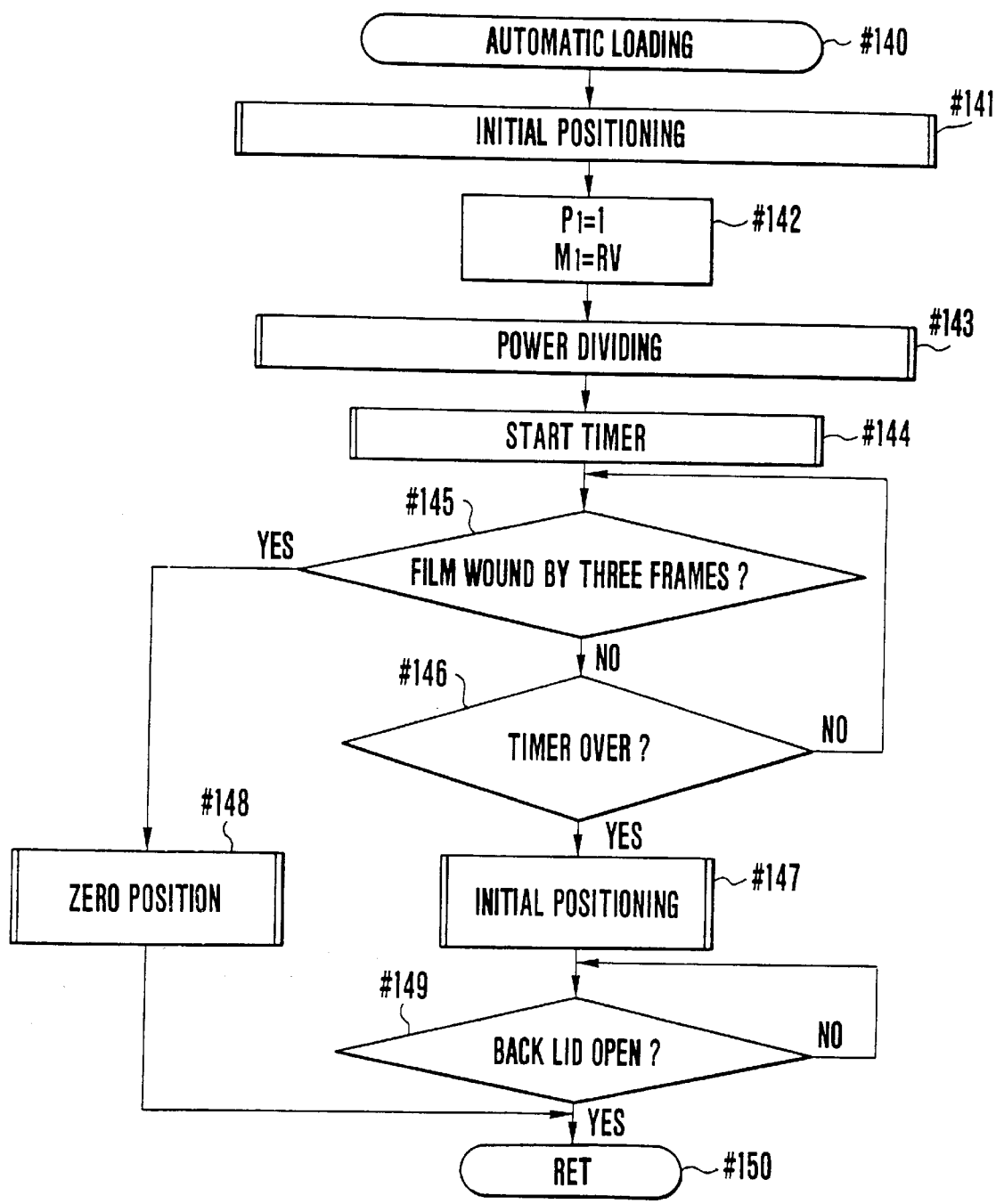
FIG. 25 is a flowchart showing the operation named "AUTOMATIC LOADING" of the control circuit 24 of FIG. 17.

147 of FIG. 25). Since the automatic loading as well as the rewinding operation takes a certain time period, this "initial positioning" operation is performed to improve the reliability of the control of the entire device described above.

The "initial positioning" operation in a camera provided with the device according to the first embodiment will be described later with reference to FIG. 19.

As described previously in connection with the basic operation of the power dividing device, the plunger 16 is turned on or off to cause the end portion 12c of the rotation-stopping arm 12 to enter into or exit from (disengage from) any one of the cutouts of the crown stopper 10. The motor 1 and the plunger 16 perform fine operations, respectively, to assist in the operation of causing the end portion 12c to enter into or exit from the cutout of the crown stopper 10, in response to the "bright" and "dark" signals for providing on-off timing which are obtained from the pulse disc 14. The "entrance operation" and the "exit operation" will be described below.

First, the "exit operation" will be described below.

The holding stopper 11 which has a shape similar to that of the crown stopper 10 is disposed on the crown stopper 10. Although the shape of the holding stopper 11 resembles that of the crown stopper 10, as described previously in connection with FIG. 4, the angle of each of the cutout of the holding stopper 11 is selected to be:

X>Y>X.

This angle is the requirement necessary for implementation of the "exit operation".

Figure 8A:
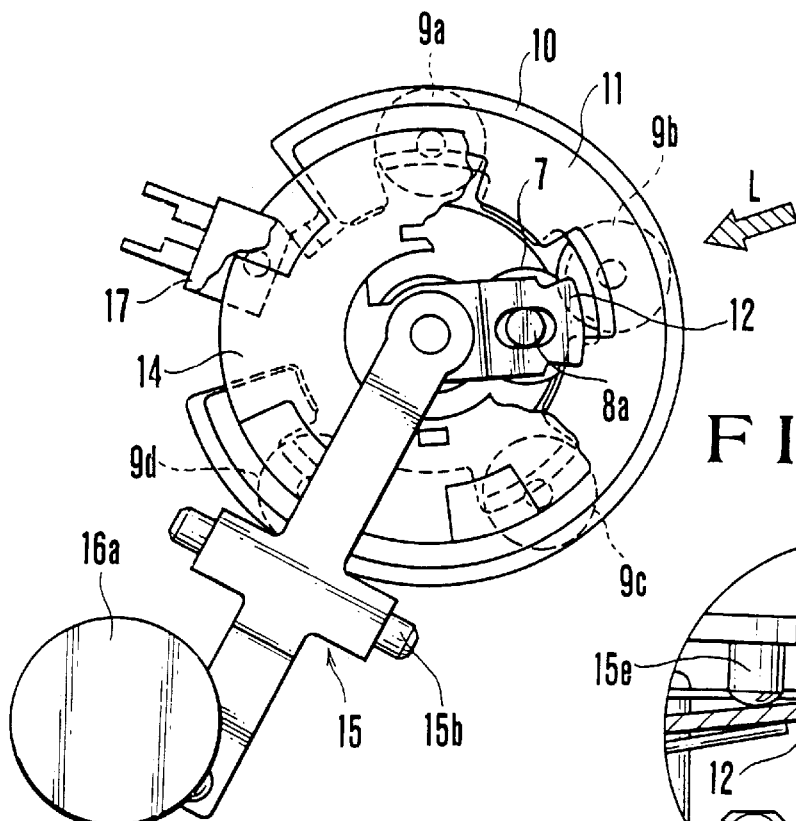
FIGS. 8(a), 8(b) and 8(c) are a plan view and vertical sectional views, respectively, showing the state of the power dividing device immediately before the planetary gear enters the region ⑤ in the first embodiment of the present invention.
Figure 8B:
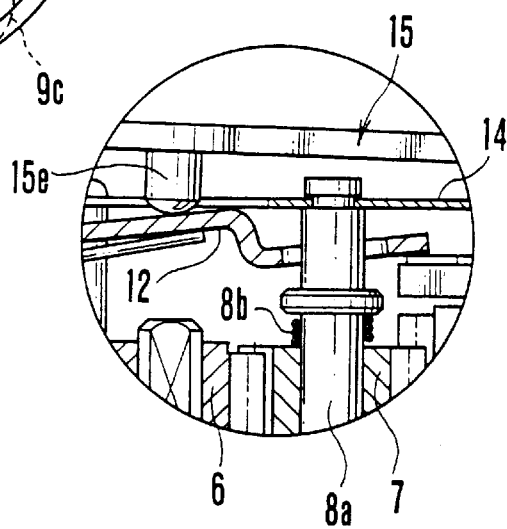
Figure 8C:
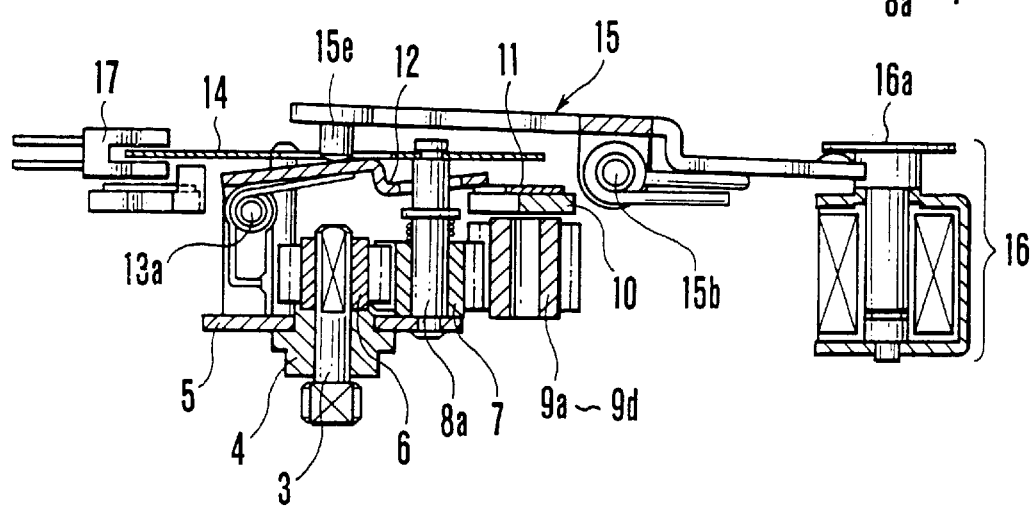
Figure 12A:
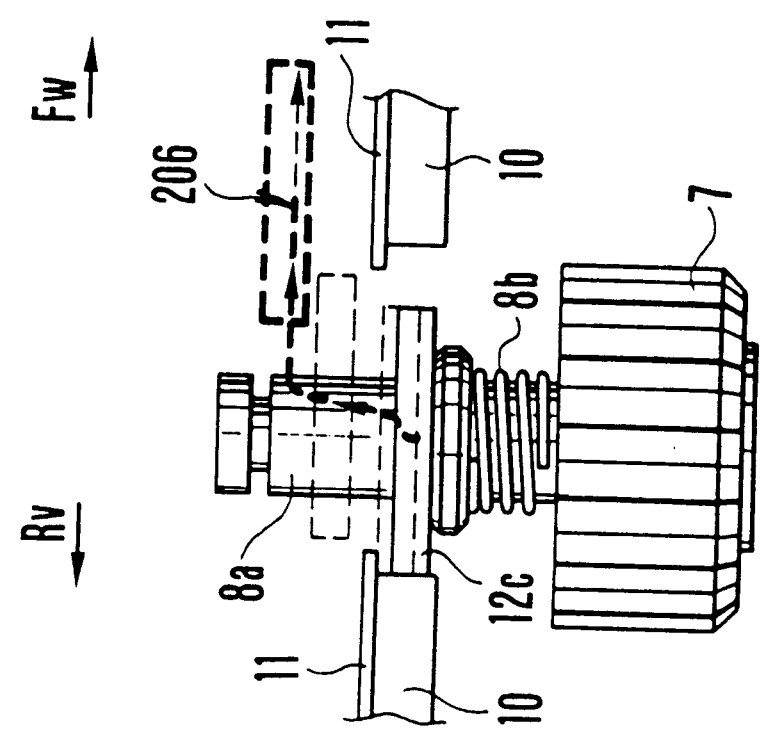
FIGS. 12(a) and 12(b) are schematic views which serve to illustrate an "exit operation" in the first embodiment of the present invention.
Figure 12B:
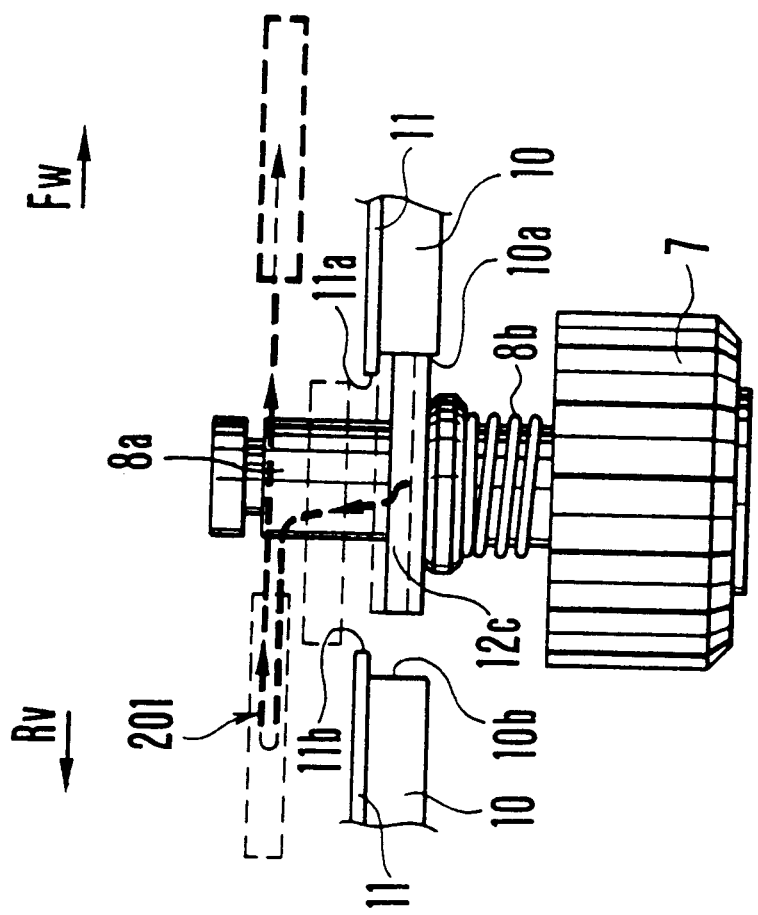
Figure 13A:
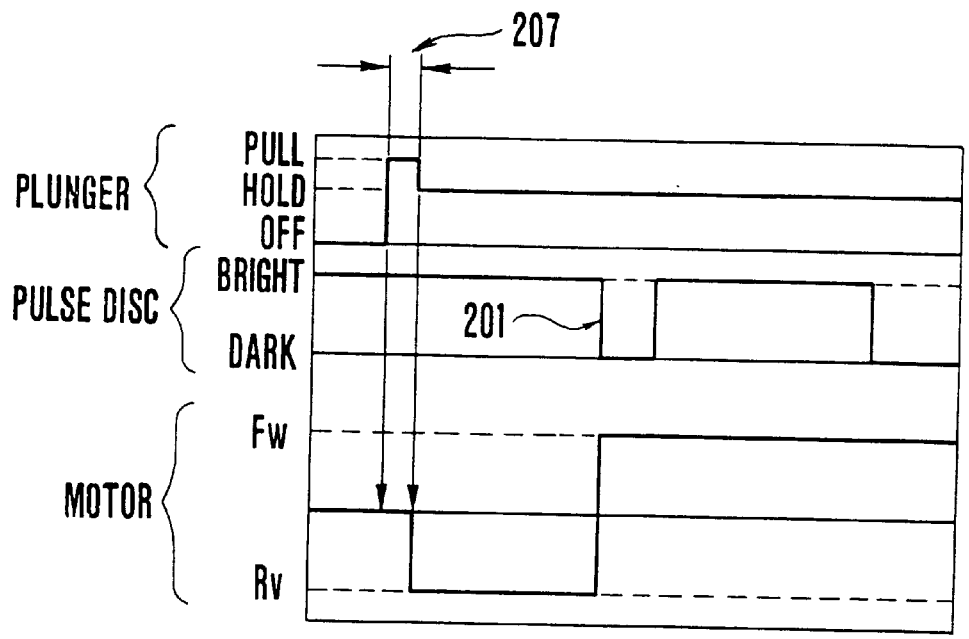
FIGS. 13(a) and 13(b) are timing charts respectively showing the operations shown in FIGS. 12(a) and 12(b)
Figure 13B:
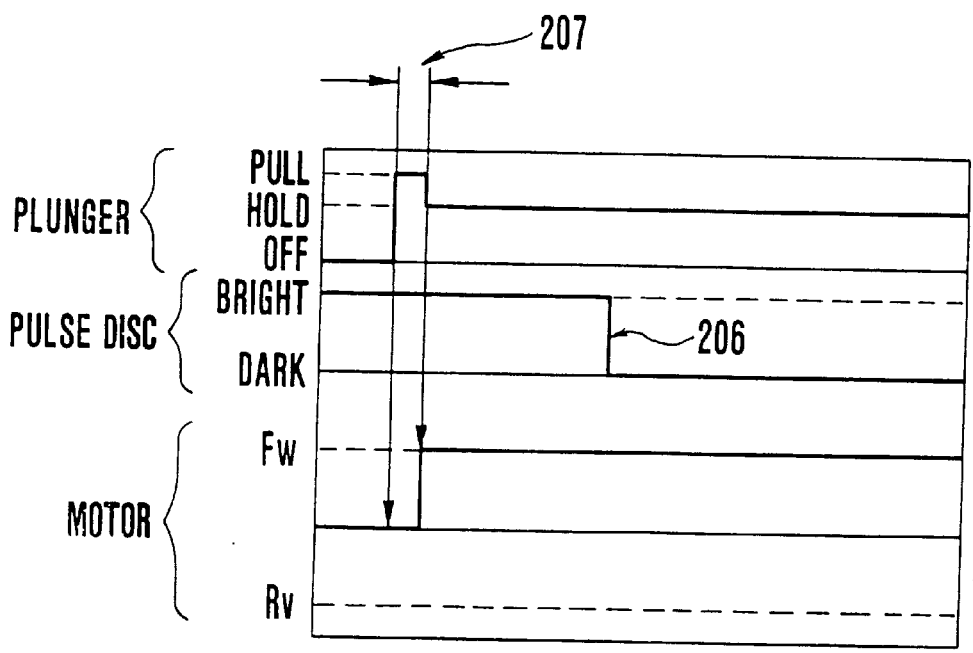

FIG. 12(a) is a model diagram of the first embodiment, taken in the direction of the arrow L shown in FIG. 3 or 8(a), and the obverse side of the sheet of each of FIGS. 3 and 8(a) corresponds to the top side of FIG. 12(a). FIG. 12(a) represents the relationships between the crown stopper 10, the holding stopper 11 and the end portion 12c of the rotation-stopping arm 12, and dashed lines represent the loci of motions occurring when the end portion 12c of the rotation-stopping arm 12 engages with or disengages from the crown stopper 10 or the holding stopper 11. The dashed lines also represent signals obtainable when the photocoupler 17 detects the bright pattern segments 14e or the dark pattern segments 14d of the pulse disc 14 which rotates in interlocked relation to the rotation of each of the rotation-stopping arm 12, the rotating arm 5, the planetary gear 7 and so on. The thick dashed lines correspond to the "bright" signals and indicate that the planetary gear 7 is located in any one of the regions ①, ③, ⑤ and ⑦, while the thin dashed lines correspond to the "dark" signals and indicate that the planetary gear 7 is located in any one of the regions X, ②, ④, ⑥ and ⑧. Each of FIGS. 13(a) and 13(b) is a timing chart showing the operational timing of the present device during the execution of the "exit operation", and shows the direction of rotation of the motor 1, the timing of the pulling operation of the plunger 16, and the transition between the "bright" and "dark" signals which is obtained when the photocoupler 17 detects the pattern of the pulse disc 14. FIGS. 13(a) and 13(b) correspond to FIGS. 12(a) and 12(b), respectively.

FIGS. 9(a), 9(b) and 9(c) show the state wherein the planetary gear 7 is positioned in the region ⑤ while transmitting the power conducted through the output gear 9b which is rotating in the "Fw" direction (refer to FIG. 9(b)). During this time, the revolving force of the planetary gear 7 in the "Fw" direction is cancelled by the rotation-stopping arm 12 which is engaged with the cutout (the end face 10a) of the crown stopper 10. The operation of stopping the power transmission through the output gear 9b and causing the planetary gear 7 to revolve from the output gear 9b to another output gear (9a, 9c or 9d) will be described below. First, energization of the plunger 16 is started to disengage the end portion 12c of the rotation-stopping arm 12 from the cutout of the crown stopper 10. However, the end portion 12c of the rotation-stopping arm 12 may not move up owing to friction between the end portion 12c and each face of the crown stopper 10 which defines the cutout (the end face 10a). This phenomenon will occur even if the rotation of the planetary gear 7 in the "Rv" direction, that is, the rotation of the motor 1 in the "Fw" direction, is continued or stopped after the completion of the pulling operation of the plunger 16.

In other words, if the planetary gear 7 continues rotating in the "Rv" direction, the end portion 12c of the rotation-stopping arm 12 and the cutout (the end face 10a) of the crown stopper 10 remain in abutment with each other. Even if the rotation of the planetary gear 7, that is, the rotation of the motor 1, is stopped, the end portion 12c of the rotation-stopping arm 12 remains urged against the end face 10a of the cutout of the crown stopper 10 owing to the backlash of the gear train.

Figure 10A:
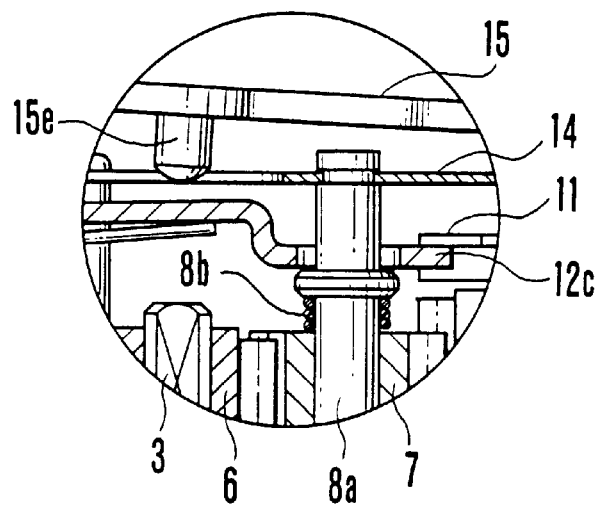
FIGS. 10(a) and 10(b) are vertical sectional views, respectively, showing the state of the power dividing device immediately before the planetary gear exits from a particular region in the first embodiment of the present invention.
Figure 10B:
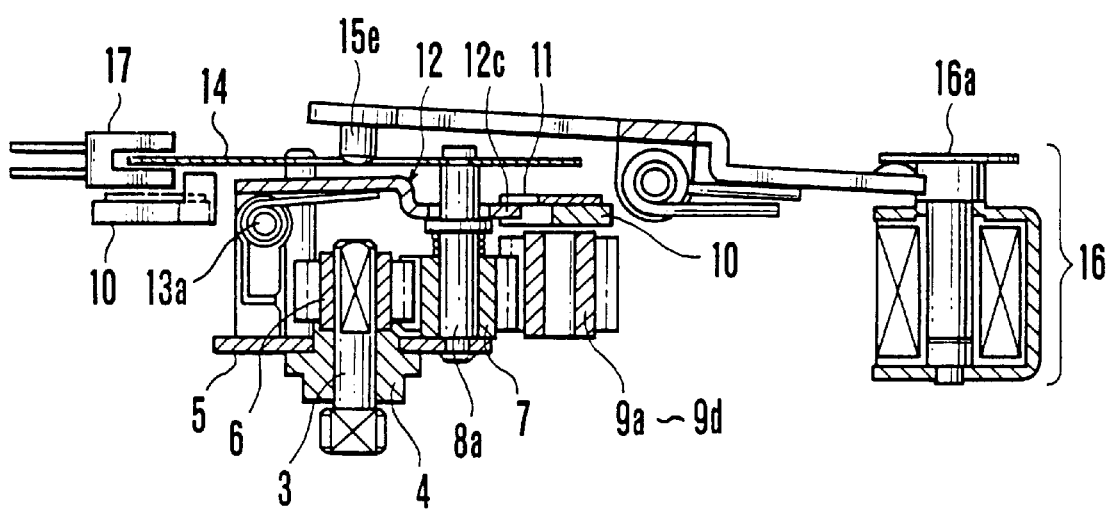

For this reason, the following process is needed:

After the completion of the pulling operation of the plunger 16, the motor 1 is reversed in the "Rv" direction to remove the backlash, thereby eliminating the friction between the end portion 12c of the rotation-stopping arm 12 and the cutout (the end face 10a) of the crown stopper 10. If the friction is eliminated, the end portion 12c is made to disengage from the cutout (the end face 10a) of the crown stopper 10. However, the force of the friction is not always uniform in magnitude, and if the spring balance between the torsion spring 15c for the arm 15 and the pulling force of the plunger 16 is taken into account, it is undesirable that the strength of the torsion spring 13b for moving up the rotation-stopping arm 12 be selected to be unconditionally large. The holding stopper 11 is employed as a countermeasure for solving the above-described problem. More specifically, even if the arm 15 moves up from the rotation-stopping arm 12 and the projection 15e stops pressing it down, the end portion 12c of the rotation-stopping arm 12 is held in engagement with the holding stopper 11 until the end portion 12c completely comes out of contact with the cutout (the end face 10a) and the friction disappears (refer to FIGS. 9(a), 10(a) and 10(b)).

The above-described operation will be described in more detail with reference to FIG. 12(a).

As described previously, FIG. 12(a) is a view taken in the direction of the arrow L of FIG. 8(a). As described above, to eliminate the influence of friction or the like, it is necessary to bring the end portion 12c of the rotation-stopping arm 12 out of engagement with the crown stopper 10 after the planetary gear 7 starts revolving in the "Rv" direction. In other words, it is absolutely necessary to hold the end portion 12c in engagement with the crown stopper 10 until the planetary gear 7 starts revolving in the "Rv" direction. The holding stopper 11 performs the function of holding the end portion 12c in engagement with the crown stopper 10 until the start of the revolution of the planetary gear 7 in the "Rv" direction. To fulfill such a function, it is essential to meet the previously-described relationship between the angles (Z>Y>X). Incidentally, in FIGS. 12(a) and 12(b), each of the angles corresponds to a lateral width.

The present device is not provided with a sensor for detecting whether the end portion 12c of the rotation-stopping arm 12 has disengaged, i.e., moved up, from the holding stopper 11 and the crown stopper 10. In the present device, the function of such a sensor is realized by utilizing "bright" and "dark" signals detected from the pulse disc 14.

Referring to FIGS. 12(a) and 13(a), if the crown stopper 10 is in mesh with the rotation-stopping arm 12 as shown in, for example, FIG. 12(a), a "bright" signal (a signal indicating that the end portion 12c is positioned in the region ⑤) is detected. When a certain time period has elapsed after the completion of the pulling operation of the plunger 16, the motor 1 is driven to rotate in the "Rv" direction. If the rotation-stopping arm 12 passes through the space between the end faces 11a and 11b of the holding stopper 11 and disengages from the cutout of the crown stopper 10 as shown by the dashed loci of FIG. 12(a), the rotating arm 5 starts rotating in the "Rv" direction, so that a "dark" signal (a signal indicating that the end portion 12c is positioned in the region ④) is detected as shown at 201 in FIG. 12(a) and it is indirectly indicated that the end portion 12c has disengaged from the crown stopper 10. After the detection of the signal, the motor 1 is driven so that the planetary gear 7 is made to revolve in the next desired direction, that is, so that the planetary 7 is made to revolve toward the next one of the output gears 9a, 9c and 9d to which power is to be transmitted. However, if, as shown in, for example, FIG. 12(b), the direction in which the sun gear 6 is made to rotate to eliminate the friction between the crown stopper 10 and the rotation-stopping arm 12 is the same as the direction in which the planetary gear 7 is made to revolve after the end portion 12c has disengaged from the holding stopper 11, the motor 1 may be continuously driven to rotate in the same direction so that a series of operations may continue.

As shown in FIGS. 13(a) and 13(b), when a certain time period 207 elapses after the start of the pulling operation of the plunger 16, the rotation of the motor 1 is started. If the time period 207 is too short, the planetary gear 7 may start revolving before the projection 15e of the arm 15 moves up, depending on the length of the pulling time of the plunger 16. In this case, the end portion 12c of the rotation-stopping arm 12 may only travel from the end face 11a to the end face 11b of the cutout of the holding stopper 11, and may not disengage from the crown stopper 10. To assure a time margin for preventing occurrence of such disengagement, the time lag shown at 207 is provided between the start of the pulling operation of the plunger 16 and the start of rotation of the motor 1.

The foregoing is a description of the "exit operation" which is performed since the transmission of power to a certain output gear (in this example, the output gear 9b) is completed until the planetary gear 7 starts switching to the next output gear 9a, 9c or 9d.

Since the holding stopper 11 is provided in the above-described manner, it is possible to reliably perform the switching operation following the power transmission without the need to strictly control various factors such as the spring balance in the present device, the characteristics of the plunger 16, the variations of the frictional force between the crown stopper 10 and the rotation-stopping arm 12 due to the difference between the shapes of actual parts used as the crown stopper 10 or the rotation-stopping arm 12, and the amount of backlash.

The "entrance operation" of stopping the revolution of the planetary gear 7 at the desired output gear 9a, 9c or 9d and starting transmission of power will be described below with reference to FIGS. 14(a), 14(b) and FIGS. 15(a), 15(b). The relation between FIGS. 14(a), 14(b) and FIGS. 15(a), 15(b) is similar to that between FIGS. 12(a), 12(b) and FIGS. 13(a), 13(b).

Although the holding stopper 11 itself is not needed in the "entrance operation", the holding stopper 11 which is positioned above the crown stopper 10 does not hinder the "entrance operation".

Figure 14A:
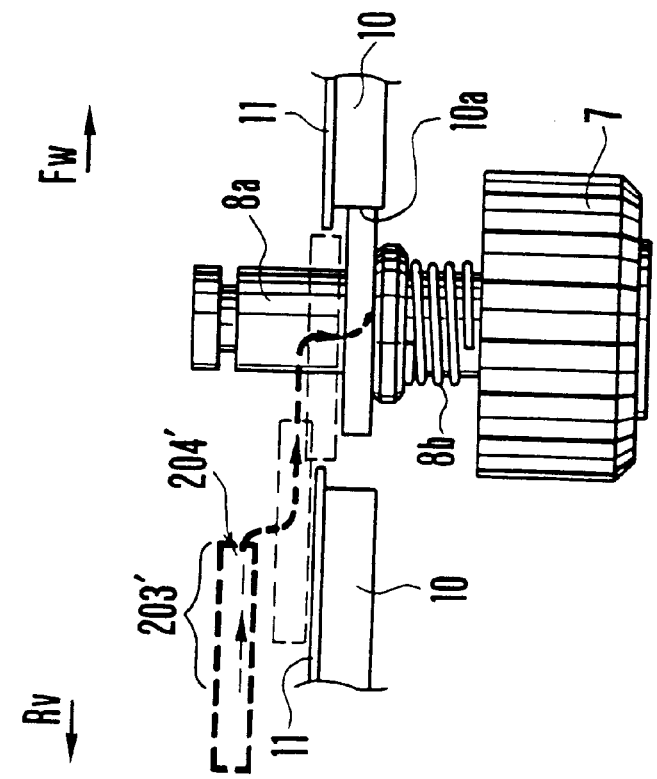
FIGS. 14(a) and 14(b) are schematic views which serve to illustrate an "entrance operation" in the first embodiment of the present invention.
Figure 14B:
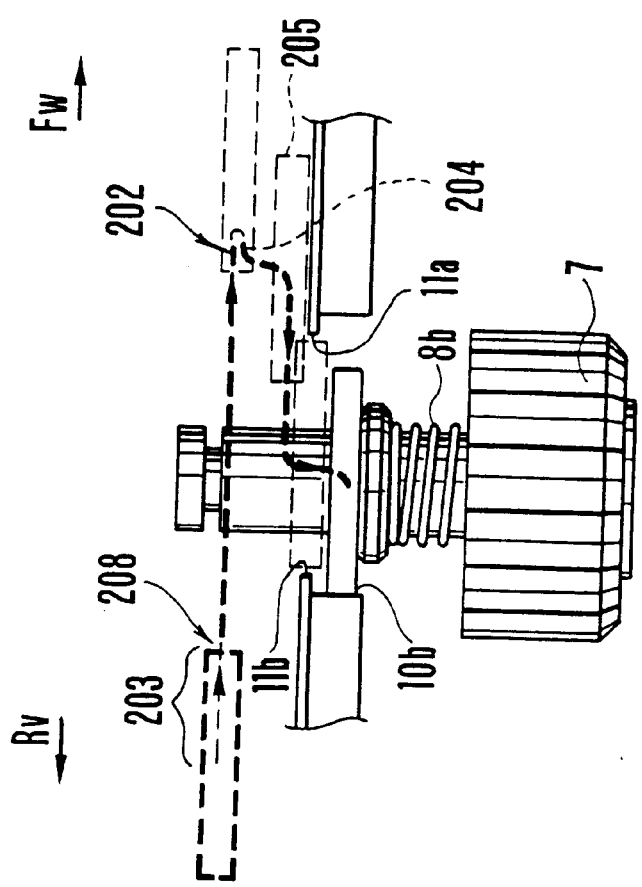

For example, when the planetary gear 7 is to be stopped in the region ⑤ as shown in FIGS. 9(a), 9(b) and 9(c) during the revolution in the "Fw" direction, the planetary gear 7 is made to revolve from the region ④ in the same direction. Then, the revolution of the planetary gear 7 is stopped by the cooperation between the crown stopper 10 and the rotation-stopping arm 12 by stopping the pulling operation of the plunger 16. Thus, transmission of power to the output gear 8b is started. FIGS. 14(a) and 14(b) show different processes of the aforesaid operation. The difference between FIGS. 14(a) and 14(b) resides in the direction in which the output gear 9b positioned in the region ⑤ is to be rotated. FIG. 14(a) shows the manner in which the output gear 9b is made to rotate in the "Rv" direction via the planetary gear 7, and at this time the end portion 12c of the rotation-stopping arm 12 is stopped by engagement with the end face 10b in the cutout of the crown stopper 10. FIG. 14(b) shows the manner in which the output gear 9b is made to rotate in the "Fw" direction, and at this time the end portion 12c is stopped by engagement with the end face 10a in the cutout of the crown stopper 10. As is apparent from the above description, as in the case of the "exit operation", two ways of entrance are prepared in the "entrance operation". The reasons are as follows:

1) It is necessary to make the direction of revolution of the planetary gear 7 the same as that of rotation of the next one of the output gears 9a, 9b, 9c and 9d to which power is to be transmitted; and
2) A device is not provided which directly detects whether the end portion 12c of the rotation-stopping arm 12 has entered the cutout of the crown stopper 10.

Figure 15A:
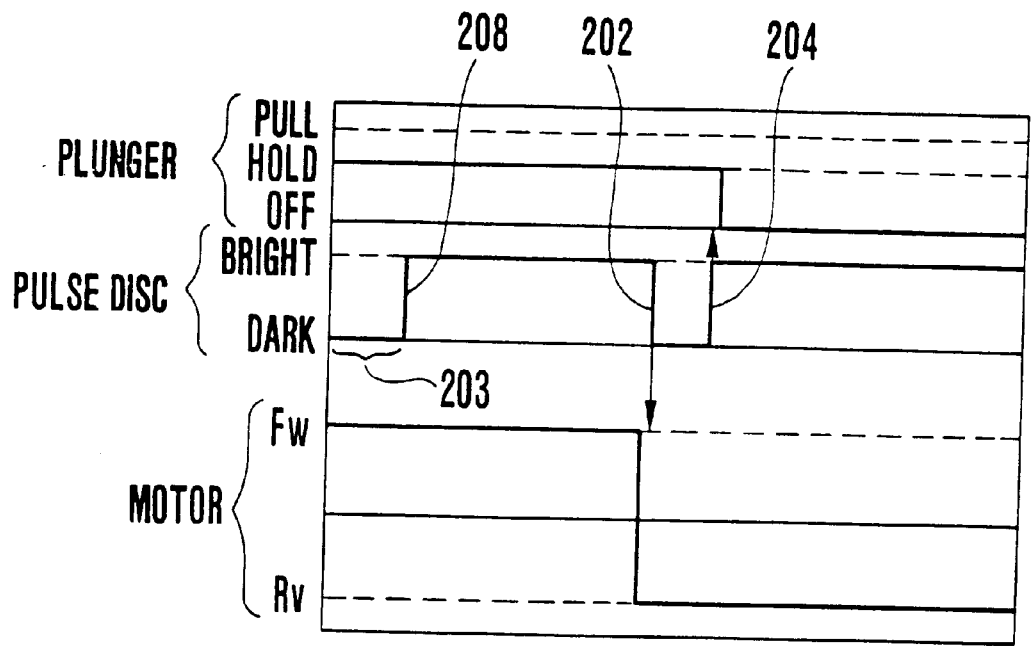
FIGS. 15(a) and 15(b) are timing charts respectively showing the operations shown in FIGS. 14(a) and 14(b)

The "entrance operation" will be described below with reference to FIGS. 14(a) and 15(a).

Figure 6A:
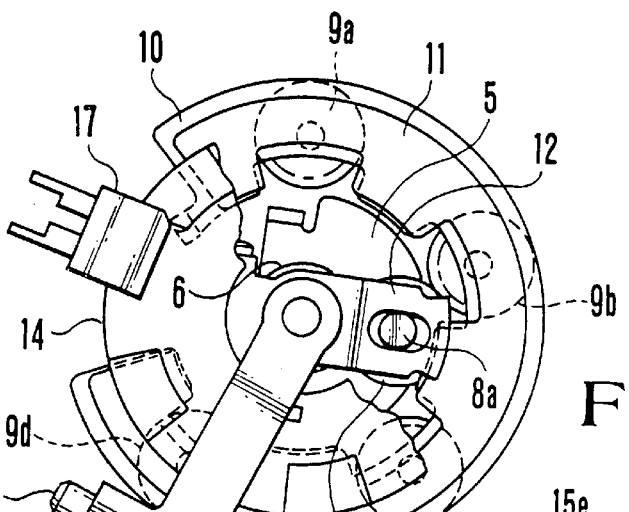
FIGS. 6(a), 6(b) and 6(c) are a plan view and vertical sectional views, respectively, showing the state in which the planetary gear is switched from a region ④ to a region ⑤ in the first embodiment of the present invention.
Figure 6B:
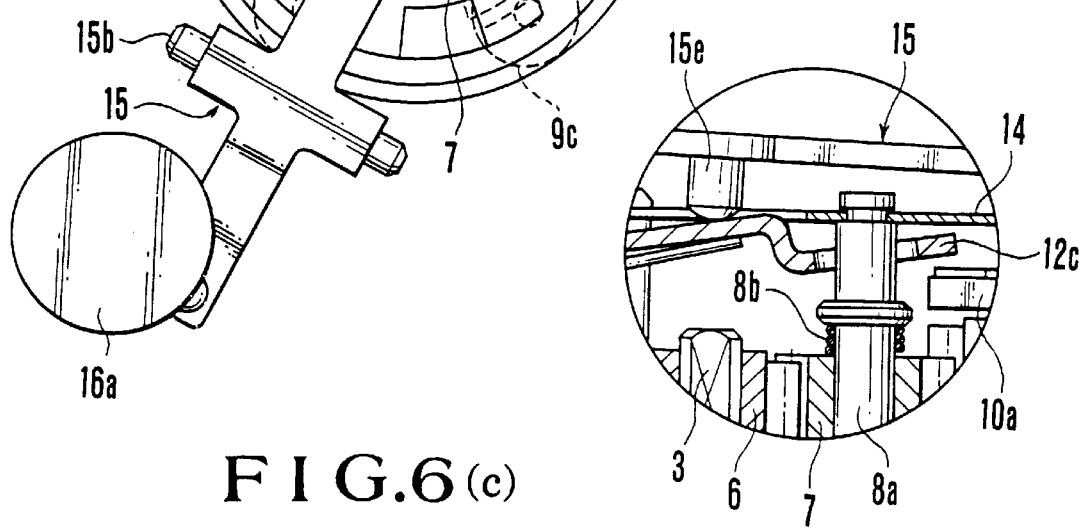
Figure 6C:
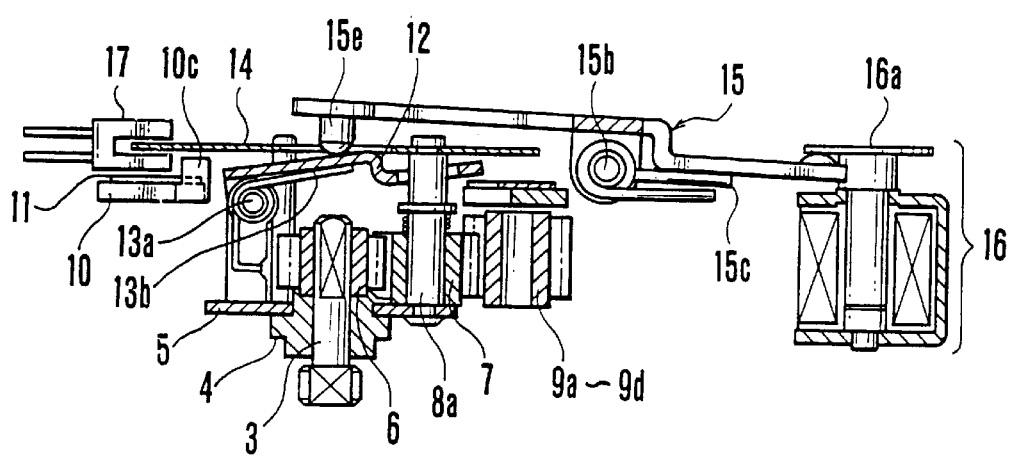
Figure 7A:
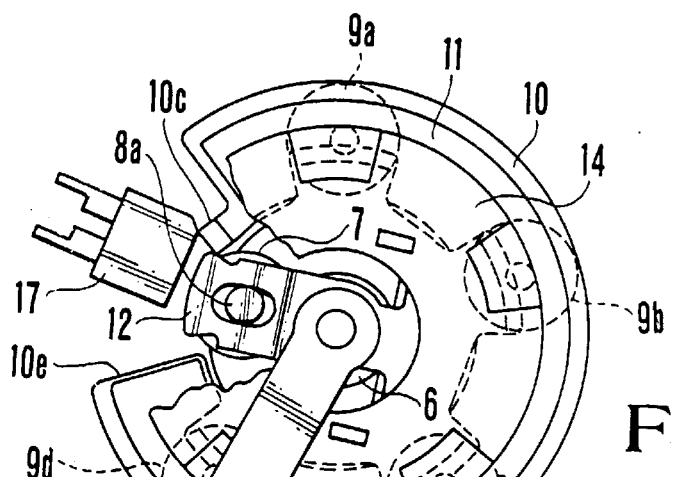
FIGS. 7(a), 7(b) and 7(c) are a plan view and vertical sectional views, respectively, showing the state in which the planetary gear is located in the region X in the first embodiment of the present invention.
Figure 7B:
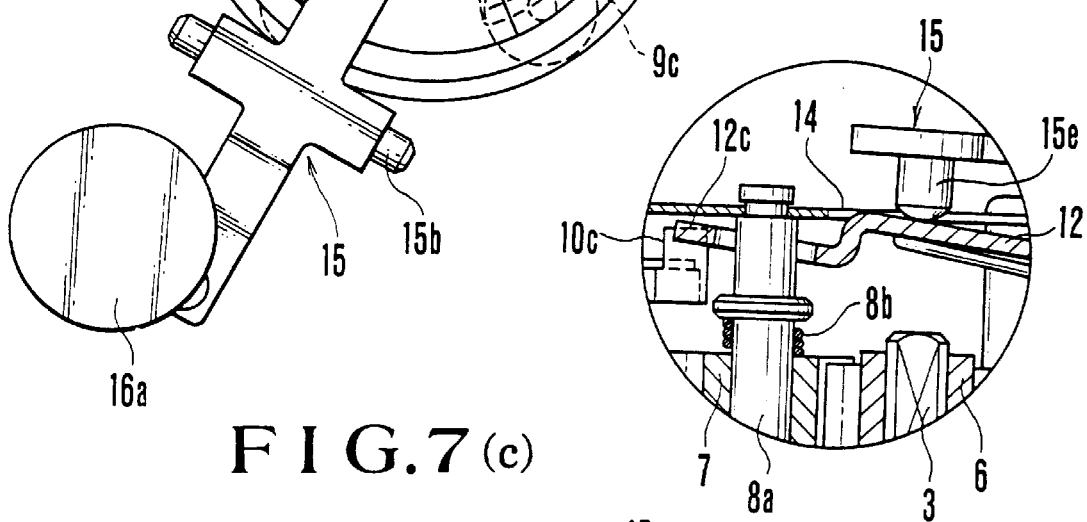
Figure 7C:
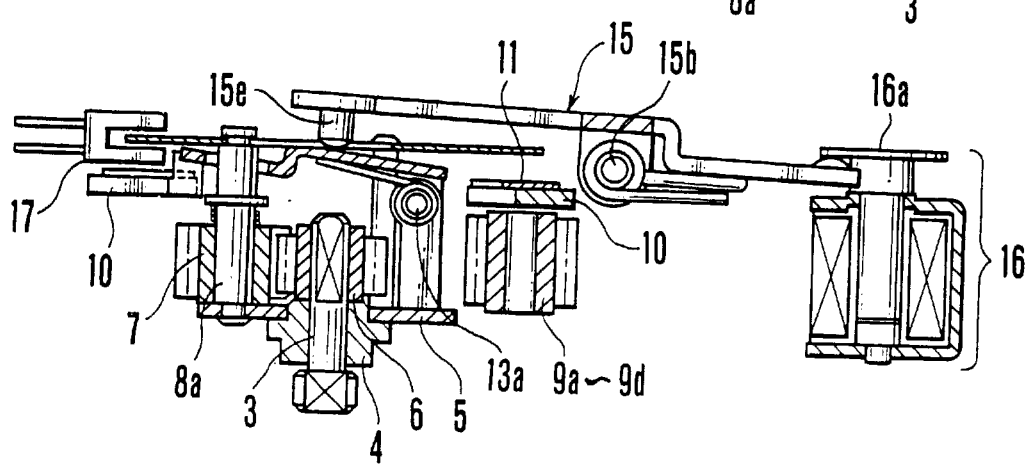

When the planetary gear 7 is made to revolve from the region ④ in the "Fw" direction with the movable yoke 16a of the plunger 16 pulled, the planetary gear 7 enters the region ⑤ during the detection of a "dark" signal 203 indicative of the region ④, and a "bright" signal 208 indicative of the region ⑤ is detected. If the pulling operation of the plunger 16 is continued to make the planetary gear 7 revolve further in the "Fw" direction, the planetary gear 7 moves out of the region ⑤ and a "dark" signal 202 indicative of the region ⑥ is detected. In response to the "dark" signal 202, the motor 1 is driven to rotate in the "Rv" direction, that is, the revolution of the planetary gear 7 in the "Rv" direction is started. Then, since a "bright" signal 204 indicating that the planetary gear 7 has entered the region ⑤ is detected, the pulling operation of the plunger 16 is stopped in response to the "bright" signal 204. At this point in time, the end portion 12c of the rotation-stopping arm 12 is positioned on the holding stopper 11 (the state shown in FIGS. 8(a), 8(b) and 8(c)). During this time, the rotation-stopping arm 12 and the holding stopper 11 are in face-to-face contact with each other (in the position shown at 205) and the rotation-stopping arm 12 rotates in frictional contact with the holding stopper 11. If the frictional force is larger than the revolving force of the planetary gear 7, the rotating arm 5, the rotation-stopping arm 12 and so on may stop rotating. For this reason, timing to stop the pulling operation of the plunger 16, that is to say, the angular extent of opening of each bright pattern segment 14e of the pulse disc 14, that is, the width of each of the regions ①, ③, ⑤ and ⑦, must be detected in the following manner:

"If the planetary gear 7 is positioned at one end of the region ⑤ as shown in FIGS. 6(a), 6(b) and 6(c), the planetary gear 7 is necessarily in mesh with the output gear 9b".

In the above-described arrangement, if the planetary gear 7 is positioned in the region ⑤, the planetary gear 7 revolves while rotating not by a revolving force generated by the spring 8b but by engagement with the sun gear 6 or the output gear 9b. In this manner, the planetary gear 7 revolves in the "Rv" direction irrespective of the friction due to the face-to-face contact between the rotation-stopping arm 12 and the holding stopper 11. Thus, the end portion 12c of the rotation-stopping arm 12 reliably comes out of contact with the holding stopper 11, passes through the cutout of the exit stopper 11 (the space defined between the end faces 11a and 11b), and engages with the end face 10b in the cutout of the crown stopper 10. At the same time that the revolution of the planetary gear 7 in the "Rv" direction is stopped, only the rotation of the planetary gear 7 is started, whereby the output gear 9b starts rotating. In the above-described manner, if the direction of revolution of the planetary gear 7 (the "Rv" direction in FIG. 14(a)) is made the same as the desired direction of rotation of the output gear 9b, the motor 1 may be driven in the same direction during the period from the time the pulling operation of the plunger 16 is stopped until the time the revolution of the planetary gear 7 is stopped by the crown stopper 10 and the desired one of the output gears 9a to 9d starts rotating. If the signal 204 indicative of the transition from the "bright" level to the "dark" level when the planetary gear 7 moves from the region ⑥ to the region ⑤ is detected in the above-described manner, it is possible to detect indirectly but reliably whether the end portion 12c of the rotation-stopping arm 12 has entered the cutout of the crown stopper 10.

Figure 15B:
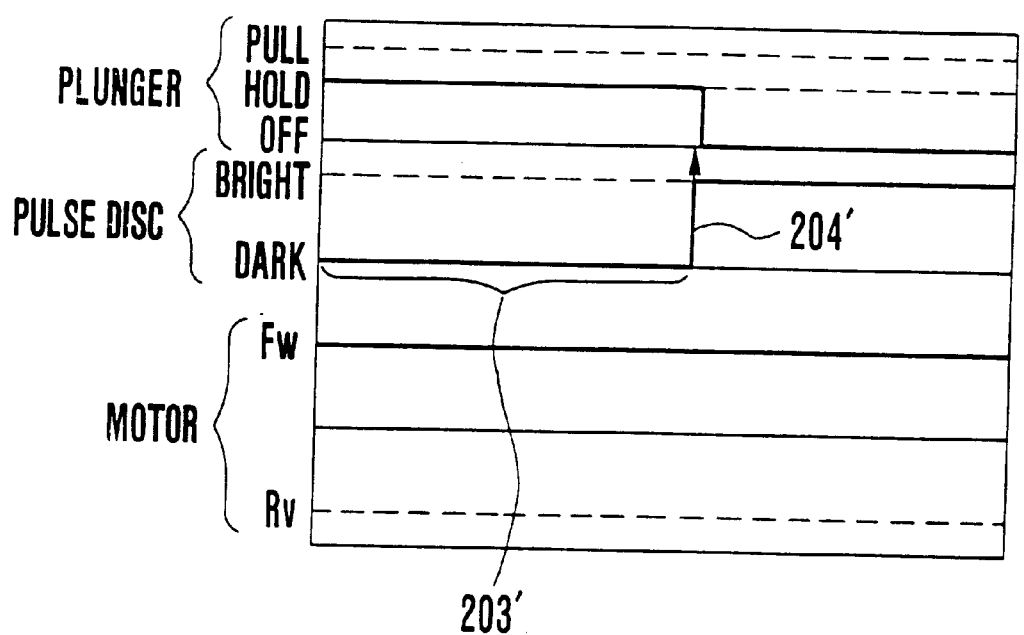

FIGS. 14(b) and 15(b) are views showing a case where the direction of revolution of the planetary gear 7 is the same as the direction of rotation of the desired one of the output gears 9a to 9d. In this case, an operation is performed which is substantially the same as that performed subsequently to the detection of a signal indicative of the transition of the signal 204 from the "dark" level to the "bright" level, which signal 204 indicates that the planetary gear 7 has meshed with the one of the output gears 9a to 9d to which power is transmitted. The signal indicative of the transition from the "dark" level to the "bright" level is a signal 204' in FIGS. 14(b) and 15(b).

The foregoing is a description of the "entrance operation".

As described above, if the direction of power transmission (rotation) of the desired one of the output gears 9a to 9d to which power dividing is to be directed is made the same as the revolving direction of the planetary gear 7, there is no need to change the direction of rotation of the motor 1. Accordingly, the desired one of the output gears 9a to 9d does not rotate in the reverse direction, and the desired mechanism to which the power is to be transmitted does not operate in the reverse direction. In addition, it is possible to reliably select the desired one to which the power dividing is to be directed.

Figure 17:
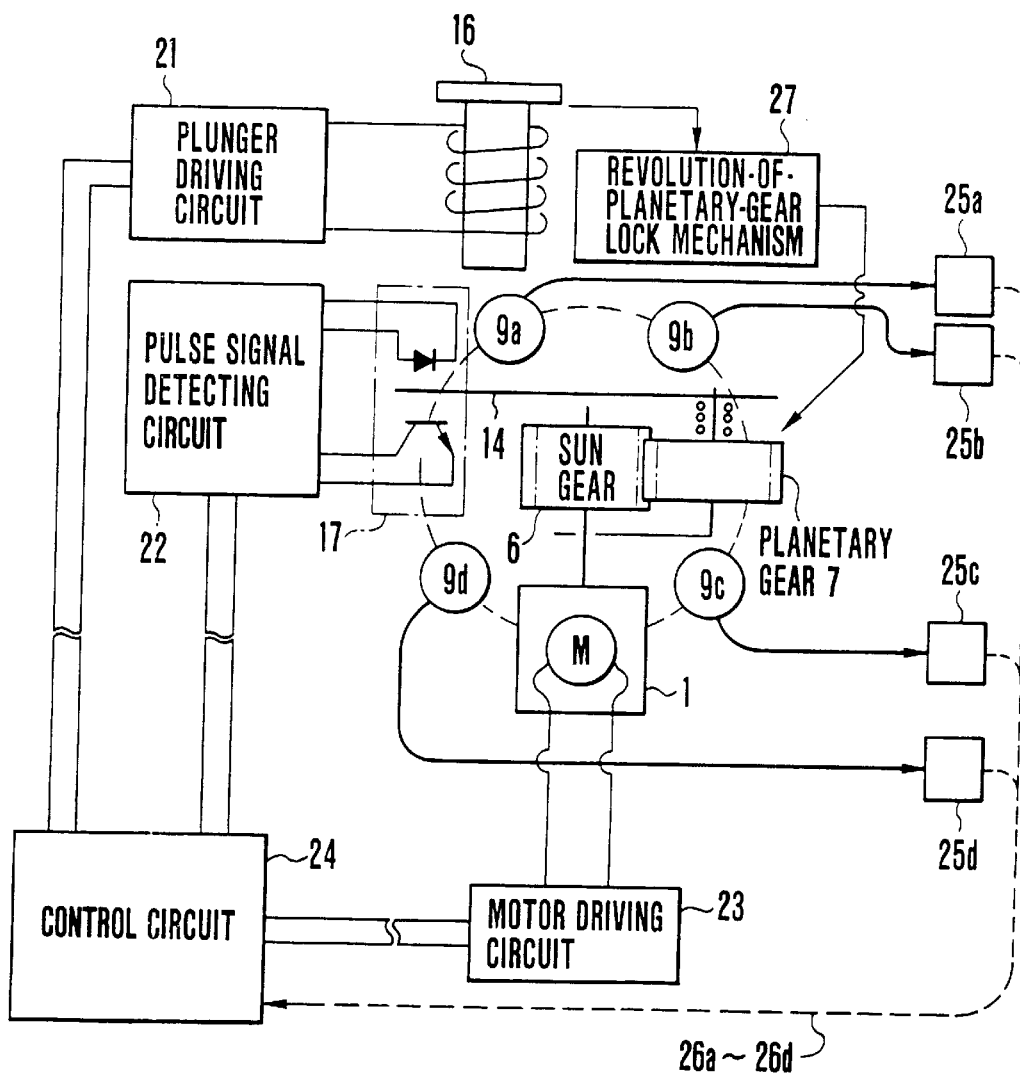
FIG. 17 is a circuit block diagram showing the essential construction of the camera in which the device according to the first embodiment of the present invention is incorporated.

FIG. 17 is a schematic view showing the essential circuit blocks and mechanical parts of a camera provided with the device according to the first embodiment shown in FIG. 16 and described above with reference to FIGS. 1 to 15(a), 15(b).

The camera shown in FIG. 17 includes a plunger driving circuit 21 for turning on or off the plunger 16, a pulse signal detecting circuit 22 for detecting the output pulse of the photocoupler 17, and a motor driving circuit 23 for turning on or off the motor 1 shown in several figures such as FIG. 1 and for providing control relative to rotation in the "Rv" direction and rotation in the "Fw" direction. The circuits 21, 22 and 23 are controlled by a control circuit 24. The shown camera also includes the output gears 9a to 9d described previously, and the power of a desired one of the output gears 9a to 9d is transmitted to the corresponding one of the mechanisms (a lens-barrel driving system and a film-transportation driving system) 25a to 25d through the associated gear train (not shown but represented by a thick line), as described previously with reference to FIG. 16. The resultant signal 26a, 26b, 26c or 26d is fed back to the control circuit 24. The shown camera also includes a revolution-of-planetary-gear lock mechanism 27 made up of elements such as the arm 15, the rotation-stopping arm 12, the crown stopper 10 and the holding stopper 11.

The present device can be effectively utilized to achieve a number of advantages. Such advantages will be described below before a description of the operation of the control circuit 24.

Advantage 1

If the helicoid gear 310 for making the lens barrel 314 retract is erroneously rotated with the lens barrel 314 retracted, that is, when the camera is placed in a non-photographic state with its main switch off, the lens barrel 314 may move outward by accident. For this reason, when the main switch is off, the planetary gear 7 is held in mesh with the output gear 9a within the region ⑦. In this arrangement, since the gear train 310a which constitutes a system for moving the lens barrel 314 forward does not idle if the motor 1 is not activated, it is possible to prevent the lens barrel 314 from moving outward from a retracted position. However, as described previously in connection with the "exit operation", if it is impossible to determine in which direction ("Fw" or "Rv") the end portion 12c of the rotation-stopping arm 12 is urged in engagement with the end face of the cutout of the crown stopper 10, the "exit operation" may fail when the "initial positioning" is to be performed, as by turning on the main switch. For this reason even after the completion of a retracting operation, to prevent backlash from occurring among gears or other associated parts, they must be urged in their positions in the directions in which they were respectively made to rotate during the retracting operation, and the lens barrel 314 must be fully urged in the retracting direction in its retracted position.

Manual rewinding of the film F may be performed with the main switch off, and during the manual rewinding, the planetary gear 7 is meshed with the output gear 9d. If the planetary gear 7 is to be returned to its standby position in the region ⑦ after the completion of the manual rewinding, the planetary gear 7 must be stopped in the region ⑦ in such a way that, in the case of the "entrance operation", it can enter the region ⑦ in a manner similar to that performed for a retracting operation.

As is apparent from the above description, since the motor 1 is stopped with the planetary gear 7 in mesh with an arbitrary one of the output gears 9a to 9d, a gear train extending from the gear in mesh is prevented from idling and the mechanism of an element to which power is to be transmitted can be locked, whereby occurrence of an unwanted operation can be prevented.

The above-described process is similarly performed during normal photography (the main switch off), and the planetary gear 7 remains in mesh with the gear 9c which is coupled to the zoom driving gear 312. In a zooming operation, the motor 1 is driven to rotate in the "Fw" or "RV" direction with the planetary gear 7 in mesh with the gear 9c. When film winding after a shutter release operation is to be performed, the planetary gear 7 is made to mesh with the output gear 9d coupled to the film-transportation driving system for the purpose of performing the film winding. After the completion of the film winding, the planetary gear 7 is again made to mesh with the output gear 9c. The reasons why the above-described operation is needed are that what an operator can easily touch among the mechanism parts of the camera when the main switch is on is the lens barrel 314 or the lens tube 316 as viewed in FIG. 16, and that the lens barrel 316 easily moves at a touch. However, in the state wherein the planetary gear 7 is in mesh with the output gear 9c, the lens barrel 314 does not move since it is fixed by the bayonet ring 311.

Figure 24:
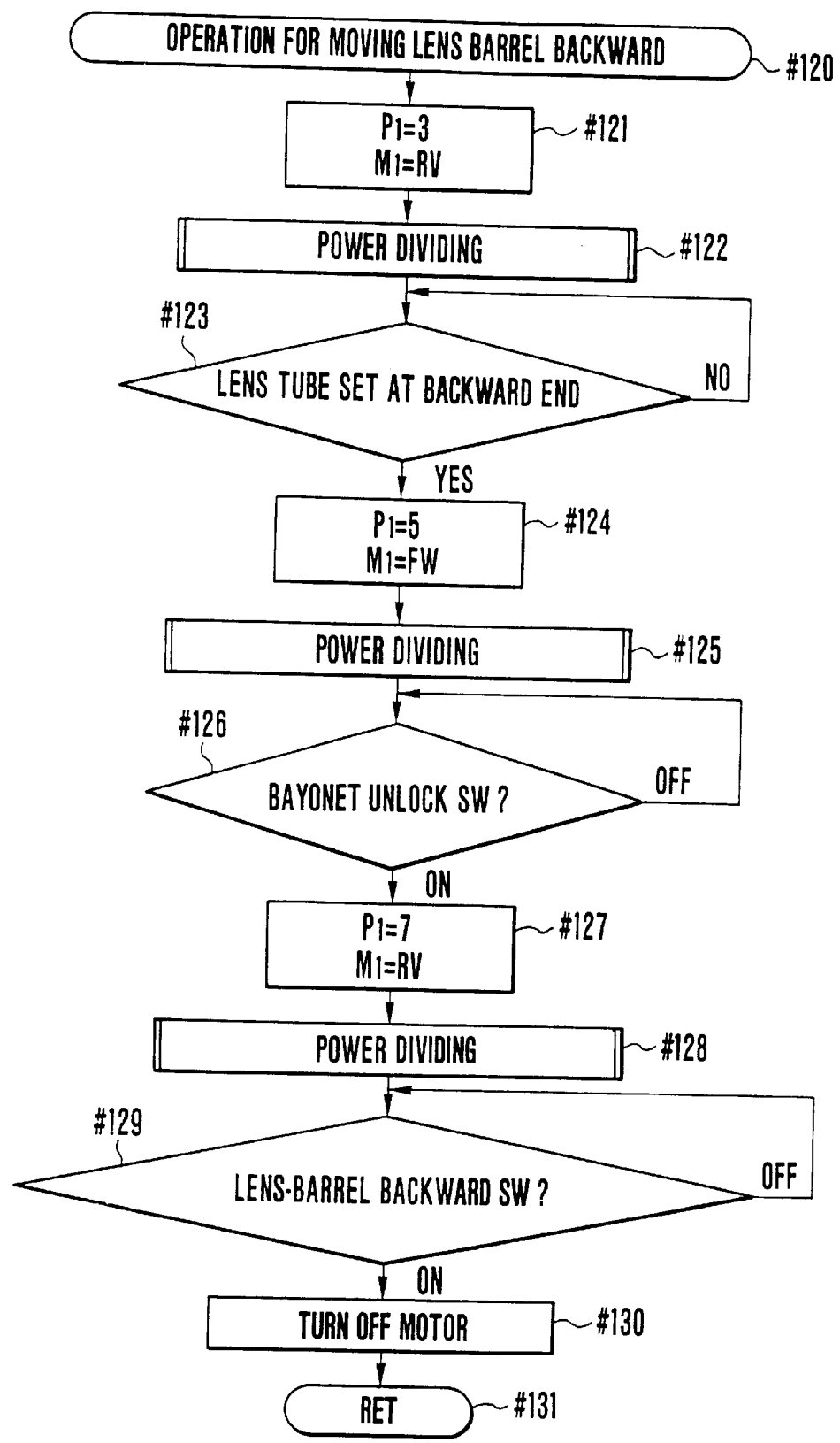
FIG. 24 is a flowchart showing the operation named "OPERATION FOR MOVING LENS BARREL BACKWARD" of the control circuit 24 of FIG. 17.

The above-described two kinds of gear locking are performed in accordance with the flow "OPERATION OF MOVING LENS BARREL BACKWARD" of FIG. 24 and the flow "ZERO POSITION" of FIG. 30, both of which will be described later.

As described above, after the completion of power transmission, the planetary gear 7 remains in mesh with any one of the output gears 9a to 9d or is combined with an arbitrary output gear, whereby a mechanism extending from the output gear in mesh is prevented from idling. Accordingly, the present device may be regarded not only as a device for merely effecting power transmission but also as a lock device for locking the operation of each mechanism.

Advantage 2

During normal photography, after film winding has been performed for each shutter release operation, the planetary gear 7 is placed in mesh with the output gear 9c so that the lens tube 316 is not moved except for a zooming operation. However, during a continuous photography mode, since no zooming operation is performed, the planetary gear 7 remains in mesh with the output gear 9d and the start and stop of the motor 1 are repeated.

As described above, since a normal control mode (for the normal photography) and a continuous power transmission mode (for the continuous photography mode) are provided, during the continuous power transmission mode, the start and stop of the motor 1 need only be repeated and the plunger 16 or the photocoupler 17 need not be made to perform an unessential operation. Accordingly, only a power transmission operation is needed and a power dividing operation can be omitted.

Advantage 3

In accordance with the present invention, it is possible to select arbitrarily an element to which power is to be transmitted, unlike a conventional power transmission and distributing mechanism in which an element to which power is to be transmitted is selected sequentially in time by using a differential mechanism or the like. As a result, there is also a possibility that an error in the selection of an element to which power is to be transmitted (dividing error) will occur. In the case of a dividing error, as described above, the state of the dividing error can be identified from the drive signals 26a to 26d which are fed back to the control circuit 24 shown in FIG. 17.

As is apparent from the above description, by providing a routine which is designed to perform, if a dividing error occurs, the "initial positioning" operation and again select an appropriate element to which power dividing is to be directed, it is possible to achieve the advantage that if the power dividing mechanism malfunctions, optimum restoration processing can be performed.

If the planetary gear 7 does not correctly operate and meshes with a wrong one of the output gears 9a, 9b, 9c or 9d although the "initial positioning" operation is performed several times, it is preferable that an "inhibit mode" for making the camera inoperative be provided.

The operation of the control circuit 24 shown in FIG. 17 will be described below with reference to FIGS. 18 to 31.

First, the outline of a series of operations of the camera will be described below with reference to the main flowchart of FIG. 18.

Step #70: If battery replacement is performed, all information is reset, and information indicating in which of the regions X to ⑧ the planetary gear 7 is positioned is cancelled. Accordingly, the "initial positioning" operation is performed (which will be described later in detail with reference to FIG. 19).

Step #71: It is determined whether the main switch is on. If it is on, the process proceeds to Step #72, while if it is off, the process proceeds to Step #82.

Step #72: It is determined whether the lens barrel 314 is placed in its forward position. If the lens barrel 314 is placed in the forward position and photography can be performed, the process proceeds to Step #73. If the lens barrel 314 is placed in its retracted position, the process proceeds to Step #79 "OPERATION FOR MOVING LENS BARREL FORWARD".

Step #73: It is determined whether a shutter release switch is on or off. If it is on, the process proceeds to Step #84 to perform the operations, such as exposure and winding operations, shown in Step #84 and the subsequent steps. If it is off, the process proceeds to Step #74.

Steps #74 and #75: It is determined whether a telephoto switch or a wide-angle switch is on or off. If either is on, the process proceeds to Step #80 or #81 to perform a telephoto zooming operation or a wind-angle zooming operation. If both are off, the process proceeds to Step #76.

Step #76: It is determined whether a manual rewinding switch is on or off. If it is off, the process proceeds to Step #77, while if it is on, the process proceeds to Step #91 to perform the operations shown in Step #91 and the subsequent steps.

Step #77: It is determined whether a back lid has been opened or closed. If it is determined that a closing operation has been performed, the process normally proceeds to Step #78 "AUTOMATIC LOADING" to perform a film loading operation. If not, the process returns to Step #71.

Step #78: An automatic loading operation is performed (as will be described later in detail with reference to FIG. 25).

Step #79: An operation for moving the lens barrel 314 forward is performed (as will be described later in detail with reference to FIG. 23).

Step #80: The telephoto zooming operation is performed (as will be described later in detail with reference to FIG. 26).

Step #81: The wide-angle zooming operation is performed (as will be described later in detail with reference to FIG. 27).

Step #82: Since it has been determined in Step #71 that the main switch is off, it is determined whether the lens barrel 314 is placed in its retracted position. If the lens barrel 314 is not retracted, the process proceeds to Step #83 "OPERATION FOR MOVING LENS BARREL BACKWARD". If the lens barrel 314 has been retracted, it is determined that the main switch is off under normal conditions, and the process proceeds to Step #76 described previously.

Step #83: The operation for moving the lens barrel 314 backward is performed (as will be described later in detail with reference to FIG. 24).

Steps #84 and #85: Normal exposure and winding operations of the film F are performed. The details of the winding operation will be described later with reference to FIG. 28.

Step #86: After the film F has been wound up to the trailing end, it is determined whether the film F is in a stretched state. If the film F is in the stretched state, the process proceeds to step #91, while if it has been wound up normally, the process proceeds to Step #87.

Step #87: It is determined whether a continuous shooting mode switch is on or off. If it is off, this indicates that a single-frame photography mode has been selected, and the process proceeds to Step #89. If a continuous shooting mode has been selected, the process proceeds to Step #88.

Step #88: It is determined whether the shutter release switch remains on. If it is on, the process returns to Step #71 to carry on continuous shooting, and a photographic operation similar to the above-described operation is repeated. If the shutter release switch is turned off, the continuous shooting is stopped, and the process proceeds to Step #89, as in the case of the single-frame photography mode.

Step #89: After a photographic operation such as the exposure operation, the zooming operation or the manual rewinding operation has been completed with the camera on, a zero-positioning operation is performed in which the lens tube 316 is locked with the planetary gear 7 meshed with the gear train 312a of the lens-barrel driving system.

Step #90: It is determined whether the shutter release switch is off, and the process stays in this step until it is turned on.

The "initial positioning" operation will be described below with reference to FIG. 19.

Step #1: The process jumps to this subroutine from Step #70 or #91 of FIG. 18 or from Step #141 or #147 of FIG. 25, and the "initial positioning" operation shown in Step #2 and the subsequent steps is started.

Step #2: The plunger 16 is turned on (activated) via the plunger driving circuit 21. The rotation-stopping arm 12 has not yet disengaged from the crown stopper 10 and is engaged with the aforementioned "edge portion" of the holding stopper 11 (the state shown in FIGS. 10(a) and 10(b)).

Step #3: To remove the backlash of the gears and to disengage the rotation-stopping arm 12 from the holding stopper 11, the motor 1 is driven to rotate in a direction reverse to the immediately preceding direction of rotation before the "initial positioning" operation (as will be described later in detail with reference to FIG. 20) is started.

Steps #4 to #7: The planetary gear 7 is made to revolve up to the region ⑧, and the end portion 12c of the rotation-stopping arm 12 is brought into abutment with the erected portion 10c of the crown stopper 10 (the state shown in FIGS. 5(a), 5(b) and 5(c)).

In Steps #4 to #7, the operation of detecting the position of the planetary gear 7 during revolution by means of the pulse disc 14 is not carried out. Instead, the motor 1 is driven to rotate unconditionally for a sufficient time (in this example, 500 msec) for the planetary gear 7 to revolve in one direction from the region X to the region ⑧ or vice versa, thereby merely bringing the end portion 12c of the rotation-stopping arm 12 into abutment with the erected portion 10c of the crown stopper 10. Thus, the planetary gear 7 is capable of moving directly to the region ⑧, or of first moving toward the region X and then reversing to the region ⑧, depending on the direction in which the end portion 12c exits from the cutout of the crown stopper 10.

Step #8: Since the planetary gear 7 is positioned in the region ⑧, "8" is substituted into a register n. In this step, however, the positioning of the planetary gear 7 in the region ⑧ is not based on pulse counting, and it is merely assumed that the planetary gear 7 ought to be positioned in the region ⑧ as a result of the unconditional rotation of the motor 1. If the planetary gear 7 is actually not positioned in the region ⑧, this indicates the occurrence of a rotation failure of the rotating arm 5 or other elements and hence the occurrence of an operation failure of the power dividing device.

Step #9: The motor 1 is driven to rotate in the "Rv" direction, thereby causing the planetary gear 7 to revolve from the region ⑧ to the region X (the initial position 10d).

Step #10: A pulse transition is detected in this step. Specifically, while the planetary gear 7 is revolving from the region ⑧ to the region X, each time a pulse transition from the "bright" level to the "dark" level or vice versa is detected, the value of the register n is decremented by one. If n=0 is reached and the planetary gear 7 enters the region X or no pulse transition occurs during a predetermined time period, the process proceeds to Step #11. The details of the operation in Step #11 will be described later with reference to FIG. 21.

Step #11: It is determined that the end portion 12c of the rotation-stopping arm 12 has entered the area between the end face 10e and the erected portion 10c of the crown stopper 10, and the drive of the sun gear 6 and the motor 1 is stopped.

Step #12: It is determined whether the "initial positioning" operation has been correctly performed. If the planetary gear 7 correctly revolves from the region ⑧ to the region X, pulse transitions occur eight times. In this step, therefore, the value of the register n should be "0". However, if the revolution of the planetary gear 7 is hindered for a certain reason, "n≧1" (n≠0) is obtained. If "n=0", the process proceeds to Step #13, while if "n≧1", the process proceeds to Step #14.

Step #13: Since the "initial positioning" operation has been correctly performed, the planetary gear 7 is positioned in the region X, more specifically, in the region of the initial position 10d. Therefore, the region (position), P0, where the planetary gear 7 is positioned is assigned "0".

Step #14: Since the "initial positioning" operation has not been correctly performed, it is determined that the planetary gear 7 has failed to revolve correctly, and an inhibit mode is selected.

Step #15: This subroutine is brought to an end, and the process returns to the main routine.

Figure 20:
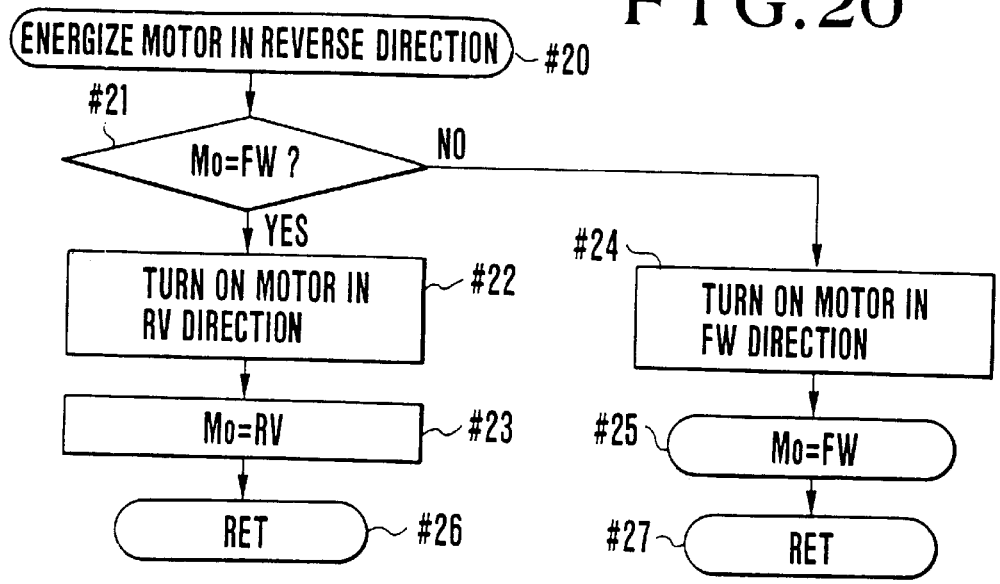
FIG. 20 is a flowchart showing the operation named "ENERGIZE MOTOR IN REVERSE DIRECTION" of the control circuit 24 of FIG. 17.

The operation named "ENERGIZE MOTOR IN REVERSE DIRECTION" will be described below with reference to FIG. 20.

Step #20: In Step #3 of FIG. 19 or Step #39 of FIG. 22, the process jumps to this subroutine, and starts the operation named "ENERGIZE MOTOR IN REVERSE DIRECTION", shown in Step #21 and the subsequent steps.

Steps #21, #22 and #24: The present direction of rotation of the motor 1, or, if the motor 1 is inoperative, the preceding direction of rotation of the same, is identified. The motor 1 is driven in a direction reverse to the identified direction of rotation.

Steps #23 and #25: The new direction of rotation is memorized as the present direction of rotation.

Step #26 and #27: This subroutine is brought to an end, and the process returns to the main routine.

Figure 21:
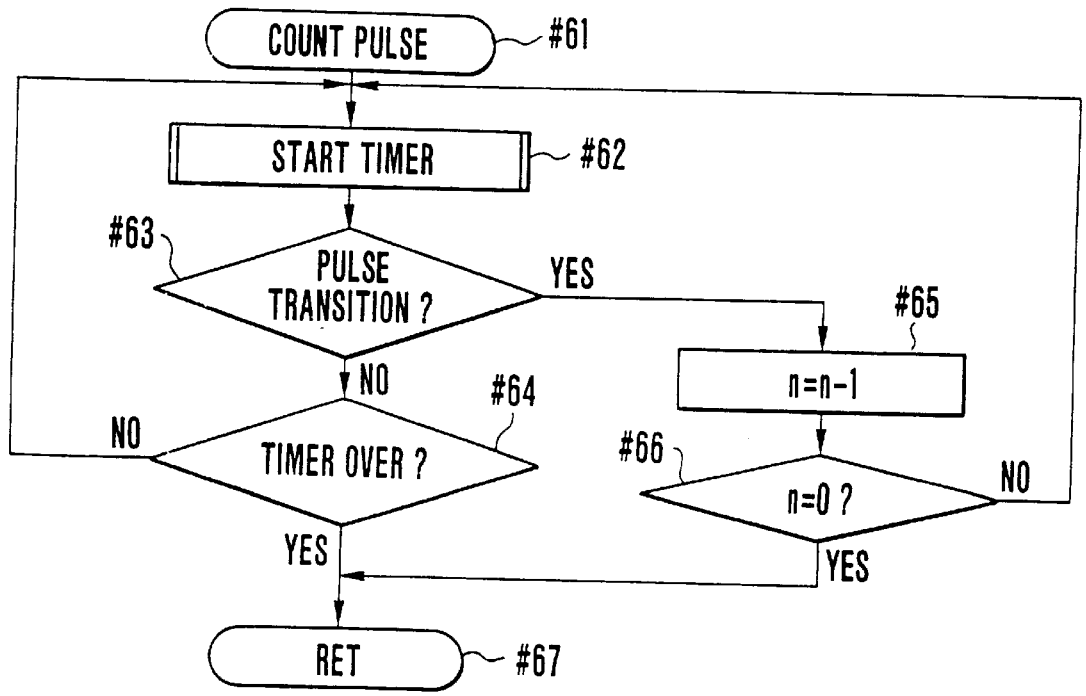
FIG. 21 is a flowchart showing the operation named "COUNT PULSE" of the control circuit 24 of FIG. 17.

The operation named "COUNT PULSE" will be described below with reference to FIG. 21.

Step #61: In Step #10 of FIG. 19 or in any one of Steps #41, #46, #50 and #54 of FIG. 22, the process jumps to this subroutine, and starts the operation named "COUNT PULSE", shown in Step #62 and the subsequent steps. This subroutine has a flow for counting the number of pulse transitions, and each time a pulse transition of either "bright→dark" or "dark→bright" occurs, a counting operation is performed once. As an initial setting, n is determined as the number of pulse transitions occurring from the start of a particular revolution of the planetary gear 7 in the present state until the end of the revolution.

Step #62: A timer is started each time a pulse transition occurs in order to determine whether no pulse transition occurs during a predetermined time period or more while the revolution of the planetary gear 7 is stopped, for example, while the planetary gear 7 is positioned in the region X or ⑧ and the revolution in the "Fw" or "Rv" direction is stopped in the state shown in FIGS. 5(a), 5(b) and 5(c) or FIGS. 7(a), 7(b) and 7(c), or in a case where the revolution is stopped due to any trouble.

Step #63: A pulse transition from the "dark" level to the "bright" level or vice versa is detected. If no such transition is detected, the process proceeds to Step #64, while if it is detected, the process proceeds to Step #65.

Step #64: If there is no pulse transition, it is determined whether the predetermined time period has elapsed. If the predetermined time period has not elapsed, the process returns to Step #62, where the process waits for a pulse transition. If it has elapsed, the process proceeds to Step #67.

Steps #65 and #66: Since the pulse transition has occurred, the value of the register n which indicates the number of pulse transitions is decremented by one. As a result, if "n=0" is reached, it is determined that the required amount of revolution of the planetary gear 7 has been completed, and the process proceeds to Step #67. This subroutine is brought to an end, and the process returns to the main routine.

Figure 22:
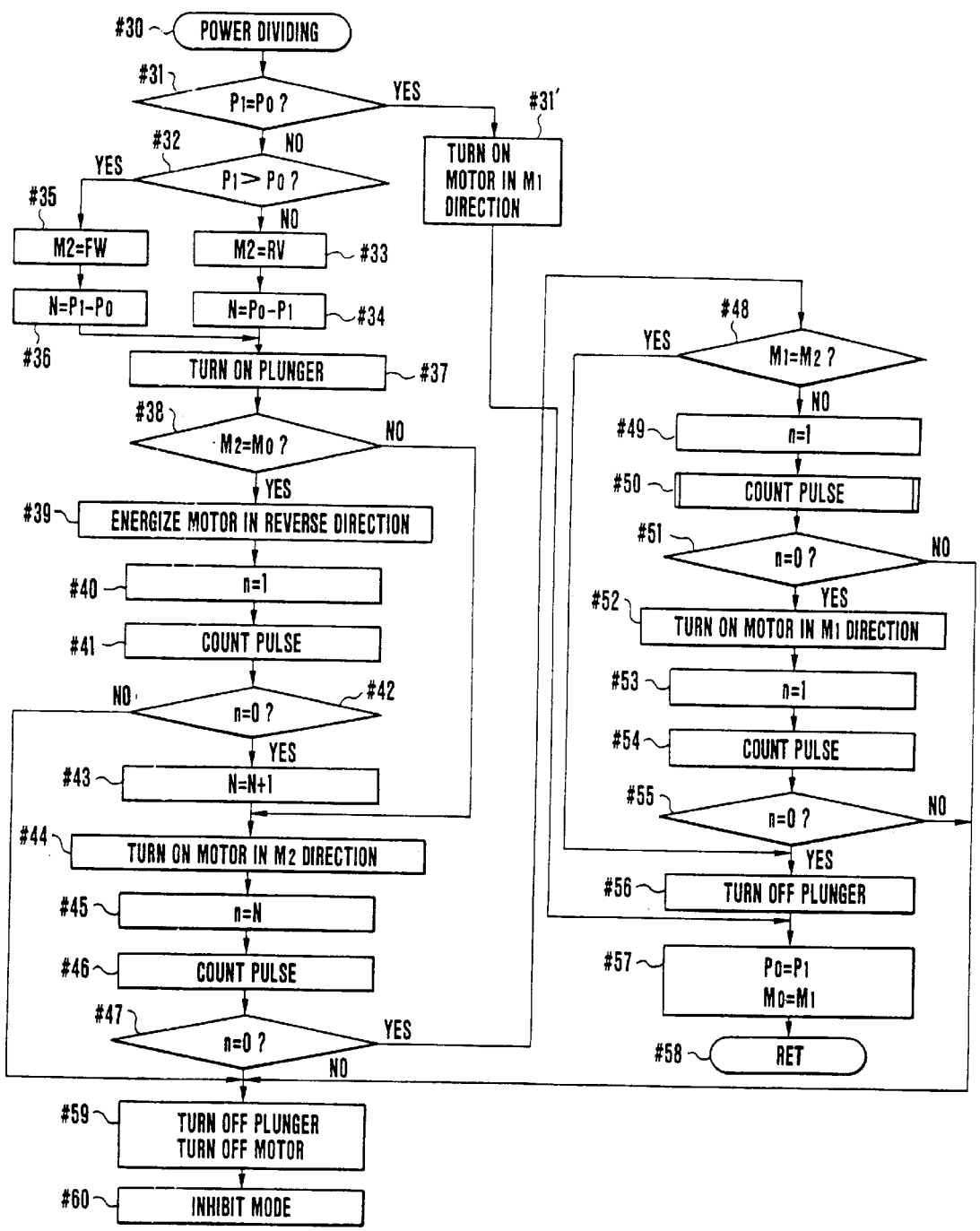
FIG. 22 is a flowchart showing the operation named "POWER DIVIDING" of the control circuit 24 of FIG. 17.

The operation named "POWER DIVIDING" will be described below with reference to FIG. 22, but symbols which will be used in the following description are explained with reference to FIG. 31.

As shown in FIG. 31, P0 indicates a position where the planetary gear 7 is presently located, P1 a position to which the planetary gear 7 is to move, M0 the direction of the past rotation of the motor 1, M1 the direction of motor rotation of a load at the position to which the planetary gear 7 is to move, and M2 the direction in which the rotating arm 5 is moved. The relationships between driving operations, dividing positions and the directions of rotation of the motor 1 are as shown.

Step #30: In Step #102 or #108 of FIG. 23 or in Step #125 or #128 of FIG. 24, the process jumps to this subroutine, and starts the operation named "POWER DIVIDING", shown in Step #31 and the subsequent steps. At the time of this operation, the position P1 of the desired one of the output gears 9a to 9d to which power is to be transmitted and the direction M1 of motor rotation of the desired output gear, are inputted. The output gears 9a to 9d correspond to the positions ⑦, ⑤, ③ and ①, respectively.

Steps #31 and #31': It is determined whether the position (P0) of the output gear with which the planetary gear 7 is presently meshed is the same as the position (P1) of the output gear at the desired position. If both are the same (P0=P1), the motor 1 is driven to rotate in the M1 direction. Otherwise, the process proceeds to Step #32.

Step #32: It is determined in which direction the planetary gear 7 should be made to revolve, that is, whether P1>P0. If P1>P0, the process proceeds to Step #35; otherwise, the process proceeds to Step #33.

Steps #33 to #36: The direction M2 of rotation of the rotating arm 5 (i.e., the direction of revolution of the planetary gear 7) is set to "Rv" or "Fw". The number of pulse transitions which will occur until the planetary gear 7 reaches the desired one of the output gears 9a to 9d is calculated (P1−P0), and the obtained value is stored in the register N.

Then, the process enters into the "exit operation".

Step #37: The plunger 16 is turned on. If the plunger 16 remains on, the rotation-stopping arm 12 is engaged with the aforementioned "edge portion" of the holding stopper 11.

Step #38: Whether the direction M2 of rotation of the rotating arm 5 is the same as the direction in which the rotation-stopping arm 12 comes into abutment with the crown stopper 10 is determined by determining whether M2=M0. If both are the same, the process proceeds to Step #39 since it is necessary to reverse the motor 1 to remove the backlash as described previously.

Steps #39 to #42: The motor 1 is driven to rotate in a direction reverse to the immediately preceding direction of rotation before the process enters the "exit operation", and a pulse transition ("bright"→"dark") indicating that the rotation-stopping arm 12 has disengaged from the holding stopper 11 is detected (as shown at 201 in FIGS. 12(a) and 13(a)). If no pulse transition is detected, the process proceeds to Step #59 "INHIBIT MODE".

Step #43: Since the rotation-stopping arm 12 has disengaged in the direction reverse to the M2 direction, the pulse transition ("bright"→"dark") is detected once. Therefore, the number of pulse transitions up to the desired one of the output gears 9a to 9d is incremented by one (N+1).

Step #44: Revolution of the planetary gear 7 toward the desired one of the output gears 9a to 9d is started.

In this step, the "exit operation" comes to an end.

Steps #45 to #47: The planetary gear 7 is made to revolve up to a position in which a "dark" pulse appears which immediately precedes a "bright" pulse indicative of the desired one of the output gears 9a to 9d. If such revolution fails and no pulse transition occurs during a predetermined time period, the process proceeds to Step #59.

Then, the process enters the "entrance operation".

Step #48: After the completion of this flow, if the motor 1 is driven to rotate further in the same direction, power is transmitted in that direction of motor rotation. By determining whether M1=M2, it is determined whether the direction M2 in which the rotating arm 5 has rotated (the direction of revolution of the planetary gear 7) is the same as the direction of rotation of the motor 1 during the power transmission. If both are the same, the process proceeds to Step #56; otherwise, the process proceeds to Step #49.

Steps #49 to #51: These steps constitute the initial part of the flow in which the planetary gear 7 starts power transmission after it has passed the desired one of the output gears 9a to 9d and turned the direction of revolution toward the desired output gear. It is checked whether a "dark" signal (shown at 202 in FIGS. 14(a) and 15(a)) indicating that the planetary gear 7 has come out of mesh with the desired one of the output gears 9a to 9d is detected from a "bright" signal indicating that the planetary gear 7 is in mesh with the desired output gear. If such a "dark" signal is not detected, the process proceeds to Step #59, while if it is detected, the process proceeds to Step #52.

Steps #52 to #55: The planetary gear 7 starts turning the direction of revolution toward the desired output gear. The motor 1 is driven to rotate in the direction of power transmission. It is checked whether a "dark→bright" signal (shown at 204 in FIGS. 14(a) and 15(a), as well as shown at 204' in FIGS. 14(b) and 15(b)) is detected which indicates that the planetary gear 7 has meshed with the desired one of the output gears 9a to 9d. If such a "dark" signal is not detected, the process proceeds to Step #59, while if it is detected, the process proceeds to Step #56.

Step #56: The plunger 16 is turned off. Thus, the end portion 12c of the rotation-stopping arm 12 slides on the holding stopper 11 and enters the cutout of the crown stopper 10, so that the revolution of the planetary gear 7 is stopped and only the rotation of the planetary gear 7 on its axis is allowed, thereby causing power transmission to start.

In this step, the "entrance operation" is brought to an end.

Step #57: The position P0 where the planetary gear 7 is presently located and the direction M0 of rotation of the motor 1 are memorized.

Step #58: This subroutine is brought to an end, and the process returns to the main routine.

Step #59: The plunger 16 and the motor 1 are turned off.

Step #60: The inhibit mode for making the camera inoperative is set.

Figure 23:
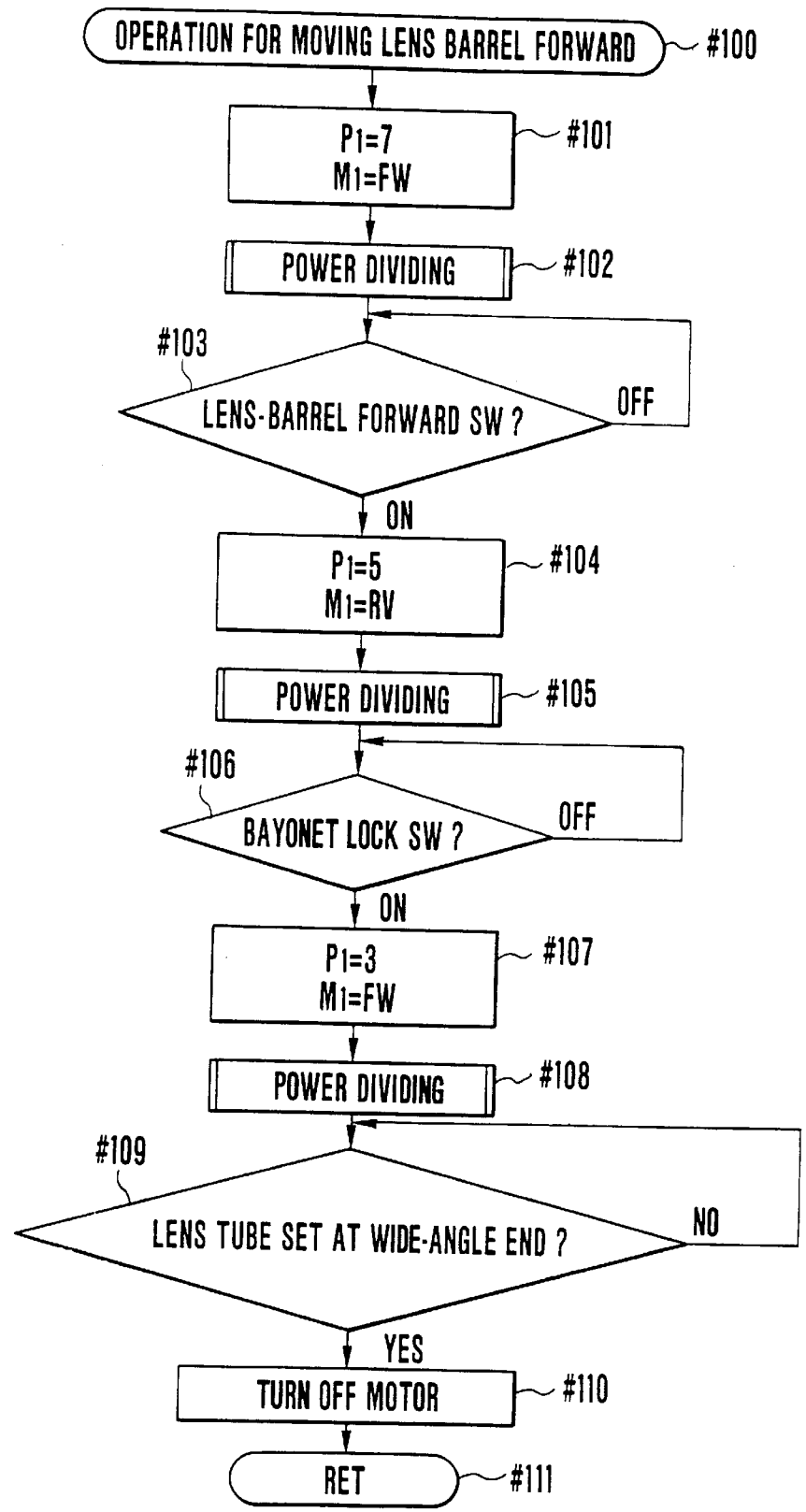
FIG. 23 is a flowchart showing the operation named "OPERATION FOR MOVING LENS BARREL FORWARD" of the control circuit 24 of FIG. 17.

The operation named "OPERATION FOR MOVING LENS BARREL FORWARD" will be described below with reference to FIG. 23.

Step #100: In Step #79 of FIG. 18, the process jumps to this subroutine, and starts the operation named "OPERATION FOR MOVING LENS BARREL FORWARD" shown in Step #101 and the subsequent steps.

Steps #101 and #102: The helicoid gear 310 is made to rotate, causing the planetary gear 7 to revolve in the direction in which the lens barrel 314 moves forward (P1=7, M1=Fw), thereby meshing the planetary gear 7 with the output gear 9a and transmitting power through the gear train 310a.

Step #103: The motor 1 is driven to rotate until the forward movement of the lens barrel 314 has been completed. If the completion is detected, the process proceeds to Step #104.

Steps #104 to #106: The driving operation is specified as "P1=5, M1=Rv" so that the bayonet ring 311 is made to rotate in the lock direction, and the motor 1 is driven to rotate until the bayonet ring 311 fixes the lens barrel 314 by means of the power transmitted through the gear train 311a from the output gear 9b.

Steps #107 to #110: The zoom driving gear 312 is made to rotate, thereby moving the lens tube 316 forward up to its wide-angle end by means of the cam ring 315.

Step #111: This subroutine is brought to an end, and the process returns to the main routine.

The operation named "OPERATION FOR MOVING LENS BARREL BACKWARD" will be described below with reference to FIG. 24.

Step #120: In Step #83 of FIG. 18, the process jumps to this subroutine, and starts the operation named "OPERATION FOR MOVING LENS BARREL BACKWARD" shown in Step #121 and the subsequent steps.

Steps #121 to #123: "P1=3, M1=Rv" is specified to cause the planetary gear 7 to revolve and mesh with the output gear 9c, thereby causing the zoom driving gear 312 to rotate so that the lens tube 316 is moved into the lens barrel 314 by means of the cam ring 315.

Steps #124 to #126: "P1=5, M1=Fw" is specified to cause the planetary gear 7 to revolve and mesh with the output gear 9b, thereby causing the bayonet ring 311 to rotate so that the lens barrel 314 is unlocked.

Steps #127 to #129: "P1=7, M1=Rv" is specified to cause the planetary gear 7 to revolve and mesh with the output gear 9a, thereby causing the helicoid ring 310 to rotate so that the lens barrel 314 is retracted.

Step #130: The motor 1 is turned off with the backlash of the gear train 310a remaining in a direction corresponding to the backward movement of the lens barrel 314. Thus, the lens barrel 314 is prevented from moving outward by accident.

Step #131: This subroutine is brought to an end, and the process returns to the main routine.

The operation named "AUTOMATIC LOADING" will be described below with reference to FIG. 25.

Step #140: In Step #78 of FIG. 18, the process jumps to this subroutine, and starts the operation named "AUTOMATIC LOADING", shown in Step #141 and the subsequent steps.

Step #141: The above-described "initial positioning" operation is performed to bring the planetary gear 7 to the initial position.

Steps #142 and #143: "P1=1, M1=Rv" is specified to cause the planetary gear 7 to revolve and mesh with the output gear 9d, causing the planetary gear 7 to rotate so that the output gear 9d is made to rotate in the direction of film winding, thereby performing power transmission. Thus, the planetary gear 304 for film transportation which constitutes a general gear mechanism rotates with a planetary arm 309 for film transportation and meshes with a winding gear (not shown), thereby causing a spool 305 to rotate. Thus, winding of the film F from a film cartridge 313 is started.

Steps #144 to #146: Normal automatic loading is performed.

Steps #147 and #149: These steps constitute a flow which is executed if the automatic loading fails. The "initial positioning" operation is performed, and the back lid is usually opened since it is necessary to again put the film F in position. When it is opened, the process proceeds to the next step.

Step #148: This step constitutes a flow through which the process proceeds when the automatic loading is to be completed, and the operation named "ZERO POSITION" is performed (as will be described below in detail with reference to FIG. 30).

Step #150: This subroutine is brought to an end, and the process returns to the main routine.

Figure 26:
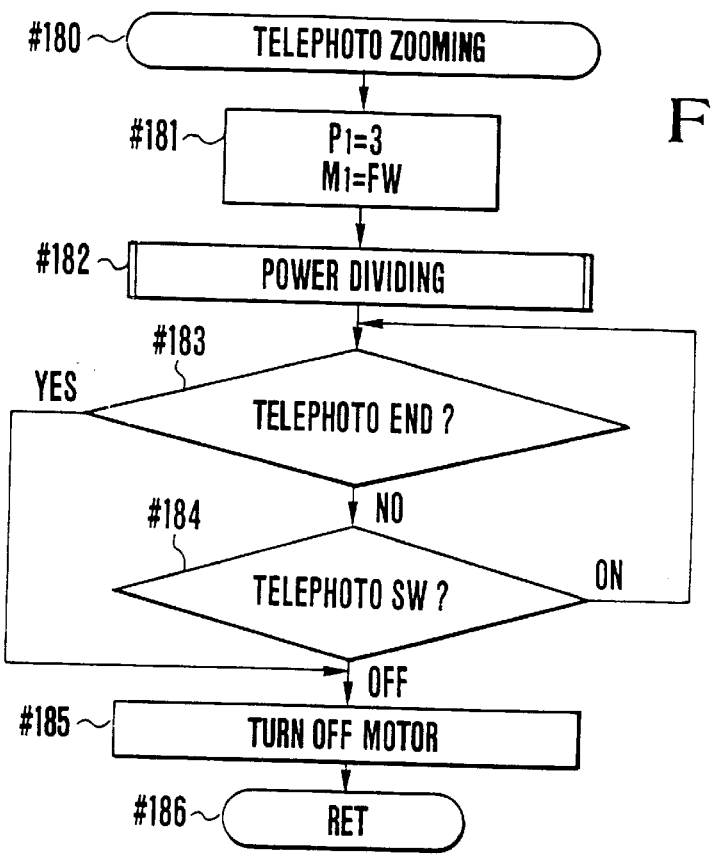
FIG. 26 is a flowchart showing the operation named "TELEPHOTO ZOOMING" of the control circuit 24 of FIG. 17.

The operation named "TELEPHOTO ZOOMING" will be described below with reference to FIG. 26.

Step #180: In step #80 of FIG. 18, the process jumps to this subroutine, and starts the operation named "TELEPHOTO ZOOMING", shown in Step #181 and the subsequent steps.

Steps #181 and #182: "P1=3, M1=Fw" is specified to cause the planetary gear 7 to revolve and mesh with the output gear 9c, and the planetary gear 7 in mesh is made to rotate in the telephoto direction while performing power transmission through the output g ear 9c.

Steps #183 to #185: A normal telephoto zooming operation is performed through the gear train 312a and the zoom driving gear 312.

Step #186: This subroutine is brought to an end, and the process returns to the main routine.

Figure 27:
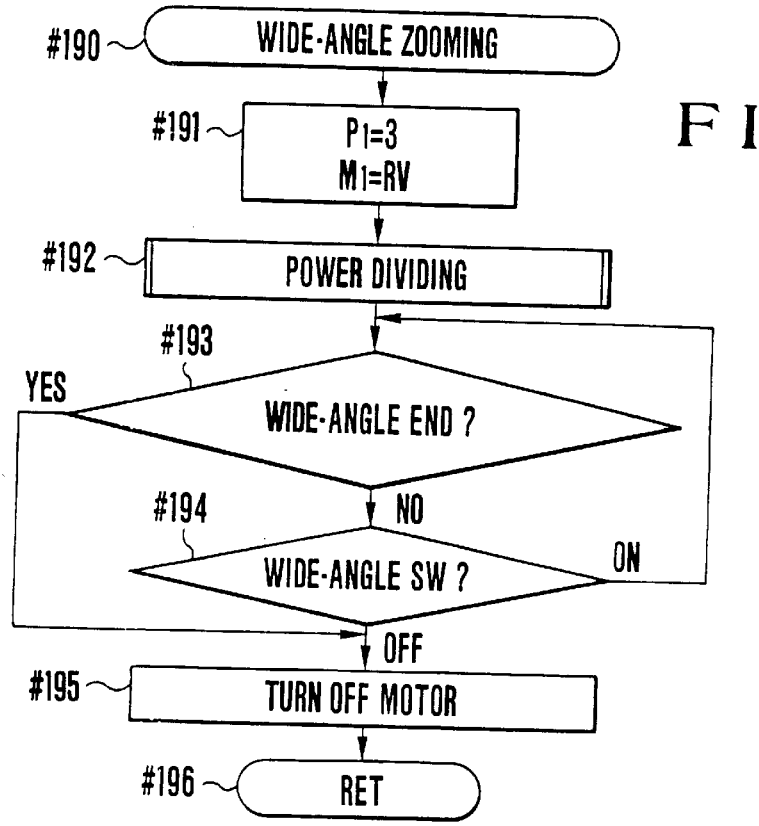
FIG. 27 is a flowchart showing the operation named "WIDE-ANGLE ZOOMING" of the control circuit 24 of FIG. 17.

The operation named "WIDE-ANGLE ZOOMING" will be described below with reference to FIG. 27.

Step #190: In Step #81 of FIG. 18, the process jumps to this subroutine, and starts the operation named "WIDE-ANGLE ZOOMING", shown in Step #191 and the subsequent steps.

Steps #191 and #192: "P1=3, M1=Rv" is specified to cause the planetary gear 7 to revolve and mesh with the output gear 9c, and the planetary gear 7 is made to rotate in the wide-angle direction by performing power transmission through the output gear 9c.

Steps #193 to #195: A normal wide-angle zooming operation is performed through the gear train 312a and the zoom driving gear 312, as in the above-described "TELEPHOTO ZOOMING".

Step #196: This subroutine is brought to an end, and the process returns to the main routine.

Figure 28:
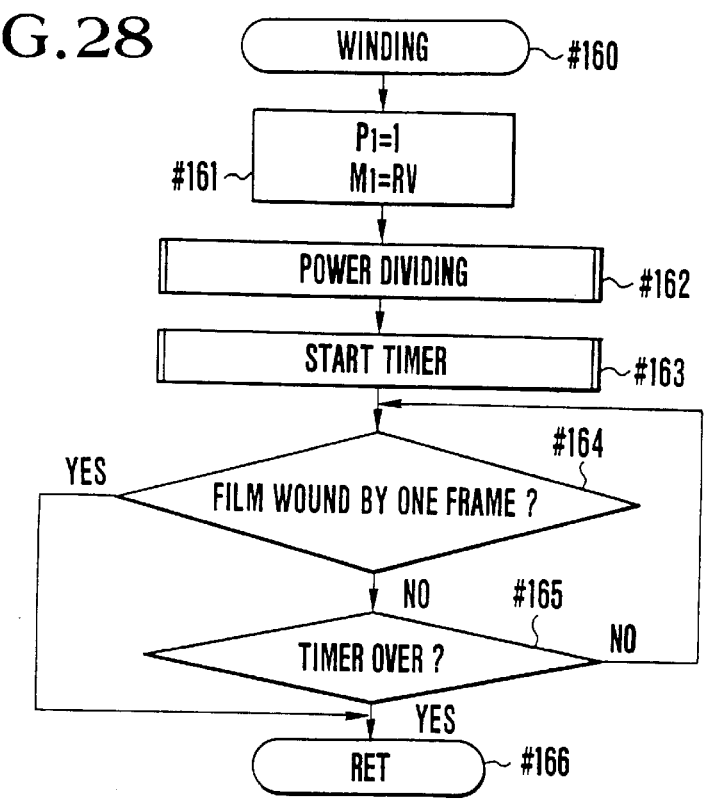
FIG. 28 is a flowchart showing the operation named "WINDING" of the control circuit 24 of FIG. 17.

The operation named "WINDING" will be described below with reference to FIG. 28.

Step #160: In Step #85 of FIG. 18, the process jumps to this subroutine, and starts the operation of winding the film F.

Steps #161 and #162: "P1=1, M1=Rv" is specified to cause the planetary gear 7 to revolve and mesh with the output gear 9d, and the spool 305 is made to rotate through the output gear 9d and the gear 304 as well as a gear 308 both of which are provided for film transportation.

Steps #163 to #165: A normal winding operation for the film F is performed.

Step #166: This subroutine is brought to an end, and the process returns to the main routine.

Figure 29:
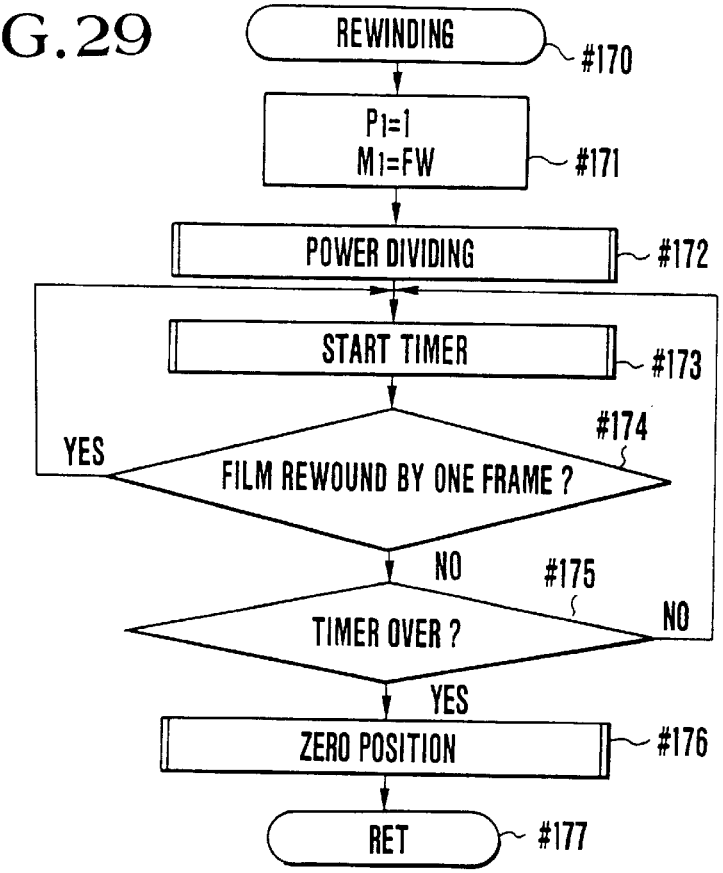
FIG. 29 is a flowchart showing the operation named "REWINDING" of the control circuit 24 of FIG. 17.

The operation named "REWINDING" will be described below with reference to FIG. 29.

Step #170: In Step #92 of FIG. 18, the process jumps to this subroutine, and starts the operation of rewinding the film F.

Steps #171 and #172: Since the position where the planetary gear 7 is made to revolve is "P1=1", similar to the position specified for the above-described winding operation, the planetary gear 7 meshes with the output gear 9d. However, since the direction of rotation of the planetary gear 7 is "M1=Fw", the output gear 9d also rotates in the "Fw" direction. Accordingly, the planetary gear 304 for film transportation causes the winding gear 308 for film transportation to rotate, thus causing a fork gear (not shown) to rotate.

Steps #173 to #175: A normal rewinding operation for the film F is performed.

Step #176: The operation named "ZERO POSITION" which will be described later is performed.

Step #177: This subroutine is brought to an end, and the process returns to the main routine.

The operation named "ZERO POSITION" will be described below with reference to FIG. 30.

Step #200: In Step #89 of FIG. 18, in Step #148 of FIG. 25 or in Step #176 of FIG. 29, the process jumps to this subroutine, and starts the operation named "ZERO POSITION", shown in Step #201 and the subsequent steps. As described previously, the "zero position" operation is the operation of preventing the lens tube 316 or the lens barrel 314 from moving by accident, for example, by keeping the planetary gear 7 meshed with the output gear 9c for zooming when the main switch is on, or with the output gear 9a when the main switch is off.

Step #201: It is determined whether a lens-barrel backward switch is on or off. If it is on, it is determined that the main switch is off, and the process proceeds to Step #204. If it is off, it is determined that the main switch is on, and the process proceeds to Step #202.

Steps #202 and #203: "P1=3, M1=Fw" is specified to cause the planetary gear 7 to revolve and mesh with the output gear 9c which is coupled to the zooming mechanism. Thus, in the next photographic cycle, a zooming operation can be immediately initiated. Since the above-described operation serves also as a lock function for the lens tube 316, even if the lens tube 316 is pushed by accident, no serious trouble takes place. Only when the process jumps to this subroutine in Step #89 of FIG. 18, does the flow proceed from Step #201 to Steps #202 and #203.

Steps #204 to #206: A small retracting operation is performed with the planetary gear 7 remaining in mesh with the output gear 9a. The lens barrel 314 actually does not move since it is retracted, but it is possible to reliably lock the lens barrel 314 by holding the gear train 310a and the helicoid gear 310 under a certain amount of tension (with backlash remaining). Only when the process jumps to this subroutine in Step #148 of FIG. 25 or Step #176 of FIG. 29, does the flow proceed from Step #201 to Steps #204 to #206.

Step #207: The motor 1 is turned off. Accordingly, as long as the motor 1 is not activated as described above, the lens tube 316 or the lens barrel 314 does not move.

Step #208: This subroutine is brought to an end, and the process returns to the main routine.

According to the above-described first embodiment, during the "entrance operation", the direction of power transmission of the desired one of the output gears 9a to 9d to which power dividing is to be directed is made the same as the direction of revolution of the planetary gear 7, so that there is no need to change the direction of rotation of the motor 1 (the sun gear 6). Accordingly, a mechanism to which the power is to be transmitted is prevented from being reversed in an unexpected direction. In addition, it is possible to smoothly perform subsequent operations.

As described above, according to the first embodiment, power-dividing controlling means for causing a planetary gear to mesh with a specified output gear and causing the output gear to selectively transmit the driving power of the sun gear is provided with rotational direction controlling means for determining whether the direction in which the planetary gear is made to revolve for selection of the output gear is the same as the direction in which the output gear is made to rotate after the planetary gear is held by holding means, and, if both directions differ, making the direction of rotation of the planetary gear coincide with the direction of rotation of the output gear and then meshing them with each other, whereby the direction in which the planetary gear is made to revolve for selection of the output gear is made the same as the direction in which the output gear is made to rotate after the planetary gear is held by the holding means. In this arrangement, the direction of rotation of the sun gear immediately before it meshes with the output gear is the same as the direction of rotation of the output gear. Accordingly, the output gear and a mechanism to which power is to be transmitted are prevented from operating in reverse directions when the sun gear and the output gear mesh with each other. In addition, it is possible to smoothly perform the subsequent power transmission operations.

According to the above-described first embodiment, since the holding stopper 11 serving as lock means is disposed above the crown stopper 10, it is possible to reliably perform the switching operation of the planetary gear 7 to change an element to which power is to be transmitted. More specifically, since the planetary gear 7 does not disengage from the holding stopper 11 until backlash is removed, an unwanted force generated from the backlash does not act on the power transmission mechanism. Further, there is no need to strictly control the characteristics of the torsion springs 13*b* and 15*c* as well as the plunger 16, the variations of the frictional force between the crown stopper 10 and the rotation-stopping arm 12 due to the tolerance of the shape of an actual part which is used as the crown stopper 10 or the rotation-stopping arm 12.

Further, as is apparent from the above description, according to the first embodiment, power-dividing controlling means for causing a planetary gear to mesh with a specified output gear and causing the output gear to selectively transmit the driving power of the sun gear is provided with mesh releasing means for releasing the mesh between the sun gear and an output gear which is in mesh therewith, after removing backlash by causing the sun gear to rotate in a reverse direction, if an instruction to change an element to which power is to be transmitted. The power-dividing controlling means is also provided with lock means for holding the mesh between the sun gear and the output gear until the backlash of the sun gear is removed, when the mesh between the sun gear and the planetary gear is to be released by the mesh releasing means. In the above-described arrangement, the mesh between the planetary gear and the output gear is not released until the backlash is removed, that is, until an unwanted revolving force which is applied to the planetary gear owing to the backlash is eliminated. Accordingly, it is possible to provide reliable control over the revolution of the planetary gear when it is necessary to change an element to which power is to be transmitted.

According to the first embodiment, after the completion of a film winding operation, it is determined whether the presently selected photography mode is the normal photography mode or the continuous-shooting photography mode. If the normal photography mode is active, the planetary gear 7 is switched from the output gear 9*d* with which it is presently meshed to the output gear 9*c* (the lens tube 316) (as shown in Steps #87→#89 of FIG. 18 (more specifically, in Steps #200→#201→#202→#203→#207 of FIG. 30)). This is because the probability that power transmission will be performed initially in the next photographic cycle is high (because it is necessary to ensure the response speed at which the next photographic cycle is started), and because it is necessary to prevent the lens tube 316 from moving if it is accidentally pushed (a lock function works by holding the planetary gear 7 and the output gear 9*c* in mesh with each other).

If the continuous-shooting photography mode is active, the first element to which power is to be transmitted in the next photographic cycle is still a film transporting mechanism coupled to the output gear 9*d*. Therefore, the planetary gear 7 is not made to revolve and remains in mesh with the output gear 9*c*. Accordingly, the unwanted operations of the plunger 16 and the pulse disc 14 can be eliminated and it is possible to provide effective control over power dividing merely by performing control of the repetition of start and stop of the motor 1.

As described above, according to the first embodiment, there is provided a power-dividing-position instructing means for instructing, if the normal photography is identified by photography-mode identifying means, the power-dividing controlling means to switch the planetary gear from an output gear coupled to a film transporting mechanism to an output gear coupled to a lens-barrel driving mechanism after a film winding operation has been performed after the completion of photography, or for instructing, if the continuous-shooting photography is identified by the photography-mode identifying means, the power-dividing controlling means to maintain the planetary gear in mesh with the output gear coupled to the film transporting mechanism. In the above-described arrangement, if one-frame photography, i.e., the normal photography, is performed, the planetary gear is switched to the output gear coupled to a lens-barrel driving mechanism to which power is to be next transmitted, while if continuous photography is performed, the planetary gear is held in mesh with the output gear coupled to the film transporting mechanism since power transmission for the film transporting mechanism is again performed in the next exposure operation. Accordingly, it is possible to achieve effective power transmission, particularly when the continuous-shooting mode is selected.

Figure 30:
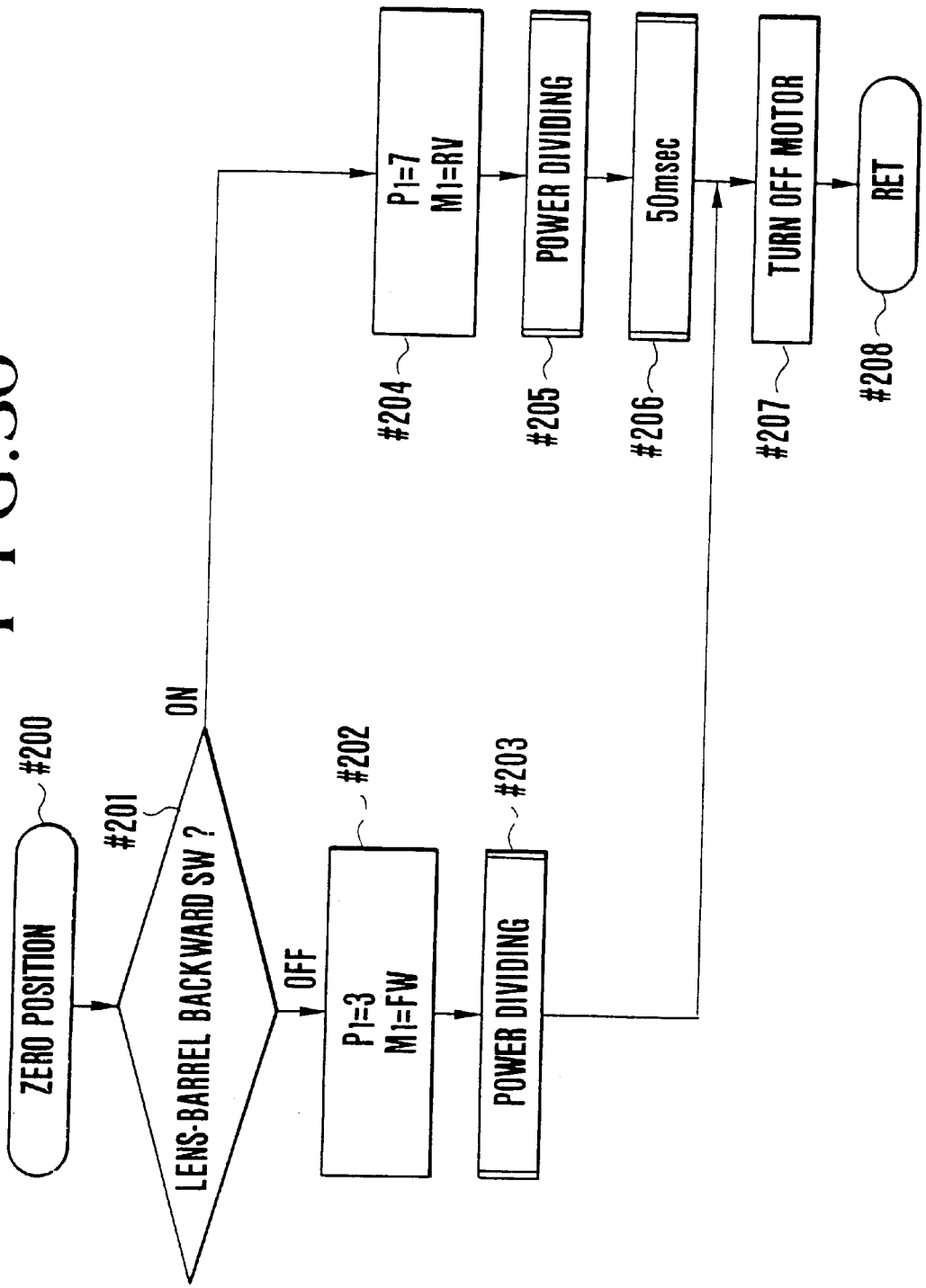
FIG. 30 is a flowchart showing the operation named "ZERO POSITION" of the control circuit 24 of FIG. 17.
Figure 32A:
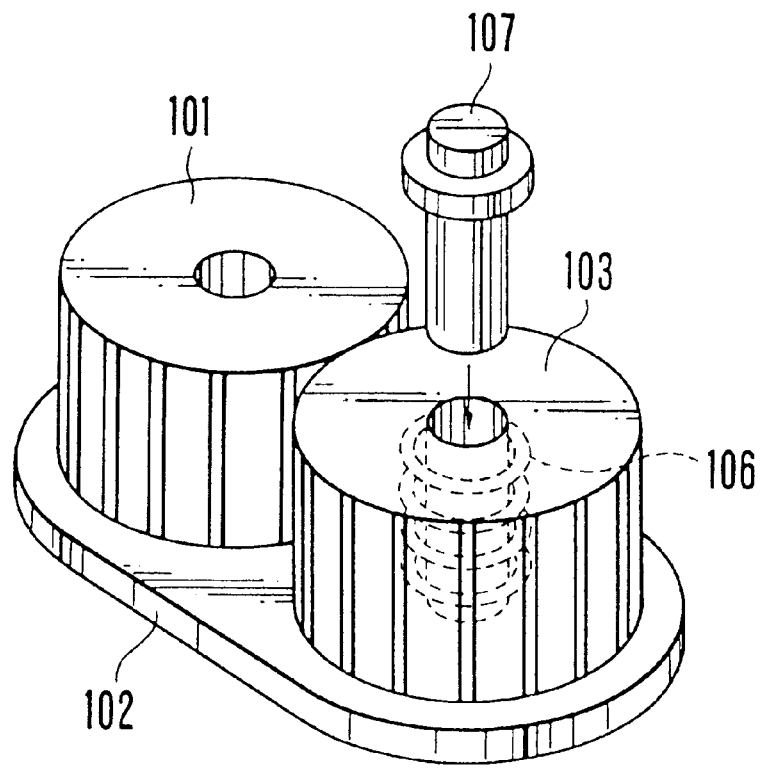
FIGS. 32(a) and 32(b) are a schematic perspective view and a schematic vertical sectional view, respectively, showing the construction of a conventional planetary gear mechanism.
Figure 32B:
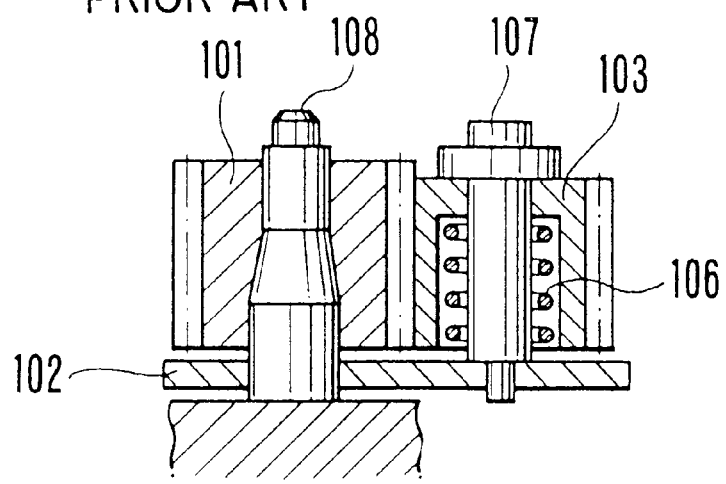
Figure 33:
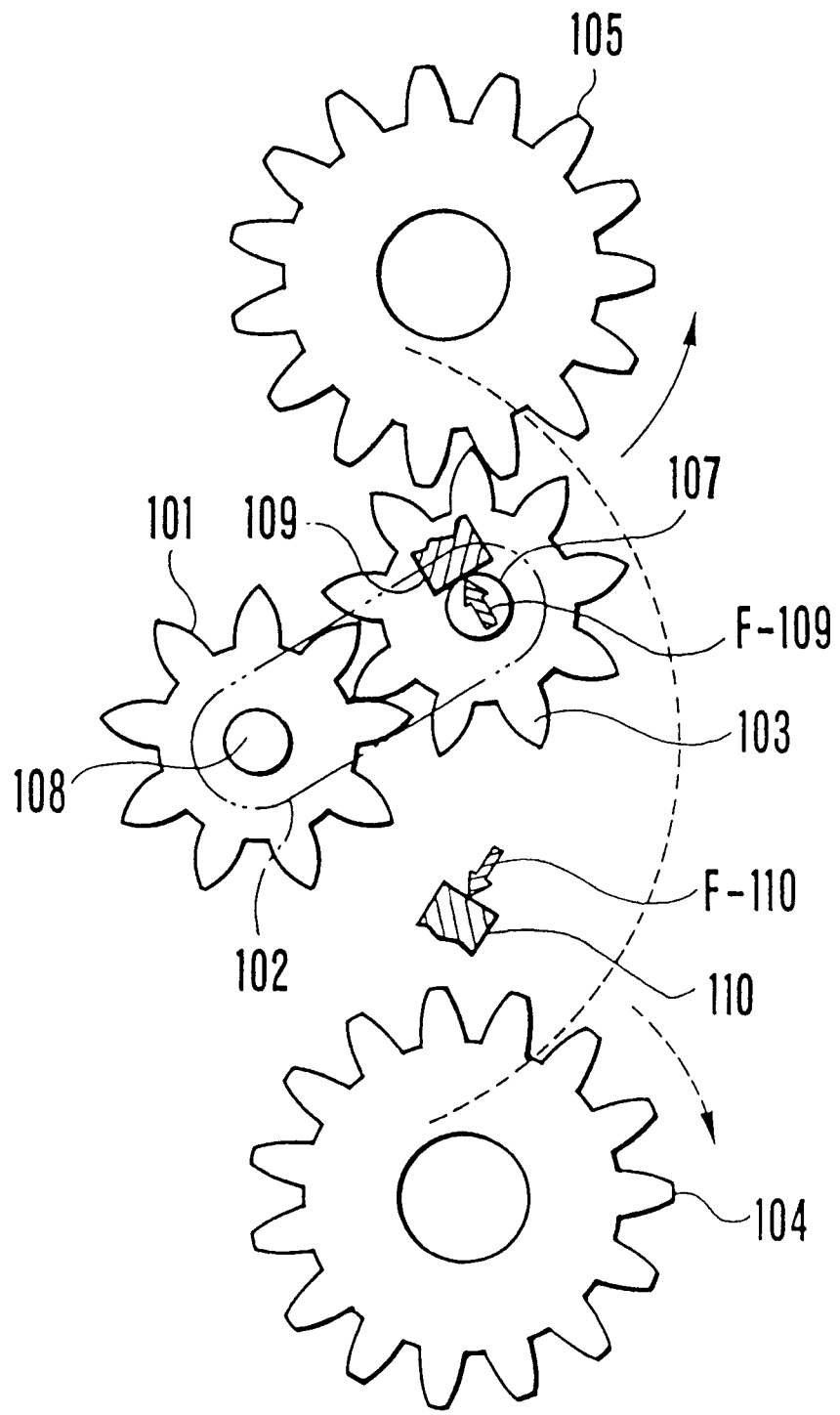
FIG. 33 is a schematic plan view showing a planetary gear mechanism which constitutes an essential portion of the construction shown in FIGS. 32(a) and 32(b) and an output gear to which power is to be transmitted from the planetary gear mechanism.
Figure 34:
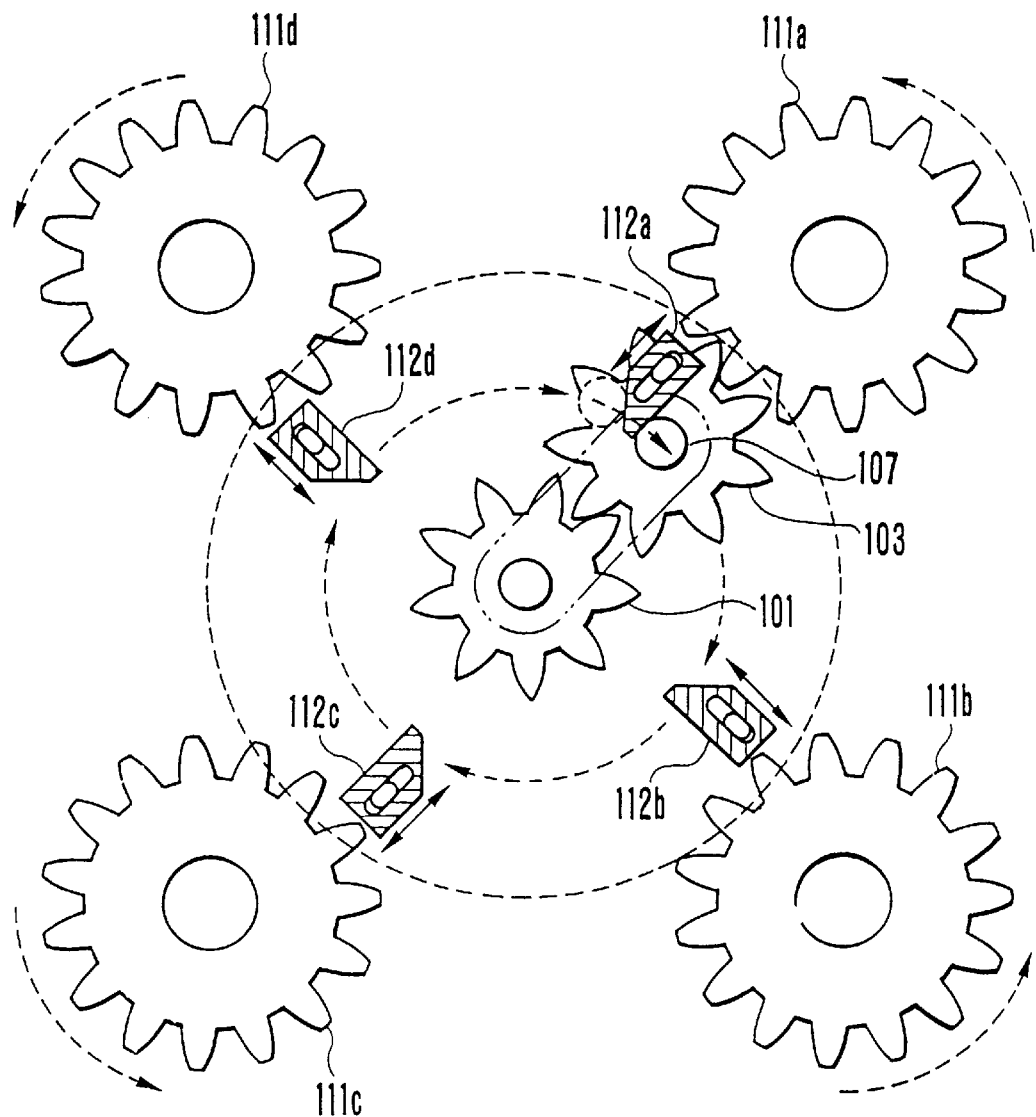
FIG. 34 is a schematic plan view which serves to illustrate the case where elements to which power is to be transmitted from the planetary gear mechanism of FIG. 33 are arranged as four lines so that power can be transmitted in four directions.
Figure 35:
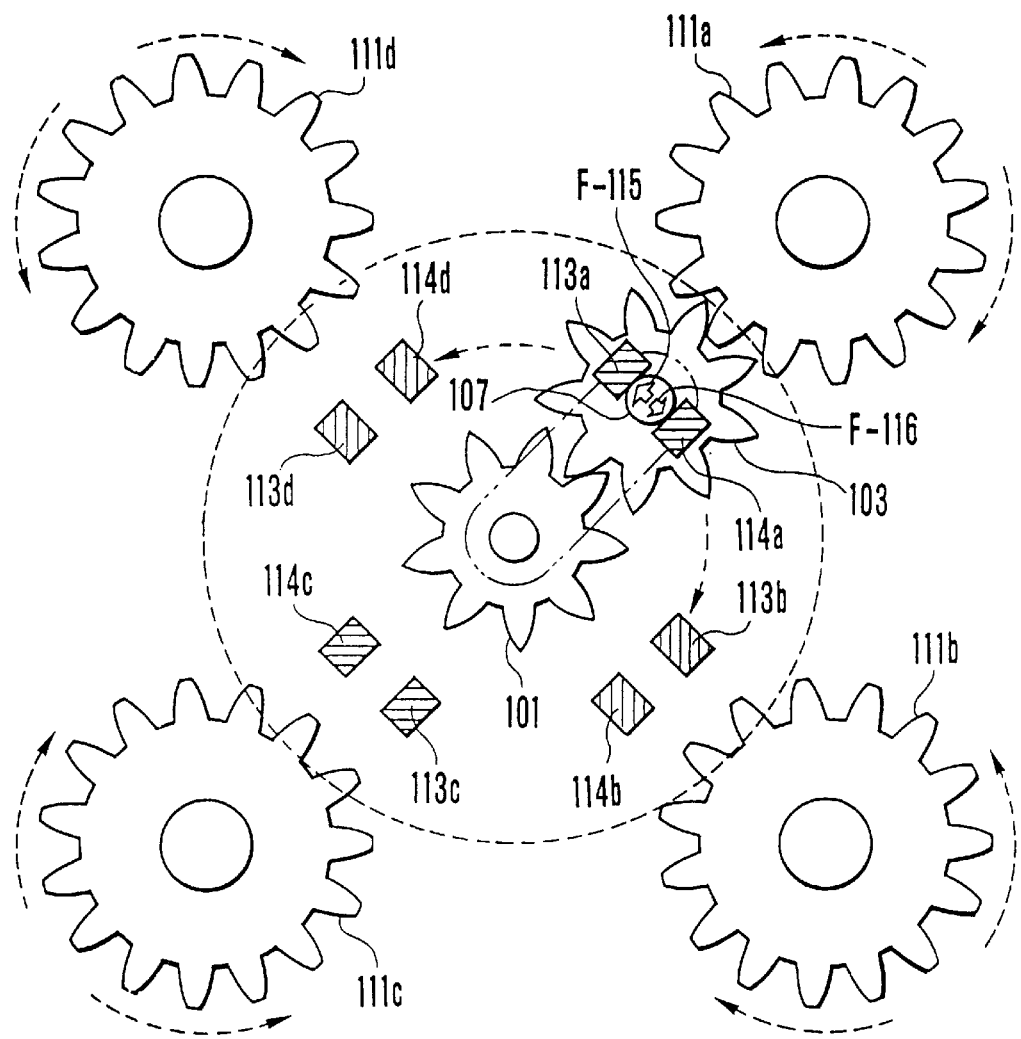
FIG. 35 is a schematic plan view which serves to illustrate the case where elements to which power is to be transmitted from the planetary gear mechanism of FIG. 33 are arranged as four lines so that power can be transmitted in eight directions.
Figure 36:
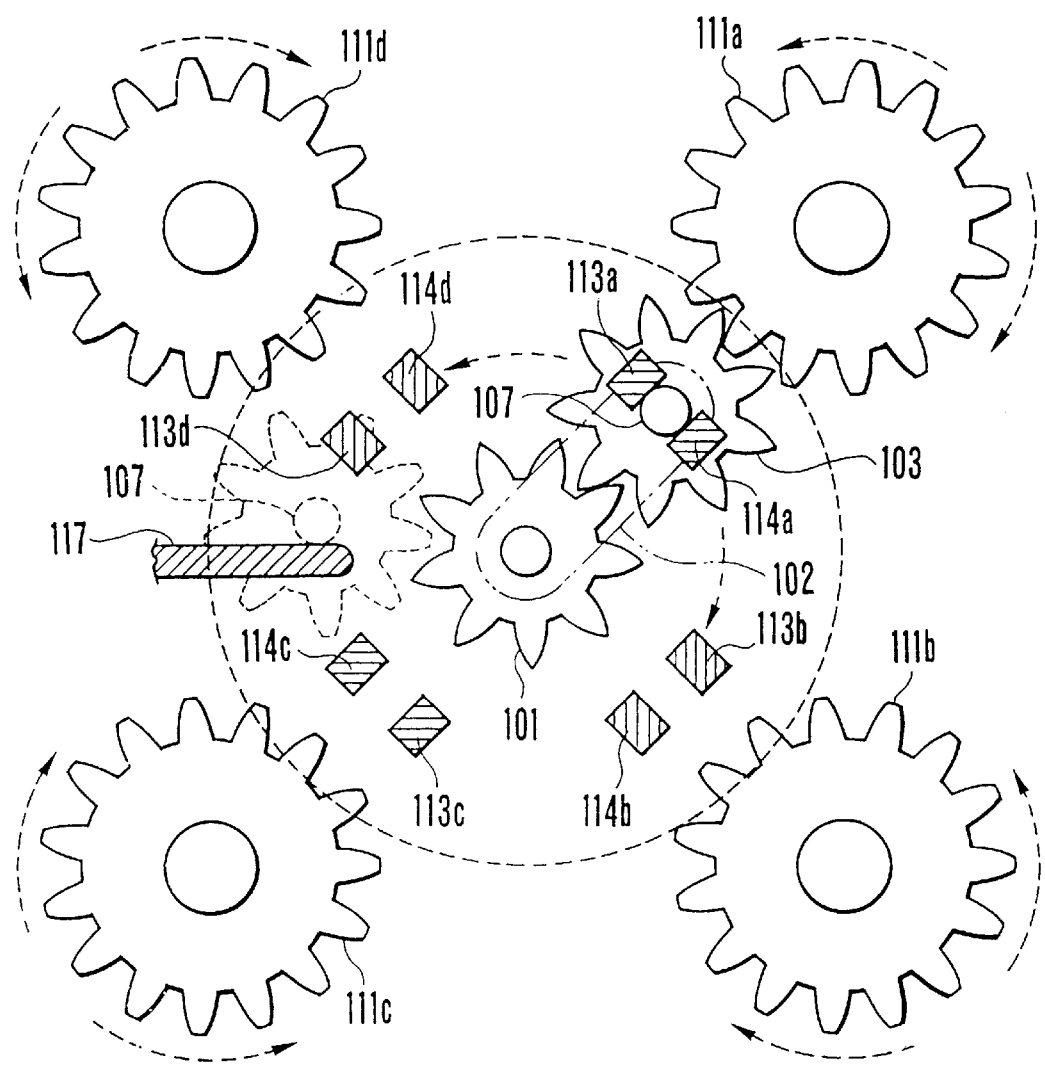
FIG. 36 is a schematic plan view showing an example in which the power dividing device of FIG. 35 is provided with limiting members which define an initial position and a revolution abutment position for the revolution of the planetary gear.

According to the first embodiment, the planetary gear 7 is held in mesh with the output gear 9*c* after the completion of film winding, or during photography with the main switch on, the planetary gear 7 is held in mesh with the output gear 9*c* after the completion of automatic loading or film rewinding (refer to FIG. 30). Accordingly, even if the lens tube 316 or the lens barrel 314 is pushed by accident, it does not idle. When the main switch is off, after the lens barrel 314 has retracted by means of the retracting operation of the helicoid gear 310, the planetary gear 7 is held in mesh with the output gear 9*a* coupled to the helicoid gear 310. In the above-described arrangement, the lens barrel 314 is prevented from moving outward due to accidental factors such as the vibration of the camera.

As described above, according to the first embodiment, after the completion of a power transmission operation, the planetary gear is selectively made to mesh with an output gear coupled to a mechanism which may be accidentally exposed to an external force, whereby the mechanism is prevented from moving unexpectedly.

According to the first embodiment, the portion (12*d*) which is defined on the rotation-stopping arm 12 on a line extending from the rotating shaft (output shaft) 3 is pressed by the projection 15*e* of the arm 15, so that the end portion 12*c* is made to enter an arbitrary cutout of the crown stopper 10. Accordingly, it is possible to reliably lock the planetary gear 7 and the selected one of the output gears 9*a* to 9*d* irrespective of the position of the rotation-stopping arm 12. In addition, since the construction is extremely simple, the size of the apparatus does not increase.

As described above, according to the first embodiment, in a state wherein the planetary gear revolving around the sun gear has finished revolving up to the position of a specified output gear, the portion which is defined on a rotation-stopping member on a line extending from the rotating shaft of the sun gear is pressed in the direction of the rotating shaft, to bring an engagement portion provided on the rotation-stopping member into engagement with a stopper member, thereby holding the mesh of the planetary gear with the selected output gear. Thus, it is possible to reliably limit the revolution of the planetary gear by means of a simple arrangement.

According to the first embodiment, there is provided the erected portion 10c which inhibits the planetary gear 7 from meshing with any of the output gears 9a to 9d at an abutment position beyond which the planetary gear 7 does not revolve further, and such an abutment position is set as an initial position where the planetary gear 7 can rotate on its axis without revolution. Accordingly, when the planetary gear 7 is activated at that position so as to revolve toward a desired one of the output gears 9a to 9d, the rotation of the planetary gear 7 is not accidentally transmitted to the output gears 9a to 9d even if the planetary gear 7 rotates at that position.

As described above, according to the first embodiment, when the planetary gear is to be brought into mesh with a specified output gear, the planetary gear is first brought into abutment with a limiting member which defines the revolution abutment position, that is, the initial position. However, since the limiting member is provided at a position where it is not meshed with any output gear, when the planetary gear is moved in the initial position, the rotation of the planetary gear is not accidentally transmitted to the output gear connected to the power transmission mechanism.

According to the first embodiment, in the above-described device in which the position of the planetary gear 7 during revolution is identified on the basis of the number of relative transitions of a pulse signal or the like, during an "initial positioning" operation, when the position of the planetary gear 7 during revolution is to be determined, the motor 1 is energized to rotate unconditionally in one direction during a predetermined time period, thereby causing the planetary gear 7 to revolve up to one abutment position in that direction. Then, the motor 1 is energized to rotate in the reverse direction, thereby causing the planetary gear 7 to revolve in the reverse direction toward the other abutment position. During the above-described operation, it is detected whether prescribed pulse signals are outputted. Accordingly, it is possible to perform a check of the operation of the device simultaneously with the "initial positioning" operation.

As described above, according to the first embodiment, power-dividing controlling means for bringing the planetary gear into mesh with a specified output gear on the basis of an output from position detecting means after the completion of the "initial positioning" operation of the planetary gear with respect to the limiting member, and causing the specified output gear to selectively transmit the driving power of the sun gear, is provided with initial-positioning instructing means and operation checking means. The initial-positioning instructing means causes the planetary gear to revolve up to a second limiting member which defines a revolution abutment position in a second direction, and then causes the planetary gear to revolve in the reverse direction up to a first limiting member which defines a revolution abutment position in a first direction. The operation checking means performs an operation check on the planetary gear on the basis of the output of the position detecting means during the revolution of the planetary gear from the revolution abutment position provided in the second direction up to the revolution abutment position provided in the first direction and defined as the initial position, that is to say, according to whether the number of pulse transitions obtained through the position detecting means during the revolution from the revolution abutment position in the second direction up to the revolution abutment position in the first direction reaches a prescribed number of pulse transitions. In the above-described arrangement, it is also possible to perform simultaneously a check on whether the revolution of the planetary gear is correctly performed during the "initial positioning" operation.

According to the first embodiment, in an operation step in which a series of photographic control steps of the camera is not adversely affected even if the "initial positioning" operation is performed, such as an automatic loading operation, a manual rewinding operation or a film rewinding operation after film has been stretched, each time an element to which power is to be transmitted is selected immediately before any one of the above-described operations, the "initial positioning" operation is carried out. Accordingly, it is possible to remarkably lower the probability that an error will occur such as the erroneous selection of an element to which power is to be transmitted. Since the "initial positioning" operation is actively performed only in the aforesaid operation step in which the sequence of photographic control steps is not adversely affected, it is possible to prevent problems such as the problems that a shutter opportunity is missed and that a time lag for photography increases.

As described above, according to the first embodiment, the power-dividing controlling means for bringing the planetary gear into mesh with a specified output gear on the basis of an output from the position detecting means after the completion of the "initial positioning" operation of the planetary gear with respect to the limiting member, and causing the specified output gear to selectively transmit the driving power of the sun gear, is provided with initial-positioning instructing means for causing the "initial positioning" operation to be actively performed each time an element to which power is to be transmitted is selected, only in an operation step in which a series of desired photographic control steps of the camera is not adversely affected (for example, the response speed of a photographic operation is not impaired) even if the "initial positioning" operation (the operation of meshing the planetary gear with a specified output gear) is carried out in addition to a power-dividing selection operation which is performed prior to an operation carried out by a mechanism to which power has been transmitted, such as film winding, film rewinding, backward or forward movement of a lens barrel or automatic loading, zooming. In the above-described arrangement, it is possible to achieve power transmission with highly improved reliability without hindering a particular sequence of desired photographic control steps in the camera.

A second embodiment of the present invention will be described below with reference to FIGS. 37 to 40.

Figure 37:
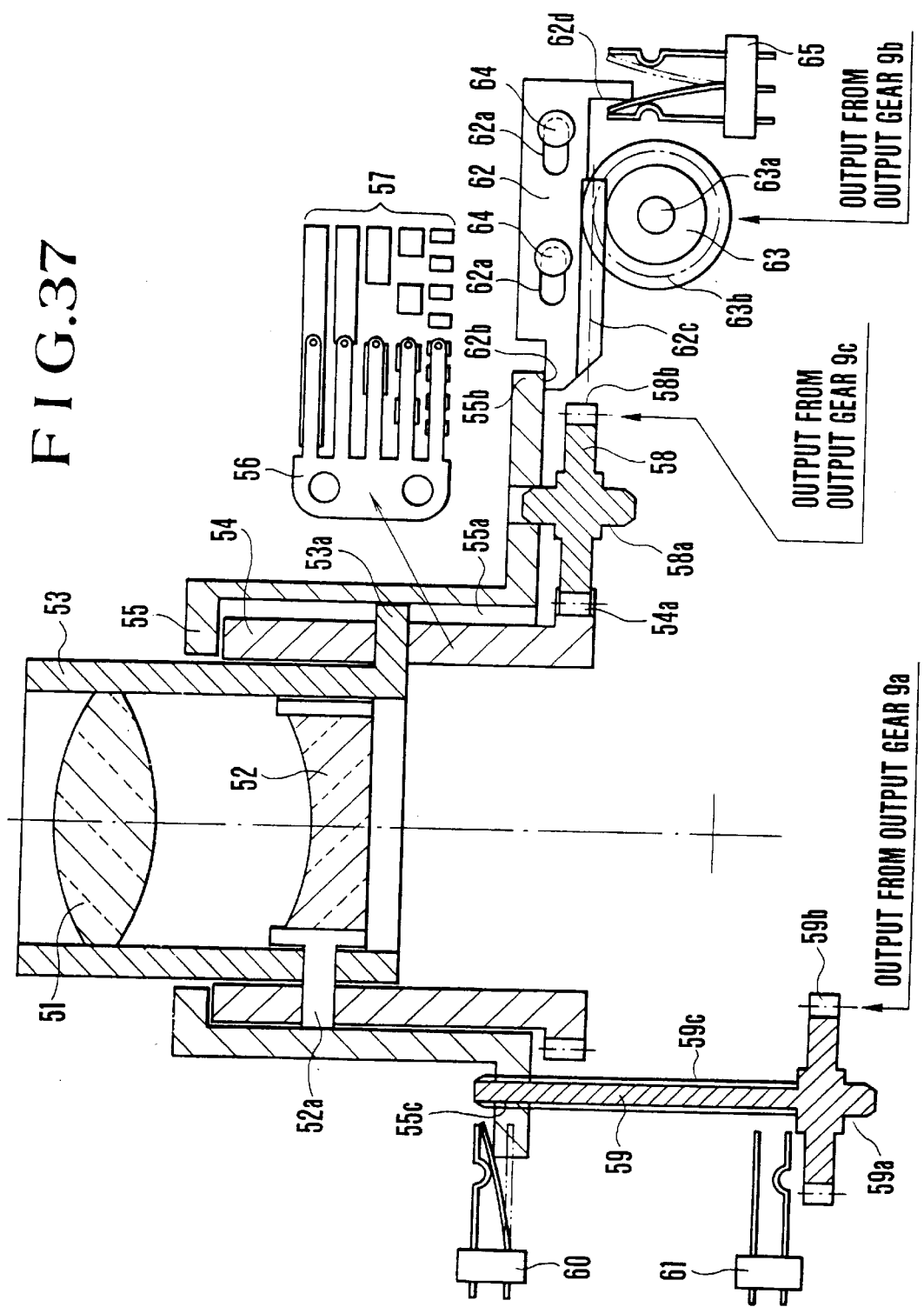
FIG. 37 is a schematic view showing the cross section of a photographic lens barrel and a specific arrangement of elements disposed in the vicinity of the photographic lens barrel in a camera according to a second embodiment of the present invention.

FIG. 37 is a schematic view showing the specific arrangement of a photographic lens barrel to which power is transmitted by a power dividing device through a zooming mechanism and a mechanism for moving a lens barrel backward or forward, as well as the specific arrangement of elements disposed in the vicinity of the photographic lens barrel.

In the arrangement shown in FIG. 37, a lens tube 53 includes a convex lens unit 51 and a concave lens unit 52, and is held on a cam ring 54 and a lens barrel 55 by three pins 53a.

Three cam grooves along which the lens tube 53 is to move and another three cam grooves along which the concave lens unit 52 is made to move are cut in a cylindrical wall of the cam ring 54. The cam ring 54 is rotatably supported by the lens barrel 55 and has a gear portion 54a which meshes with a zooming gear 58. The zooming gear 58 meshes with the final gear of a power transmission mechanism (zooming mechanism) (not shown) which is coupled to the output gear 9c.

The lens barrel 55 is guided by a camera body (not shown) so that it can move in the vertical direction only (along the optical axis) as viewed in FIG. 37. The lens barrel 55 has three rectilinear grooves 55a into which the three pins 53a of the lens barrel 53 are fitted, respectively. The lens barrel 55 also has an integrally formed code pattern 57 for detection of a zoom position. Further, the lens barrel 55 has an internally threaded portion 55c for retracting the lens barrel 55 and a lock portion 55b for preventing the lens barrel 55 from retracting.

A code brush 56 is integrally arranged on the cam ring 54. As the cam ring 54 rotates, the code brush 56 slides on the code pattern 57 and transmits to a control circuit which will be described later, composite focal length information determined by the position of the convex lens unit 51 and that of the concave lens unit 52.

As described above, the zooming gear 58 meshes with the final gear of the zooming mechanism coupled to the output gear 9c. A shaft 58a is rotatably supported by the camera body (not shown), and a gear portion 58b is meshed with a gear portion 54a of the cam ring 54.

A helicoid gear 59 is rotatably supported on the camera body (not shown) by a shaft 59a, and power is transmitted to the helicoid gear 59 through a power transmission mechanism (a forward/backward lens-barrel moving mechanism) (not shown) which is coupled to the output gear 9a. A helicoid threaded portion 59c is meshed with an internally threaded portion 55c of the lens barrel 55, and moves a lens barrel unit (consisting of the elements 51 to 55) upward and downward along the optical axis as viewed in FIG. 37, thereby performing a retracting operation.

A lens-barrel-out switch 60 is arranged to be turned on when the lens barrel unit (51 to 55) is placed in its forward position (in its projected state). A lens-barrel-in switch 61 is arranged to be turned off when the lens barrel unit (51 to 55) is placed in its retracted state.

A bayonet lock lever 62 has a s lot 62a and is supported movably toward the right and the left as viewed in FIG. 37 by a shaft 64 of the camera body (not shown) which is fitted into the slot 62a. A rack portion 62c is meshed with a bayonet gear 63.to which power is transmitted by a power transmission mechanism (a bayonet lock mechanism) (not shown) which is coupled to the output gear 9b. A claw 62b abuts a claw portion 55b of the lens barrel 55 in the state shown in FIG. 37, thereby locking the lens barrel 55 so that it does not retract downward as viewed in FIG. 37. The bayonet lock lever 62 has an arm 62d at the other end, and in the state shown in FIG. 37, the arm 62d abuts a central common terminal of a bayonet switch 65 and carries the fact that the bayonet lock lever 62 is locked, to the control circuit which will be described later. If the bayonet lock lever 62 moves from the position of FIG. 37 toward the right and the claw 62b disengages from the claw portion 55b of the lens barrel 55, the arm 62d transmits to the control circuit the fact that the bayonet lock lever 62 is unlocked.

The specific arrangement of the power dividing device is similar to that described in connection with the first embodiment (refer to, for example, FIGS. 2 and 3), and a description thereof is omitted.

Figure 38:
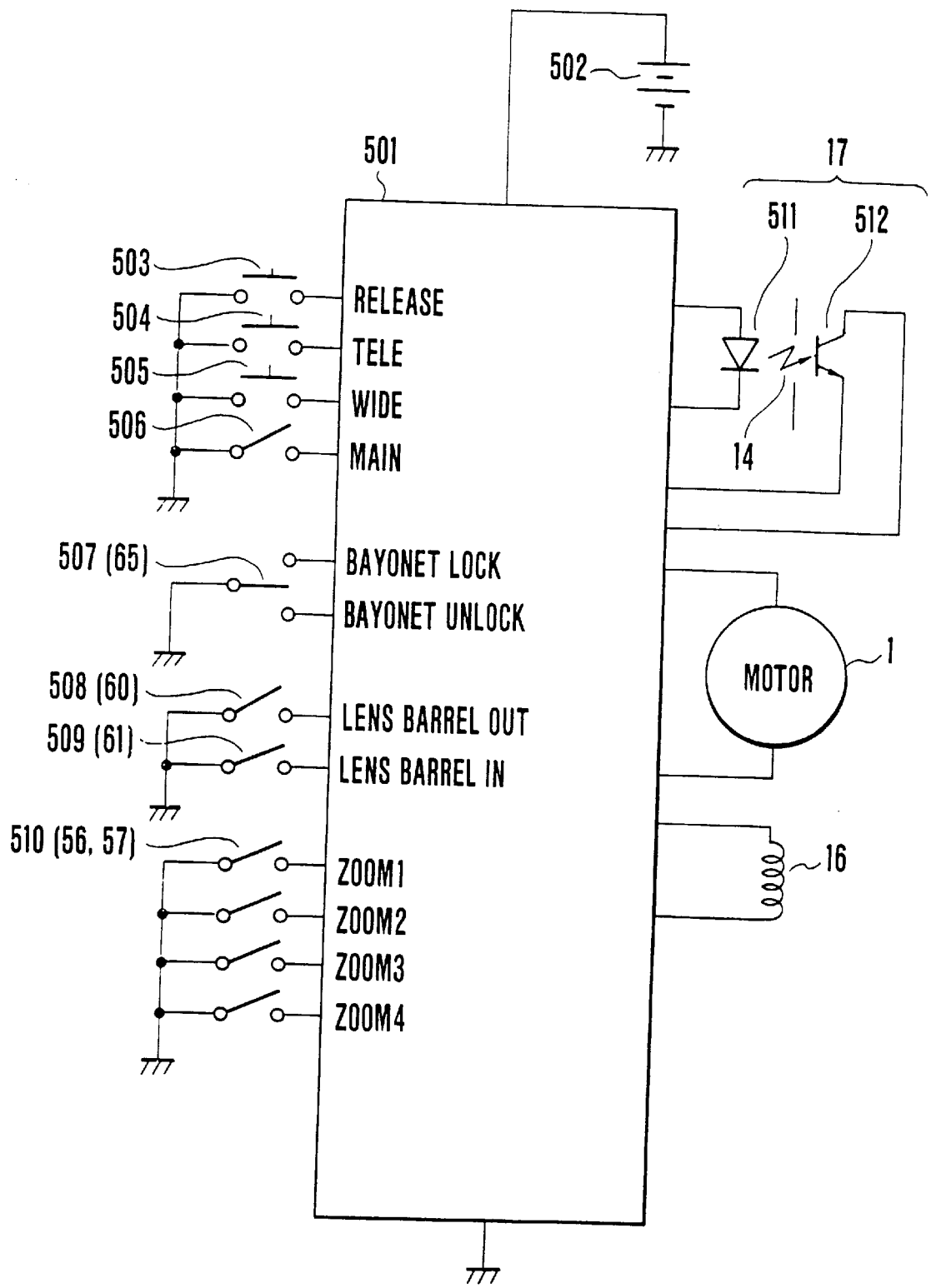
FIG. 38 is a circuit block diagram schematically showing the construction of the camera according to the second embodiment.

FIG. 38 is a circuit block diagram showing the essential parts of a camera provided with the power dividing device.

The circuit shown in FIG. 38 includes a control circuit 501 for controlling various operations of the camera, an electrical power source 502, a switch 503 which is turned on when a shutter release button is pressed, a switch 504 which is turned on when a telephoto zooming button is pressed, a switch 505 which is turned on when a wide-angle zooming button is pressed, and a main switch 560 of the camera.

The shown circuit also includes a bayonet switch 507 (which corresponds to the bayonet switch 65 shown in FIG. 37) which is turned on or off when the bayonet lock lever 62 is locked or unlocked. From the state of the bayonet switch 507, it is determined whether the bayonet lock lever 62 is locked, unlocked or in an intermediate state.

A lens-barrel-out switch 508 is turned on when the lens barrel 55 is moved forward, while a lens-barrel-in switch 509 is turned on when the lens barrel 55 is retracted. The switches 508 and 509 correspond to the switches 60 and 61 of FIG. 37.

A zoom-position switch 510 is turned on/off when the code brush 56 shown in FIG. 37 slides on the code pattern 57 with the rotation of the cam ring 54. The states of the lens tube 53 between the telephoto end and the wide-angle end, as well as between an intermediate point of a retracting operation and the end thereof are identified on the basis of the combination of on and off of signals ZOOM1 to ZOOM4.

Photointerrupters 511 and 512 (which correspond to the photocoupler 17 of FIGS. 2 and 3) detect the state of the rotating arm 5 of the power dividing device on the basis of the rotational state of the pulse disc 14. The photointerrupters 511 and 512 output a signal corresponding to a transition between brightness and darkness by detecting the bright and dark pattern segments provided on the pulse disc 14.

Figure 2:
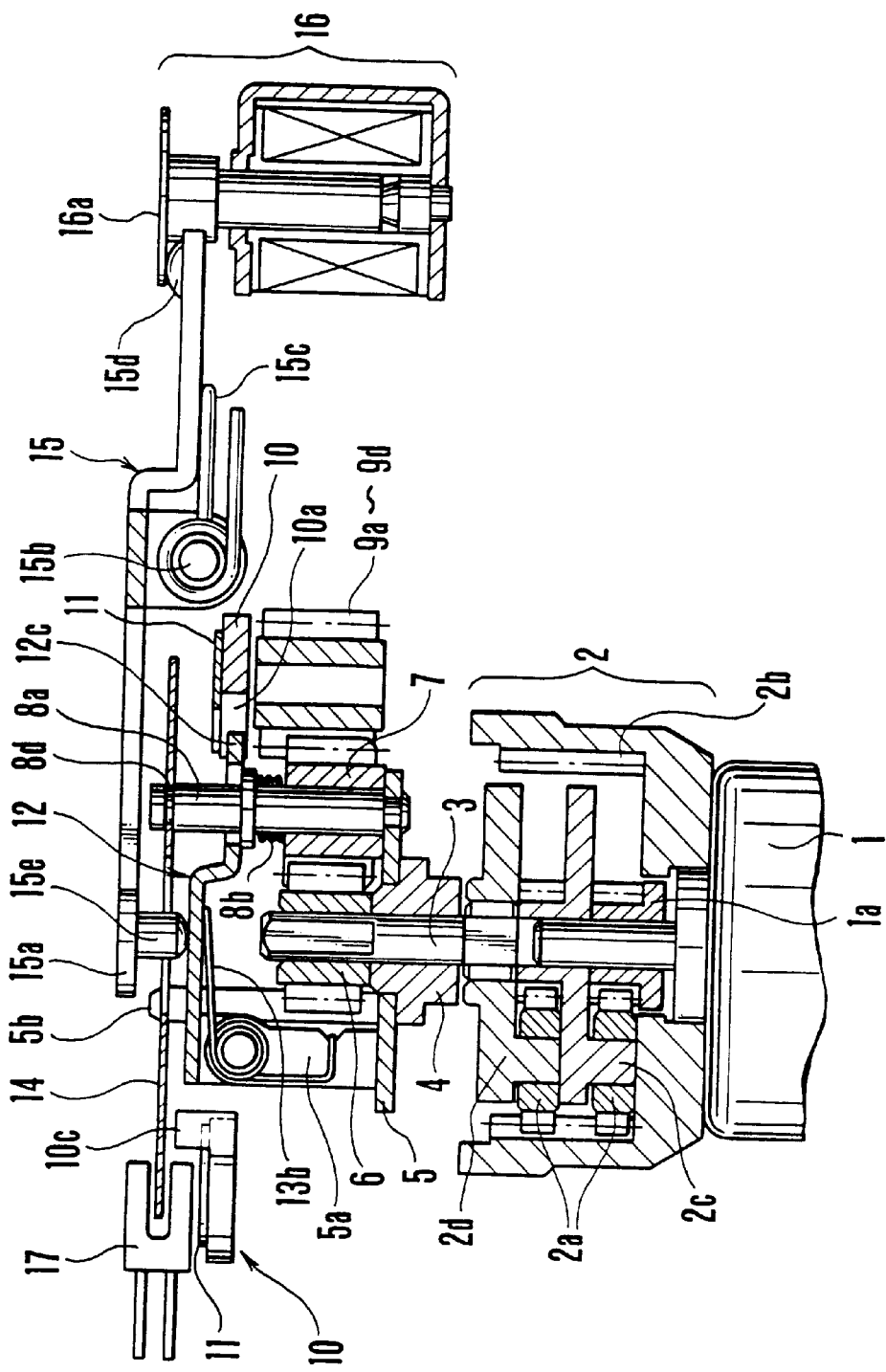
FIG. 2 is a diagrammatic vertical sectional view of the power dividing device of a camera, showing the first embodiment of the present invention.

The motor 1 and the plunger 16 are similar to those shown in FIGS. 2 and 3.

Figure 39:
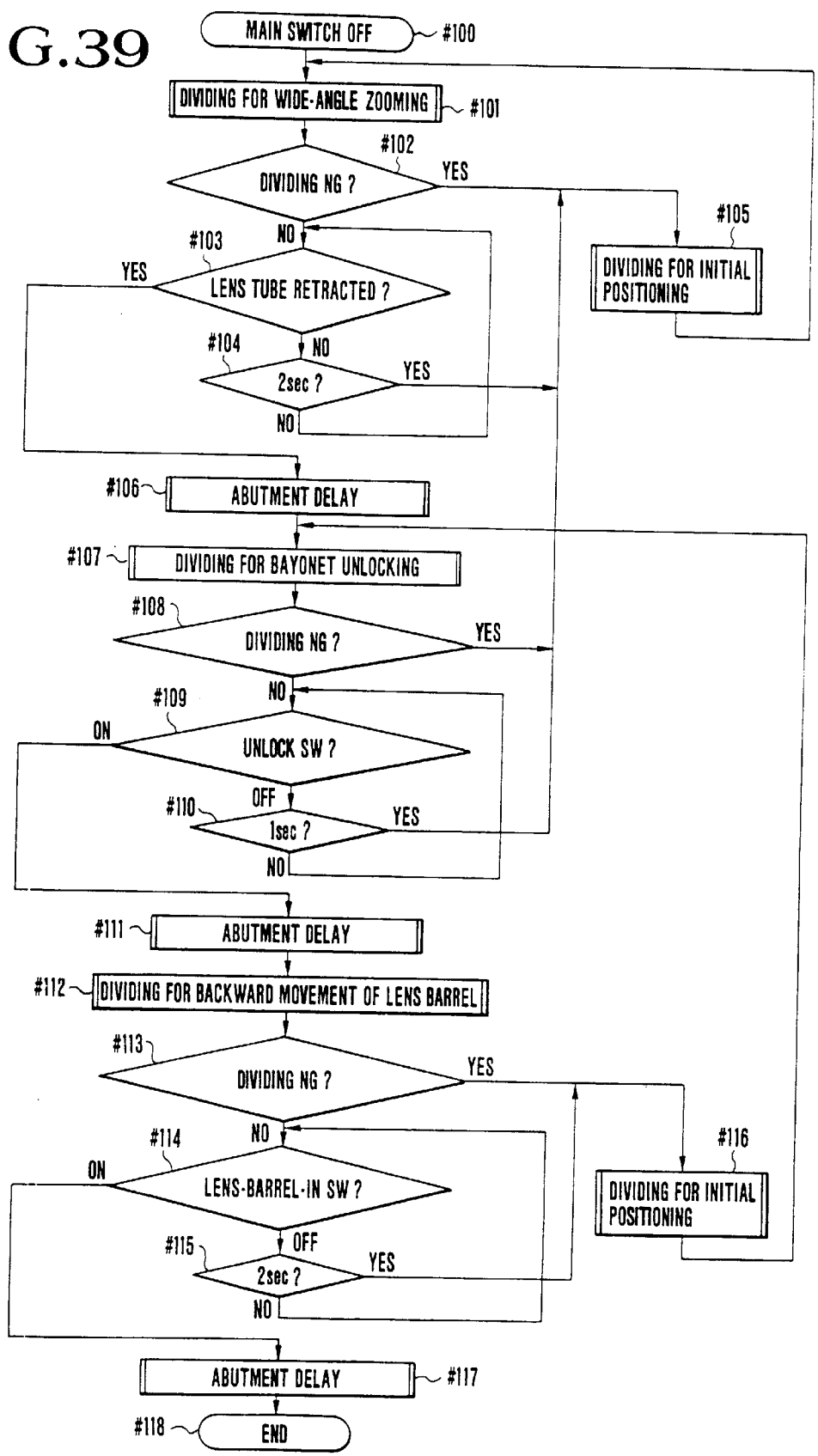
FIG. 39 is a flowchart showing an operation for causing the lens barrel to retract, executed by the control circuit of FIG. 38.

An operation for causing the lens barrel 55 to retract, executed by the control circuit 501, will be described below with reference to the flowchart of FIG. 39.

This process is started in Step #100.

In Step #101, the output gear 9c, that is, the zooming mechanism, is selected as an element to which power is to be transmitted, and the motor 1 is energized so that it rotates in the "Rv" direction, that is, in the direction of wide-angle zooming. At this time, if a power-dividing error is detected, the process proceeds from Step #102 to Step #105. Whether the operation at this time is the power-dividing error is determined in the following manner: If the planetary gear 7 and the output gear 9c correctly mesh with each other, a "bright" pulse is inputted from the photocoupler 17, but if such a pulse is not inputted, it is determined that the power-dividing error has occurred. In Step #105, the "initial positioning" operation referred to in detail in the description of the power dividing device in the first embodiment is carried out, and the process returns to Step #101. With this operation, it is possible to again perform the power dividing operation of Step #101 even if this operation fails due to a phenomenon which may occur during the power dividing operation (specifically, "the operation of selecting an element to which power is to be transmitted") of Step #101, that is, due to a phenomenon in which a tooth tip of the output gear bites into that of the planetary gear 7 which was meshed with the output gear before power dividing is started. In nearly all cases, it is possible to restore an incorrect operation to a correct operation by carrying out the above-described operation of performing the required steps again.

If the process unconditionally returns to Step #101 at this time, the infinite loop of repeating the same operation may occur in the case of a structural abnormality. To avoid this problem, it is preferable to attach a certain condition to the execution of Step #105, for example, "if a user of the camera operates any switch, the process returns from Step #105 to Step #101" or "the process may automatically return from Step #105 to Step #101 up to a predetermined number of times".

If it is detected in Step #102 that the power dividing operation has succeeded, the process enters the loop of Steps #103 to #104.

In Step #103, it is determined whether the lens tube 53 has reached the backward end of its retracting path (hereinafter referred to as the "retracting end"), on the basis of the state of the zoom-position switch 510. In the next step #104, a check is made on the time required for the lens tube 53 to reach the retracting end. The process repeats this loop until a time period indicative of the detection of an abnormal state (in this case, two seconds) is reached. If the lens tube 53 reaches the retracting end in two seconds, the process proceeds from Step #103 to Step #106, where abutment energization is performed for bringing the lens tube 53 into full abutment with the retracting end. Then, the process proceeds to Step #107.

If it is detected from the state of the zoom-position switch 510 that the lens tube 53 has not yet reached the retracting end although two seconds have passed in Step #104, that is, although the time required for the lens tube 53 to reach the retracting end has passed, it is determined that an abnormality has occurred, and the process proceeds to Step #105. Such an abnormality is considered to be due to a number of causes: If a force is applied to the lens tube 53 from the outside, the lens tube 53 will operate abnormally, or even if the power dividing operation is not correctly performed in Step #101, the process may enter the loop of Steps #103 to #104 without detecting that fact (power-dividing error) (owing to, for example, the introduction of external noise into the output of the photocoupler 17). For the above and other reasons, the "initial positioning" operation is performed in Step #105, the power dividing operation of Step #101 is performed again.

If the lens tube 53 correctly reaches the retracting end, the process proceeds to Step #107 as described above. In Step #107, the element to which power to be transmitted is switched from the output gear 9c to the output gear 9b, that is, to the side of the bayonet lock mechanism, and the motor 1 is energized so that it rotates in the "Fw" direction (in the direction of mesh release).

The operation at this time is described in more detail. First, the plunger 16 is energized and the motor 1 is energized to rotate in the "Fw" direction reverse to the "wide-angle" direction, whereby the planetary gear 7 is made to disengage from the output gear 9c coupled to the zooming mechanism. The bayonet gear 63 is located in the "Fw" direction and the direction of energization for unlocking of the bayonet lock lever 62 is "Fw". Accordingly, when the position of the output gear 9b coupled to the bayonet lock mechanism is detected by the photocoupler 17, the energization of the plunger 16 is stopped and the planetary gear 7 and the output gear 9b are made to mesh with each other, and the energization for unlocking of the bayonet lock lever 62 is started in turn.

If the aforesaid power-dividing error is detected during the above-described operation, the process proceeds from Step #108 to Step #105. For example, if the planetary gear 7 does not completely exit from the crown stopper 10 and the holding stopper 11 and the power-dividing error takes place, the motor 1 is energized to rotate in the "Fw" direction for the purpose of causing the planetary gear 7 to perform the aforesaid "exit operation". As a result, during the operation shown in Steps #101 to #106, the motor 1 may be energized to rotate in the "Rv" direction, causing the lens tube 53 which has reached the retracting end to move forward. For this reason, to again energize the lens tube 53 before the unlocking operation of the bayonet lock lever 62 is performed again, the process returns to Step #105 as described above. By inserting the "initial positioning" operation, it is possible to escape from nearly all kinds of "power-dividing errors".

If the power dividing operation of Step #107 is correctly performed, the process proceeds to the loop of Steps #109 to #110, where the energization of the motor 1 is continued until the bayonet switch 65 is opened which changes its state in accordance with whether the bayonet lock lever 62 is locked or unlocked. If the bayonet switch 65 is opened, the process proceeds to Step #111, where abutment energization is performed.

If one second, which is a time period indicative of the detection of an abnormality elapses before the bayonet switch 65 is opened, the process proceeds from Step #110 to Step #105. In this case as well, as described in connection with Steps #103 to #104, not only the abnormality of the bayonet lock lever 62 or the bayonet lock mechanism but also a failure (power-dividing error) of the power dividing operation may have taken place, and the state of the lens tube 53 may not be the same as the state reached by the lens tube 53 at the time of the completion of step #106. For this reason, the process returns to Step #105, and the aforesaid series of operations starting with the drive of the lens tube 53 is performed again.

If the operation of unlocking the bayonet lock lever 62 is completed in Step #111, the element to which power is to be transmitted is switched from the output gear 9b to the output gear 9a, that is, to the side of the forward and backward lens-barrel moving mechanism, and the motor 1 is energized so that the output gear 9a can rotate in the "Rv" direction (retracting direction).

The operation at this time is described in more detail. First, the plunger 16 is energized and the motor 1 is energized to rotate in the "Rv" direction, whereby the planetary gear 7 is made to disengage from the output gear 9b coupled to the bayonet lock mechanism. Subsequently, when it is detected that the planetary gear 7 has reached the middle position between the output gear 9b and the output gear 9c coupled to the zooming mechanism, the direction of energization of the motor 1 is switched to the "Fw" direction. When the planetary gear 7 passes the position of the output gear 9b and then the position of the output gear 9a coupled to the forward/backward lens-barrel moving mechanism, the direction of energization of the motor 1 is switched to the "Rv" direction. When the planetary gear 7 reaches the position of the output gear 9a, the energization of the plunger 16 is stopped to cause the output gear 9a and the planetary gear 7 to mesh with each other.

If the aforesaid power-dividing error is detected during the above-described operation, the process proceeds from Step #113 to Step #116. For example, if the planetary gear 7 does not exit from the crown stopper 10 and the holding stopper 11 and the power-dividing error takes place, there is a strong possibility that the bayonet lock lever 62 unlocked in the operation of Steps #107 to #111 may be displaced from its unlocked position. In the power dividing operation, since the planetary gear 7 does not pass the position of the output gear 9c coupled to the zooming mechanism, the possibility that the planetary gear 7 may move up to the lens tube 53 is not strong. In this case, accordingly, after the "initial positioning" operation has been performed in Step #116, the process proceeds to Step #107 and the series of operations starting with the operation of unlocking the bayonet lock lever 62 is performed again.

If the power dividing operation is correctly performed in Step #112, the process proceeds to the loop of Steps #114 to #115. In this loop, the energization of the motor 1 is continued until the lens-barrel-in switch 509 (61) is turned on, the lens-barrel-in switch 509 (61) being turned on when the lens barrel 55 reaches the retracted position. When the switch 509 is turned on, abutment energization is performed in Step #117 and the retracting operation is brought an end in Step #118.

If two seconds, which is a time period indicative of the detection of an abnormality elapses before the lens-barrel-in switch 509 is turned on, the process proceeds from Step #115 Step #116, and the "initial positioning" operation is performed. In this case as well, as described in connection with Steps #109 to #110, not only the abnormality of the lens barrel 55 or the forward/backward lens-barrel moving mechanism but also a failure of the power dividing operation may have taken place. Accordingly, the process returns from Step #116 to Step #107 by the same reason as when the power-dividing error is detected in Step #113, and the series of operations starting with the operation of unlocking the bayonet lock lever 62 is performed again.

As described above, a number of different steps for performing the series of operations again are inserted at different positions in the sequence so that appropriate resetting can be performed for all possible failures which are expected to occur in the power dividing operation. Accordingly, it is possible to realize processing without condition for nearly all failures.

Figure 40:
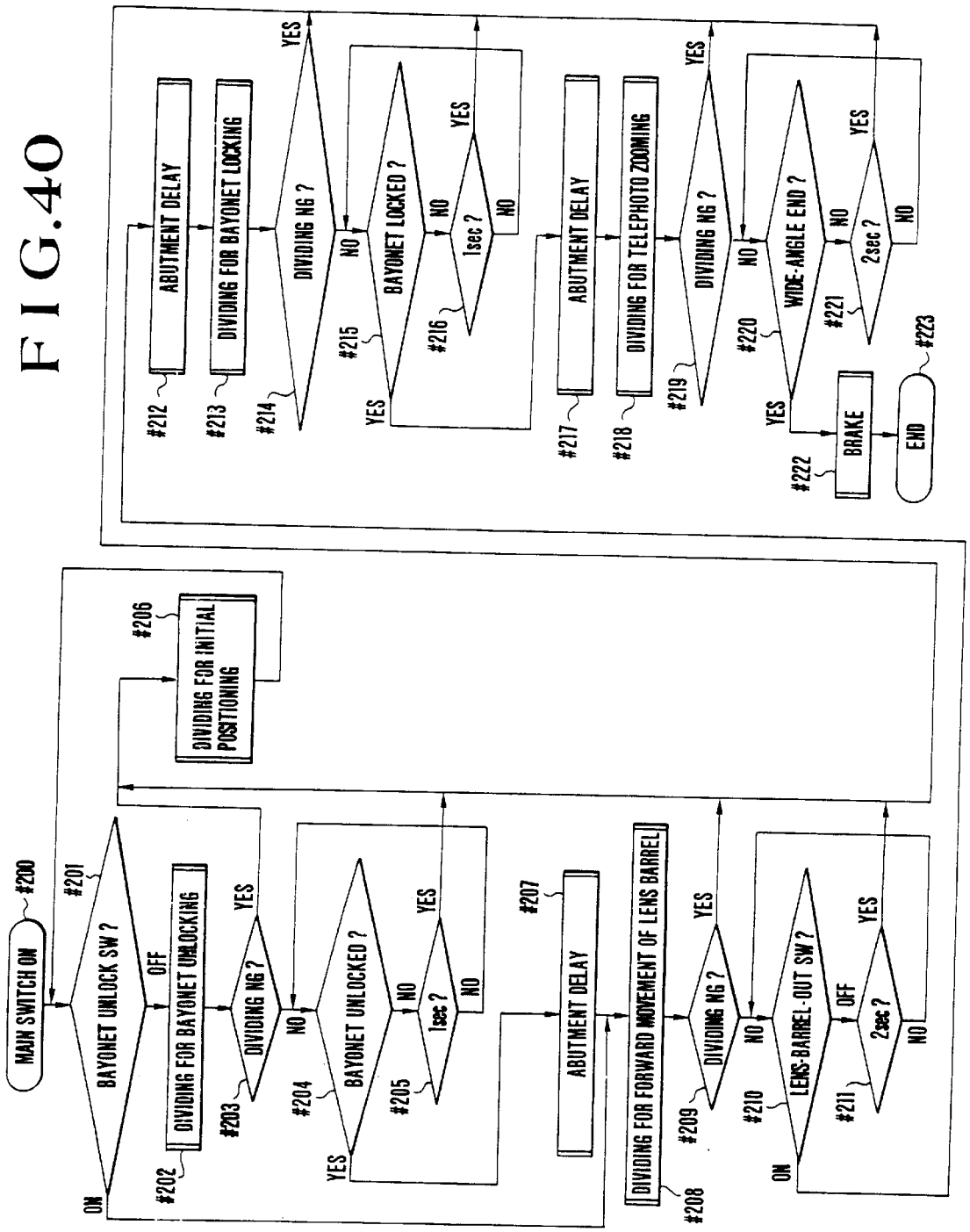
FIG. 40 is a flowchart showing an operation for causing the lens barrel to move forward, executed by the control circuit of FIG. 38.

The operation of causing the lens barrel 55 to move forward, executed by the control circuit 501, will be described below with reference to the flowchart of FIG. 40.

This operation is started in Step #200.

In Step #201, whether the bayonet lock lever 62 is in the unlocked state is determined from the state of the bayonet switch 507 (65). If the state of the bayonet switch 507 indicates that the bayonet lock lever 62 is not in the unlocked state (the contact piece of the bayonet switch 507 is open which is to be closed when the bayonet lock lever 62 is unlocked), the operation of unlocking the bayonet lock lever 62 is performed in Steps #202 to #207, as described in connection with Steps #107 to #111 of FIG. 39. If the state of the bayonet switch 507 indicates that the bayonet lock lever 62 is in the unlocked state (the contact piece of the bayonet switch 507 is closed which is to be closed when the bayonet lock lever 62 is unlocked), the process proceeds to Step #208.

In Step #208, the element to which power is to be transmitted is switched to the output gear 9c, that is, to the side of the forward and backward lens-barrel moving mechanism, and the motor 1 is energized so that the output gear 9c can rotate in the "Fw" direction (lens-barrel forward direction). In this operation, if a power-dividing error is detected from the output of the photocoupler 17, the process proceeds from Step #209 to Step #206. In Step #206, the above-described "initial positioning" operation for the power dividing device is performed, and the process returns to Step #201. The requirement for executing the operation of Step #206 is substantially the same as that described in connection with Step #105.

If the power dividing operation is correctly performed in Step #209, the process enters the loop of Steps #210 and #211. In Step #210, whether the lens barrel 55 has moved forward up to a position where it can be locked by the bayonet lock lever 62 is determined from the state of the lens-barrel-out switch 508 (60). In Step #211, the time taken until the switch 508 is turned on is measured, and the process repeats the loop until "two seconds", i.e., a time period indicative of the detection of an abnormality, elapses. If the switch 508 is turned on within "two seconds", abutment energization is performed in Step #212, and the process proceeds to the next step #213.

If "two seconds" elapses in Step #211, it is determined that an abnormality has occurred, and the process proceeds to Step #206. The abnormality may be due to the abnormality of the lens tube 53, but it may also be considered that although the power dividing operation has not been correctly performed in Step #208, the process has entered the loop of Steps #210 and #211 without detecting the power-dividing error. Accordingly, in Step #206, the "initial positioning" operation is performed, and the series of operations starting with the power dividing operation of Step #201 is performed again. Since the state of the bayonet lock lever 62 is again checked in Step #201, if the state of the bayonet lock lever 62 is changed in Step #208, it is possible to perform appropriate processing.

If the lens barrel 55 reaches the position where it can be locked by the bayonet lock lever 62, the element to which power is to be transmitted is switched to the output gear 9b, that is, to the side of the bayonet lock mechanism, and the motor 1 is energized so that the output gear 9b rotates in the "Rv" direction (lock direction).

The operation at this time is described in more detail. First, the plunger 16 is energized and the motor 1 is energized to rotate in the "Rv" direction reverse to the forward direction of the lens barrel 55, whereby the planetary gear 7 is made to disengage from the output gear 9a coupled to the zooming mechanism. The output gear 9b coupled to the bayonet lock mechanism is positioned in the "Rv" direction in which a retracting output is produced, and the direction of rotation of the bayonet lock lever 62 is the "Rv" direction. Accordingly, when the position of the output gear 9b is detected through the photocoupler 17, the energization of the plunger 16 is stopped to cause the planetary gear 7 and the output gear 9b to mesh with each other, and energization for bayonet lock is started in turn.

If a power-dividing error is detected during the above-described operation, the process proceeds from Step #214 to Step #206. For example, if the planetary gear 7 does not exit from the crown stopper 10 and the holding stopper 11 and the power-dividing error takes place, the motor 1 is energized to rotate in the "Rv" direction during the "exit operation" of the planetary gear 7. As a result, there is a possibility that the lens barrel 55 which has been moved forward by the energization of the motor 1 in the "Fw" direction in the operation of Steps #210 to #212 may be made to move backward. In this case, however, if the power dividing operation is simply performed again to cause the bayonet lock lever 62 to perform the locking operation, no desired result may be obtained. This is because not only the bayonet lock lever 62 or the bayonet lock mechanism but also a failure of the power dividing operation may have occurred, and there is also a possibility that the state of the lens tube 53 may not be the same as the state reached by the lens tube 53 at the time of the completion of Step #207. For this reason, the process returns to Step #206, and the series of operations starting with the drive of the lens tube 53 is performed again. As described above, the series of operations starting with the operation of moving the lens barrel 55 forward is again performed while the process is proceeding through Steps #206→#201→#208, whereby it is possible to again perform the locking operation of the bayonet lock lever 62.

If the power dividing operation is correctly performed in Step #213, the process proceeds from Step #214 to the loop of Steps #215 and #216. In the loop, the energization of the motor 1 is continued until the bayonet switch 65 is locked. When the bayonet switch 65 is locked, the process proceeds to Step #217, where abutment energization is performed.

If one second, which is a time period indicative of the detection of an abnormality, elapses before the bayonet switch 65 is locked, the process proceeds from Step #216 Step #206. In this case as well, as described in connection with steps #210 to #211, not only the abnormality of the bayonet lock lever 62 or the bayonet lock mechanism but also a failure of the power dividing operation may have taken place, and the state of the lens tube 53 may not be the same as the state reached by the lens tube 53 at the time of the completion of step #213. For this reason, the process returns to Step #206, and the aforesaid series of operations starting with the drive of the lens tube 53 is performed again.

If the locking operation of the bayonet lock lever 62 is completed in Step #217, the process proceeds to Step #218, where the element to which power dividing is to be directed is switched to the output gear 9c, that is, the zooming mechanism, and the motor 1 is energized so that the output gear 9c can rotate in the "Fw" direction (the telephoto direction).

The operation at this time is described in more detail. First, the plunger 16 is energized and the motor 1 is energized to rotate in the "Fw" direction, whereby the planetary gear 7 is made to disengage from the output gear 9b coupled to the bayonet lock mechanism. Subsequently, when it is detected that the planetary gear 7 has reached the middle position between the output gear 9b and the output gear 9a, the direction of energization of the motor 1 is switched to the "Rv" direction. When the planetary gear 7 passes the position of the output gear 9b and then the position of the output gear 9c, the direction of energization of the motor 1 is switched to the "Fw" direction. When the planetary gear 7 reaches the position of the output gear 9c, the energization of the plunger 16 is stopped to cause the output gear 9c and the planetary gear 7 to mesh with each other.

If a power-dividing error is detected during the above-described operation, the process proceeds from Step #219 to Step #206. For example, if the planetary gear 7 does not exit from the crown stopper 10 and the holding stopper 11 and the power-dividing error takes place, there is a strong possibility that the bayonet lock lever 62 locked in the operation of Steps #213 to #217 may be displaced from its locked position. If the lock by the bayonet lock lever 62 is imperfect, the aforesaid locking operation must be again performed. However, to lock the bayonet lock lever 62 again, the lens barrel 55 must be moved up to its most forward position. To move the lens barrel 55 to the most forward position by the energization of the motor 1, the bayonet lock lever 62 must be completely unlocked. As a result, the following steps are performed again: Step #206 to Steps #201 to #207 for unlocking the bayonet lock lever 62, Steps #208 to #212 for moving the lens barrel 55 forward, and Steps #213 to #217 for again performing the locking operation of the bayonet lock lever 62.

More specifically, if a power-dividing error occurs in the operation of Step #218, the process returns from Step #206 to Step #201 and the unlocking operation of the bayonet lock lever 62 is performed as described in connection with Steps #107 to #111 of FIG. 39. The outline of the unlocking operation is stated below. In Step #201, it is checked whether the bayonet lock lever 62 is unlocked. If the bayonet lock lever 62 is not unlocked, the element to which power is to be transmitted is switched to the bayonet lock mechanism in Step #202. In Step #203, it is detected whether a power-dividing error has occurred, and in the loop of Steps #204 and #205, the state of the bayonet switch 507 is checked. In Step #207, abutment energization is performed, and the process returns to the ordinary flow shown in Step #208 and the subsequent steps.

If the power dividing operation of Step #218 is correctly performed, the process proceeds to the loop of Steps #220 and #221. In this loop, the energization of the motor 1 is continued until the lens tube 53 reaches the wide-angle end. If the zoom-position switch 510 is set to its wide-angle end position, the motor 1 is energized for braking the lens tube 53 in Step #222, and the forward lens-barrel moving operation is brought to an end in Step #223. If two seconds, which is a time period indicative of the detection of an abnormality, elapses before the zoom-position switch 510 is set to the wide-angle end position, the process proceeds from Step #221 to #206, and the "initial positioning" operation is performed. In this case as well, not only the abnormality of the lens tube 53 or the zooming mechanism but also a failure of the power dividing operation may have taken place. Accordingly, the process returns to Step #206 by the same reason as when the power-dividing error is detected in Step #218, and the series of operations starting with the locking operation of the bayonet lock lever 62 is performed again.

According to the second embodiment described above, in a camera which is arranged to execute a sequence of photographic operations while performing power dividing and transmitting the divided power to individual mechanisms sequentially in time by using a power dividing device, part of the mechanisms occasionally do not operate correctly. A typical cause of such an incorrect operation is as follows: During a power dividing operation, if a tooth tip of the planetary gear 7 bites into any one of the output gears 9a to 9d or a force is applied from the outside, an abnormality may occur in a photographic lens barrel part or in a power transmission mechanism for transmitting the output of the output gear to the photographic lens barrel part. Otherwise, in the method of identifying the position of the planetary gear 7 during revolution on the basis of the output of a single photocoupler 17, noise may be introduced into the output of the photocoupler 17 and a detection error may occur. It has been experimentally found that nearly all of the above-described mechanical abnormalities can be solved by performing the "initial positioning" operation and performing the required steps again. Further, even if the fact that a particular operation was not correctly performed owing to a detection error due to noise is detected during a subsequent operation, it is possible to restore the incorrect operation to a correct operation by performing the required steps again (since the probability that noise is introduced under the same conditions is extremely low). For the above-described reasons, it is determined which of the mechanism is operating when an abnormality occurs, and it is determined in which step of the entire process a restoration operation (the operation of again performing the required steps including the "initial positioning" operation) should be started. (The process is not always started all over again, that is to say, after the process is returned to the step in which the abnormality may have occurred, the restoration operation is started in that step.) The series of photographic operations can be made to proceed from the thus-determined step to the last step.

Accordingly, in spite of an inexpensive and compact arrangement using an error-free expensive part or large-scale device, if a failure such as the above-described one takes place, it is possible to automatically eliminate the failure so that the photographic sequence can be made to securely proceed up to the last step in the minimum required time. Accordingly, it is possible to achieve an extremely effective power dividing device.

As described above, according to the second embodiment, there is provided an arrangement including detection-signal generating means for detecting a plurality of states of operation, identifying means for identifying the state of progress of the operation on the basis of the state of generation of a detection signal from the detection-signal generating means, restoration selecting means for selecting a method of restoration from a malfunction on the basis of both a signal indicative of the malfunction which is generated from the detection-signal generating means and the state of progress of the operation identified by the identifying means. If the operation is not correctly performed, a restoration operation is started in the last operational step in which the operation was correctly executed, according to the state of progress of the operation at that time. Accordingly, in an arrangement in which a series of photographic operations can be completed by performing a plurality of operations, even if a particular operation is not correctly performed, the operation error can be automatically eliminated and the photographic operations can be made to securely proceed to the last step in the minimum required time.

Figure 41:
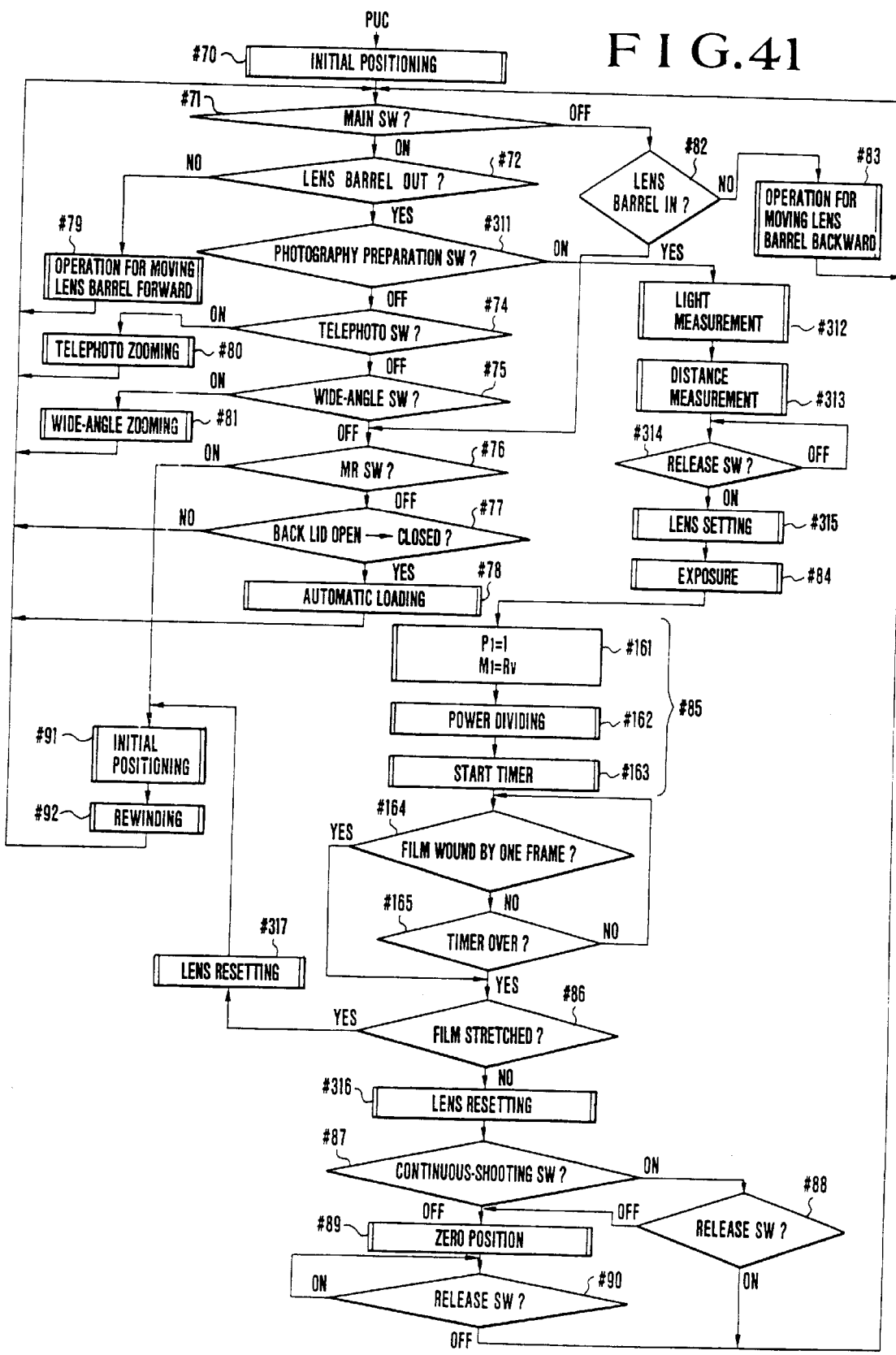
FIG. 41 is a flowchart showing the main operation of the control circuit 24 according to a third embodiment.

A third embodiment will be described with reference to FIG. 41. The third embodiment differs from the first embodiment merely in the design of a flowchart showing the operation of the control circuit, and only different steps will be described below. In the flowchart of FIG. 41, the same step numbers are used to denote steps which are identical to those explained in connection with the first embodiment, and description thereof is omitted.

Step #311: It is determined whether the shutter release button has been operated up to the first stroke position and a photography readiness switch has been turned on. If the photography readiness switch has been turned on, the process proceeds to Step #312.

Step #312: An AE circuit (not shown) is operated to obtain light measurement information.

Step #313: An AF circuit (not shown) is operated to obtain distance measurement information.

Step #314: It is determined whether the shutter release button has been operated up to the second stroke position and a shutter release switch has been turned on. If the shutter release switch has been turned on, the process proceeds to Step #315.

Step #315: A stepping motor (not shown) is driven on the basis of the distance measurement information obtained in Step #312, thereby setting a third-group lens to a predetermined position. Then, the process proceeds to Step #84.

Step #84: A shutter opening and closing operation is performed on the basis of the light measurement information obtained in Step #312, and exposure of a film is performed. Then, the process proceeds to Step #161.

Steps #161 to #165: winding of the film is performed. As described above, in the third embodiment, since the film winding operation is performed immediately after the completion of exposure of the film, it is possible to confirm the completion of the photography upon the completion of the exposure operation.

Step #86: It is determined whether the film is in a stretched state. If it is in the stretched state, the process proceeds to Step #317; otherwise, the process proceeds to Step #316.

Step #316: The stepping motor is driven to reset the third-group lens to its initial position. The process proceeds to Step #87.

Step 317: The stepping motor is driven to reset the third-group lens to the initial position. The process proceeds to Step #91.

According to the third embodiment, as is readily understood from FIG. 41, a sequence for generating a drive sound which makes it possible for a photographer to confirm the completion of photography is inserted at a point in time as close as possible to the time when the shutter release button reaches the second stroke position (the shutter release switch is turned on). More specifically, after a shutter opening and closing operation, a film winding operation is performed prior to the resetting of the photographic lens to the initial position so that the drive sound can be generated at a time as close as possible to the time when the shutter release button reaches the second stroke position. Accordingly, a physical sensation experienced by the photographer when he/she operates the shutter release button is improved, whereby the photographer can perform photography without anxiety.

The third embodiment has been described with reference to a system using a three-group zoom lens arrangement whose third-group lens is used for focusing. However, the present invention is not limited to such a system, and can of course be applied to a wide variety of cameras using autofocus devices, such as a camera using a two-group zoom lens arrangement whose first-group lens is used for focusing and a camera using a single-focus lens.

As described above, according to the third embodiment, there is provided an arrangement including restoration operation instructing means for instructing lens-position controlling means to execute the operation of restoring the photographic lens to its initial position after the completion of a film winding operation which is performed by film transporting means after the completion of an exposure operation. In such an arrangement, the film winding operation which is capable of generating a drive sound indicative of the completion of the photography is executed immediately after the completion of the exposure operation, and the photographic lens is then restored to the initial position. Accordingly, the physical sensation of a photographer for a shutter release operation is improved, whereby the photographer can perform photography without anxiety.

A fourth embodiment will be described below with reference to FIGS. 42 to 44. In the following description, reference is made to only the parts of the fourth embodiment which differ from those of the first embodiment.

Figure 42:
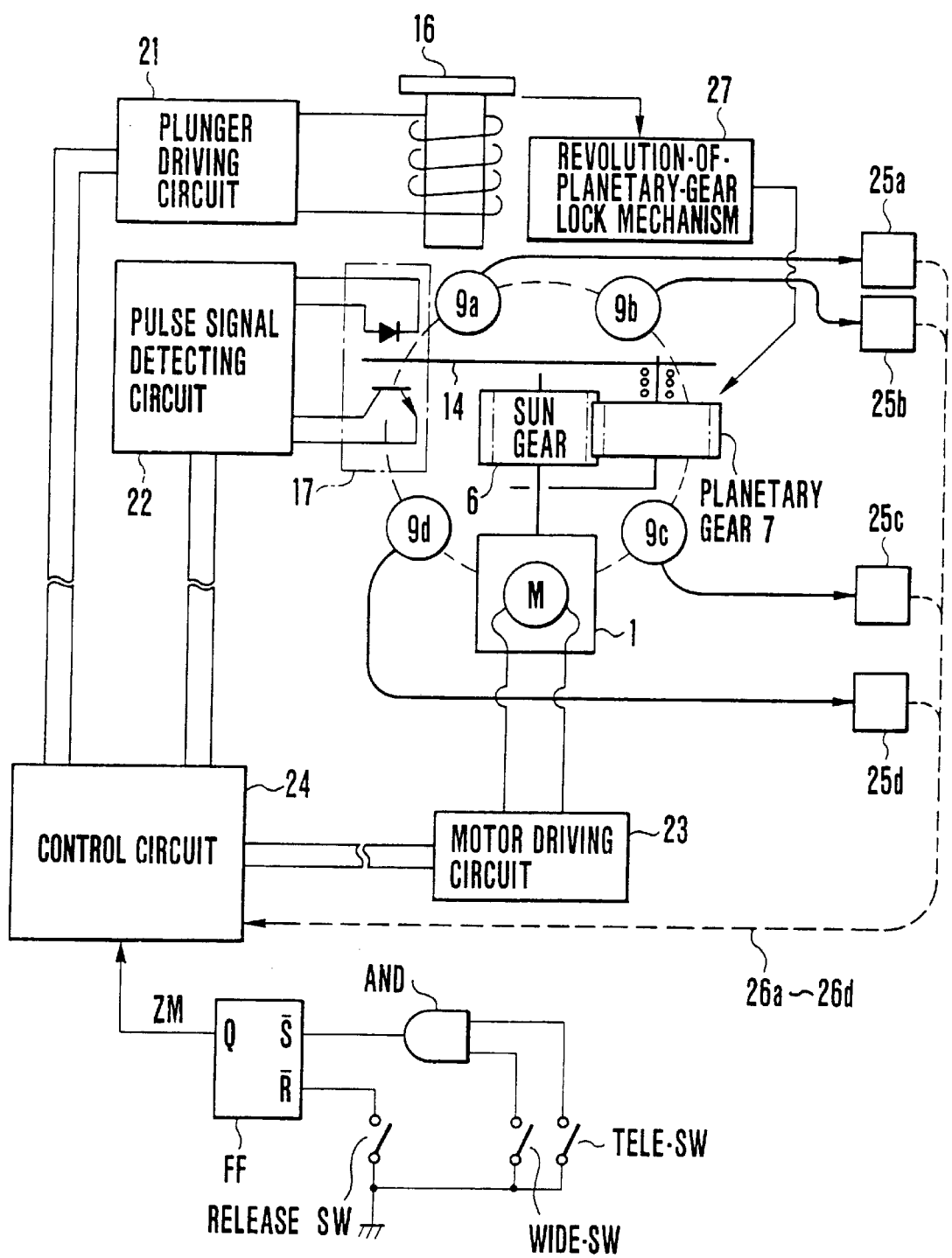
FIG. 42 is a circuit block diagram showing the arrangement of the essential parts of a camera according to a fourth embodiment.
Figure 43:
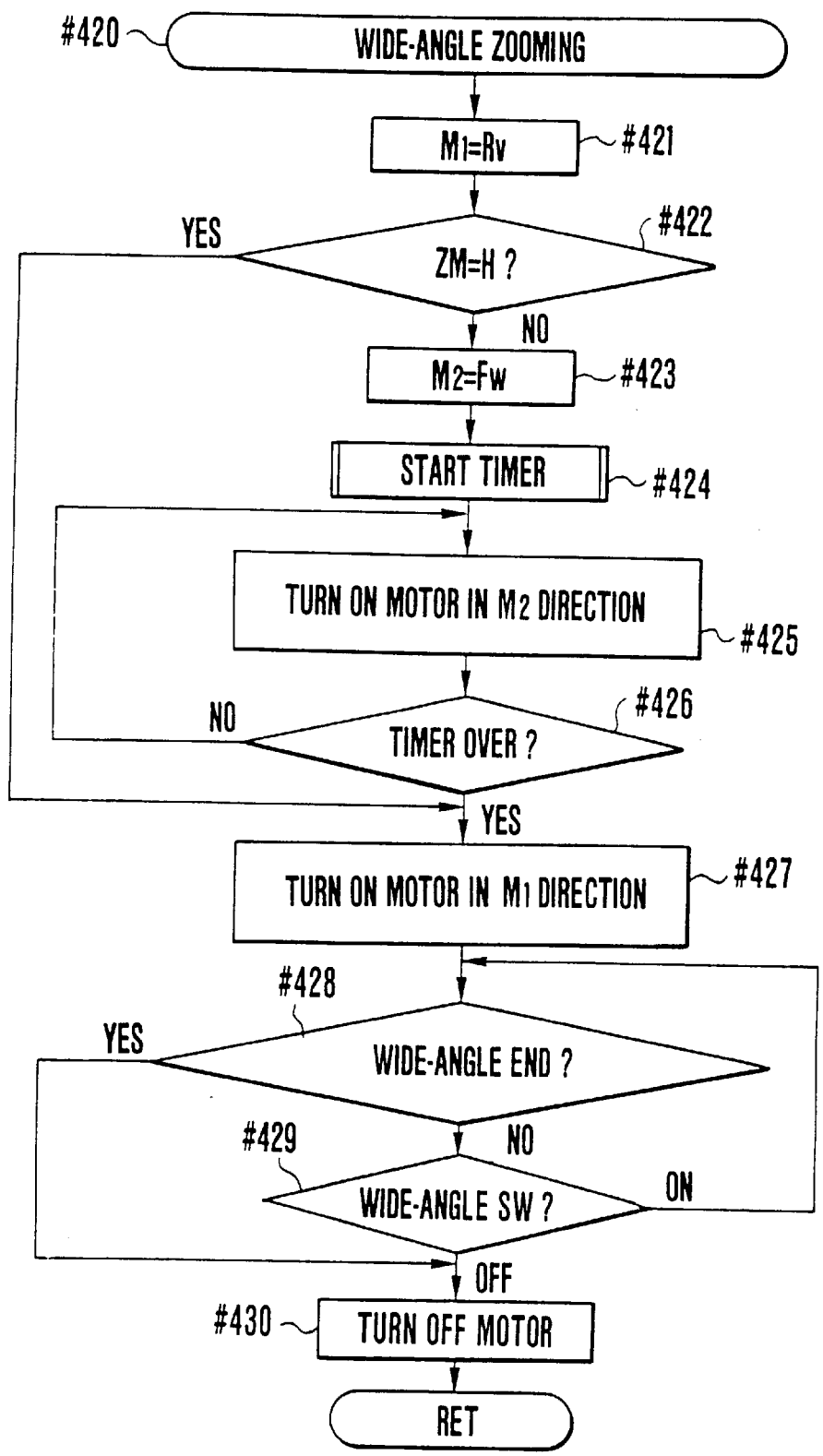
FIG. 43 is a flowchart showing the operation of the control circuit of FIG. 42.

FIG. 42 is a schematic view showing the essential circuit blocks and mechanical parts of a camera.

The camera shown in FIG. 42 includes the plunger driving circuit 21 for turning on or off the plunger 16, the pulse signal detecting circuit 22 for detecting the output pulse of the photocoupler 17, and the motor driving circuit 23 for turning on or off the motor 1 shown in several figures such as FIG. 1 and for providing control of rotation relative to the "Rv" direction and rotation relative to the "Fw" direction.

The circuits 21, 22 and 23 are controlled by the control circuit 24. The shown camera also includes the output gears 9a to 9d described previously, and the power of a desired one of the output gears 9a to 9d is transmitted to the corresponding one of the mechanisms (the lens-barrel driving system and the film-transportation driving system) 25a to 25d through the associated gear train (not shown but represented by a thick line), as described previously with reference to FIG. 16. The resultant drive signal 26a, 26b, 26c or 26d is fed back to the control circuit 24. The shown camera also includes the revolution-of-planetary-gear lock mechanism 27 made up of elements such as the arm 15, the rotation-stopping arm 12, the crown stopper 10 and the holding stopper 11.

An element AND is an AND gate having two inputs, and the state signals of a telephoto switch (TELEPHOTO SW) and a wide-angle switch (WIDE-ANGLE SW) which are operated for zooming are inputted to the respective input terminals. An element FF is an RS flip-flop, and the output signal of the AND gate AND and the state signal of a shutter release switch (shutter release SW) of the camera are inputted to the respective input terminals (low active) of the RS flip-flop.

The outline of the fourth embodiment will be described below before a description of the operation of the part of the control circuit 24 which is associated with the present invention.

If the motor 1 is stopped with the planetary gear 7 remaining in mesh with an arbitrary one of the output gears 9a to 9d, a gear train extending from the output gear in mesh is prevented from idling and the mechanism of an element to which power is to be transmitted can be locked, whereby occurrence of an unwanted operation can be prevented. In the fourth embodiment, one example of such a process is performed during normal photography (the main switch off). More specifically, when the main switch is on, the planetary gear 7 remains in mesh with the gear 9c which is coupled to the zoom driving gear 312. In a zooming operation, the motor 1 is driven to rotate in the "Fw" or "Rv" direction with the planetary gear 7 in mesh with the gear 9c. When film winding after a shutter release operation is to be performed, the planetary gear 7 is made to mesh with the output gear 9d coupled to the film-transportation driving system for the purpose of performing the film winding. After the completion of the film winding, the planetary gear 7 is again made to mesh with the output gear 9c.

The reasons why the above-described operation is needed are that what an operator can easily touch among the mechanism parts of the camera when the main switch is on is the lens barrel 314 or the lens tube 316 shown in FIG. 16 referenced previously in connection with the first embodiment, and that the lens barrel 316 easily moves at a touch. However, in the state wherein the planetary gear 7 is in mesh with the output gear 9c, the lens barrel 314 does not move since it is fixed by the bayonet ring 311.

Actual film transportation in such gear locking and gear locking for the zoom driving gear 312 during a zooming operation will be described below with reference to FIG. 44.

When the main switch is on, the planetary gear 7 is meshed with the output gear 9c coupled to the zoom driving gear 312 so that the lens tube 316 shown in FIG. 16 is prevented from moving owing to an external force. It is assumed here that the rotation of the motor 1 (the sun gear 6) in the "Fw" direction corresponds to the energization of the motor 1 in the telephoto direction or the rotation thereof in the direction of film winding, while the rotation of the motor 1 (the sun gear 6) in the "Rv" direction corresponds to the energization of the motor 1 in the wide-angle direction or the rotation thereof in the direction of film rewinding.

Normally, the planetary gear 7 is meshed with the output gear 9c and performs a zooming operation in accordance with the rotation of the motor 1. For example, in a case where the zooming operation is controlled by a zooming driving method based on energization with the planetary gear 7 biased to a telephoto side, when the zooming operation is completed, the end portion 12c of the rotation-stopping arm 12 is stopped in abutment with the "Fw"-side face of a cutout of the crown stopper 10, that is, the end face 10a-1 shown in FIG. 44.

If a shutter release operation is performed, the planetary gear 7 revolves in the "Rv" direction while performing the operation of selecting an element to which power dividing is to be directed, and meshes with the output gear 9d in the same direction. The rotation-stopping arm 12 comes into abutment with an end face 10b-2 of an adjacent cutout of the crown stopper 10. Subsequently, the rotation of the planetary gear 7 in the "Rv" direction is transmitted to the output gear 9d so that a film winding operation is performed through the planetary gear 304 for film transportation.

After the completion of the film winding operation, to prevent the output gear 9c for zoom driving from idling, the planetary gear 7 revolves while performing the operation of selecting an element to which power dividing is to be directed, and meshes with the output gear 9c. When the planetary gear 7 meshed with the output gear 9c, the rotation of the motor 1 is stopped. At this time, the following operation is needed: The planetary gear 7 meshes with the output gear 9c while revolving in the "Fw" direction, and when the end portion 12c of the rotation-stopping arm 12 enters the area between the end faces 10a-1 and 10b-1 of the cutout of the crown stopper 10, the rotation of the motor 1 is stopped.

However, in the fourth embodiment, since the pulse disc 14 and the photocoupler 17 are used to detect both the position of the planetary gear 7 during revolution and a signal to establish timing to turn on and off the plunger 16 which limits and releases the revolution of the planetary gear 7, it is necessary to continuously execute both the operation of selecting through the revolution of the planetary gear 7 an element to which power dividing is to be directed and the operation of rotating the succeeding element to which power is to be transmitted, as described in connection with the "entrance operation".

Accordingly, it is necessary to stop the rotation of the motor 1 under predictive control based on the prediction of the stop of the revolution of the planetary gear 7, that is, the prediction of the entrance of the end portion 12c of the rotation-stopping arm 12 into the area between the end faces 10a-1 and 10d-1 of the cutout of the crown stopper 10. In this case, there are three cases depending on timing to stop the motor 1:

1) The motor 1 is stopped at the same time that the revolution of the planetary gear 7 is stopped.
2) Even after the revolution of the planetary gear 7 in the "Fw" direction has been stopped, the rotation of the motor 1 is not stopped and the output gear 9c is made to rotate in a telephoto driving direction (in the "Fw" direction), and the lens tube 316 is moved.
3) Before the revolution of the planetary gear 7 is stopped, the rotation of the motor 1 is stopped and the end portion 12c of the rotation-stopping arm 12 is left on the holding stopper 11, and the planetary gear 7 becomes unable to revolve.

In the case 1), there is no problem. Regarding the case 2), it is inconvenient in practical use that the lens tube 316 moves each time a film winding operation is performed. For this reason, the rotation of the motor 1 must be stopped by using timing of as short duration as possible, but in this case, the case 3) may occur. In the case 3), the state of operation after the completion of film transportation may seem to be normal on the camera side. However, subsequently, if a zooming operation is performed, the following operations will be encountered:

a) In the case of driving in the telephoto direction, the planetary gear 7 revolves in the "Fw" direction until the end portion 12c of the rotation-stopping arm 12 enters the cutout of the crown stopper 10, and subsequently a normal driving operation in the telephoto direction can be performed.

b) In the case of driving in the wide-angle direction, the planetary gear 7 meshes with the output gear 9d while revolving in the "Rv" direction, and causes the output gear 9d to rotate in the film-winding direction.

The operation of the case b) is not a correct operation. To cope with the case b), in the fourth embodiment, the following control is performed.

After the completion of film transportation, instead of stopping the rotation of the motor 1 by using such timing that the occurrence of the case 2) can be prevented, the case 3) is assumed to take place as the worst case and the following process is performed. If a signal indicative of driving in a wide-angle direction arrives, the motor 1 is driven to rotate in the "Fw" direction during a slight period, to make the planetary gear 7 revolve in the "Fw" direction. The planetary gear 7 meshes with the output gear 9c and the end portion 12c of the rotation-stopping arm 12 enters the area between the end faces 10a-1 and 10d-1 of the cutout of the crown stopper 10, thereby causing the revolution of the planetary gear 7 to stop. Then, the motor 1 is driven to rotate in the wide-angle driving direction, i.e., in the "Rv" direction. In this case, the slight period during which the motor 1 is driven to rotate in the "Fw" direction must be longer than the timing during which the end portion 12c of the rotation-stopping arm 12 enters from the state of FIG. 44 into the cutout of the crown stopper 10 (the area between the end faces 10a-1 and 10d-1), but shorter than the timing during which the operation of the planetary gear 7 is switched from revolution to rotation and the backlash of a gear train extending to the lens tube 316 which constitutes a zoom barrel is biased in the telephoto driving direction and the lens tube 316 starts moving in the telephoto direction.

Figure 44:
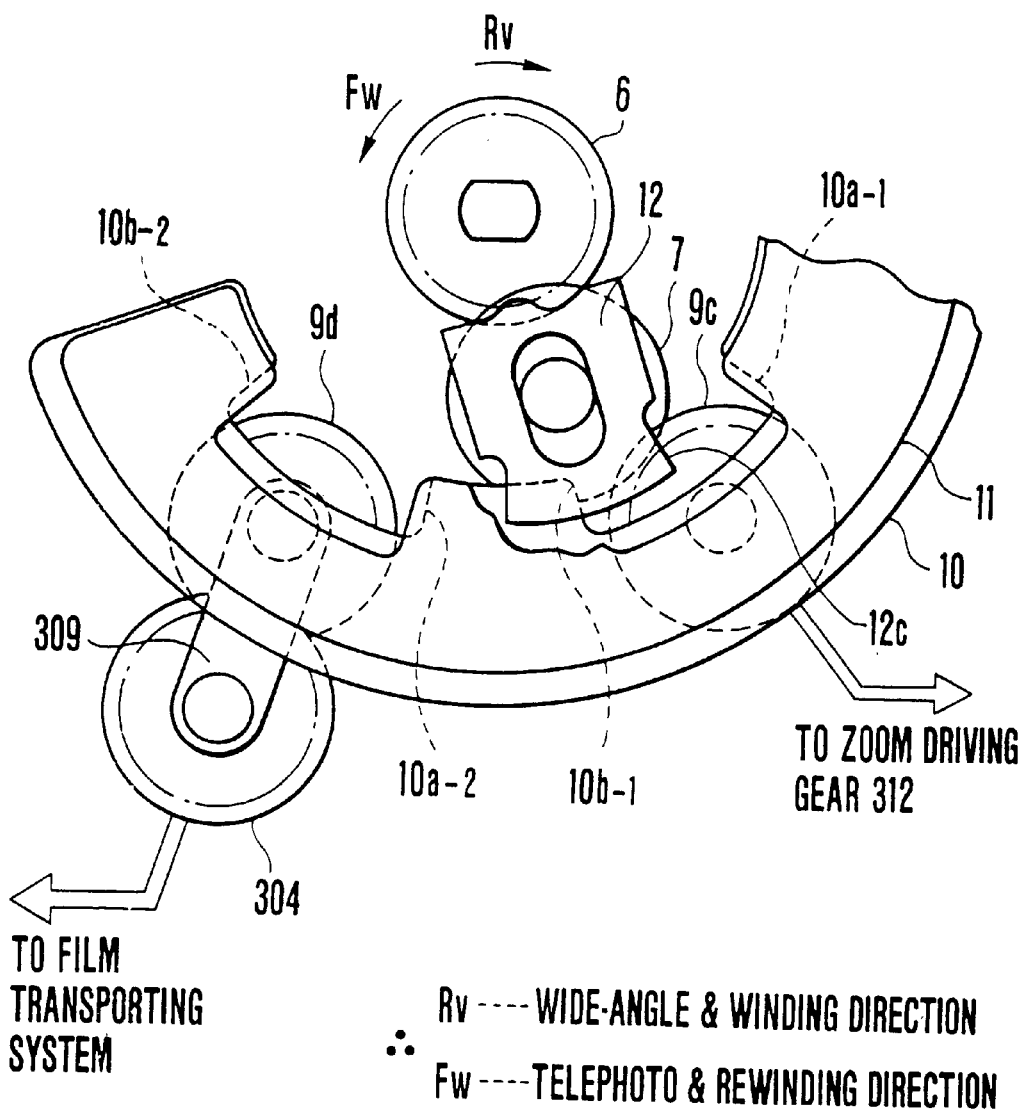
FIG. 44 is a schematic plan view showing essential parts in the fourth embodiment.

As described above, it is assumed that no correct limitation of the revolution of the planetary gear 7 is performed (it is assumed that the end portion 12c of the rotation-stopping arm 12 is located on the holding stopper 11 as shown in FIG. 44) in the case of applying gear locking to the zooming mechanism, that is, in the case of performing the operation of applying gear locking to the lens tube 316 which is located in, for example, the middle position between the telephoto end and the wide-angle end so that the zoom position of the lens tube 316 is not moved. On the above-described assumption, the control of causing the rotation-stopping arm 12 to enter the cutout of the crown stopper 10 is necessarily inserted before the start of power transmission, whereby the reliability of the gear lock mechanism can be improved.

To achieve the above-described operations, it is necessary to detect whether the signal indicative of driving in the wide-angle direction arrives "after the element to which power dividing is to be directed has been switched to the side of the zooming mechanism, that is, from the output gear 9d to the output gear 9c, after the completion of film winding following a normal shutter release operation" (If the previous operation is the same zooming operation, it is not necessary to perform instantaneous driving in the telephoto direction). A circuit part for detecting the state of the previous operation is constituted by the AND gate and the RS flip-flop FF which are shown in FIG. 42.

When the telephoto switch (TELEPHOTO SW) or the wide-angle switch (WIDE-ANGLE SW) are turned on to start an associated zooming operation, the output of the AND gate AND is inverted to a low level and the RS flip-flop is set. An output ZM provided at an output terminal Q of the RS flip-flop is set to a high level. If a shutter release operation is performed, the shutter release switch is turned on, and the RS flip-flop FF is set and the output ZM at the output terminal is reset to a low level. Accordingly, the output ZM is checked during a wide-angle zooming operation, and if the high level is detected, this indicates that the previous output is a zooming operation, while if the low level is detected, this indicates that the previous operation is a normal shutter release operation.

The operation of the above-described control circuit 24 will be described below with reference to the flowchart of FIG. 43.

The process jumps to this flow from the step of a "wide-angle zooming" operation in a main flow which is not shown.

Step #421: A direction M of rotation of the motor 1 is set to the "Rv" direction.

Step #422: It is determined whether the previous operation is a zooming operation or a shutter release operation, from the output ZM of the above-described RS flip-flop. If ZM=H, that is, if the previous operation is a zooming operation, the process proceeds to Step #427. If ZM=L, that is, if the previous operation is a shutter release operation, the process proceeds to Step #423.

Step #423: To drive the motor 1 to rotate in the direction "Fw" direction, the direction of rotation of the motor 1 is set to "M=Fw".

Step #424: An internal timer is started.

Step #425: The motor 1 is driven to rotate in the "Fw" direction to cause the planetary gear 7 to revolve in the "Fw" direction.

Step #426: It is determined whether the internal timer has counted a predetermined time. If the internal timer has not completed counting, the process returns to Step #425. Subsequently, if it is determined that the predetermined time has elapsed, the planetary gear 7 meshes with the output gear 9c to cause the end portion 12c of the rotation-stopping arm 12 to enter the area between the end faces 10a-1 and 10d-1 of the corresponding cutout of the crown stopper 10. It is determined that the planetary gear 7 has stopped revolving, and the process proceeds to Step #427.

Step #427: To perform a wide-angle zooming operation, the motor 1 is driven to rotate in the "Rv" direction.

Step #428: It is determined from the state of a switch (not shown) whether the lens tube 316 has reached the wide-angle end. If it has not reached the wide-angle end, the process proceeds to Step #429: otherwise, the process proceeds to Step #430.

Step #429: It is determined whether the wide-angle switch (WIDE-ANGLE SW) is on or off. If the wide-angle switch (WIDE-ANGLE SW) remains on, the process returns to Step #428.

Step #430: Since lens tube 316 has reached the wide-angle end or a desired wide-angle zoom position and the wide-angle switch (WIDE-ANGLE SW) has been turned off, the energization of the motor 1 is stopped.

In the fourth embodiment, if the lens tube 316 which constitutes the zoom barrel is located in a freely operable position between the telephoto end and the wide-angle end, the operation of applying gear locking to the zooming mechanism so that the zoom barrel 316 does not move in that position is executed. However, on the assumption that the gear locking of the motor 1 may not be correctly achieved as shown in FIG. 44, the control of causing the rotation-stopping arm 12 to necessarily enter the cutout of the crown stopper 10 before the start of power transmission in the wide-angle direction is carried out. Accordingly, it is possible to improve the reliability of the gear lock mechanism. Specifically, it is possible to prevent the planetary gear 7 from erroneously meshing with the output gear 9d for film transportation and performing film winding during a driving operation in the wide-angle direction.

As described above, according to the fourth embodiment, there is provided an arrangement including instructing means for instructing power-dividing controlling means to bring a planetary gear into mesh with an output gear coupled to a power transmission mechanism which may be subjected to an external force by accident, and simultaneously to stop power transmission to the output gear, after the completion of the power transmission, and mesh controlling means for performing the operation of again bringing the planetary gear 7 into mesh with the output gear before the start of power transmission to the output gear coupled to the power transmission mechanism which may be subjected to an external force by accident. In the above-described arrangement, the planetary gear 7 is made to again mesh with the output gear before the start of power transmission to the output gear coupled to the power transmission mechanism which may be subjected to an external force by accident. Accordingly, even if the operation of meshing the planetary gear with the output gear coupled to the power transmission mechanism, which may be accidentally subjected to an external force, in accordance with an instruction given by the instructing means, is not correctly performed, such an operation is performed again in a similar manner, so that the power transmission to the output gear is started after the gears have securely meshed with each other. Accordingly, it is possible to prevent unexpected movement of a mechanism which may be subjected to an external force by accident. In addition, a subsequent power transmission operation can be reliably performed.

What is claimed is:

1. A power transmission apparatus, comprising:
    a first rotation portion which is rotatable and transmits a driving power by rotation thereof;
    a second rotation portion which is rotatable and revolves around said first rotation portion in association with rotation of said first rotation portion;
    a plurality of operation systems, each of which is selectively engagable with said second rotation portion by revolution of said second rotation portion around said first rotation portion, so as to receive the driving power from said first rotation portion;
    a restriction device which restricts revolution of said second rotation portion around said first rotation portion;
    a determination device which determines a revolution position of said second rotation portion relative to said first rotation portion; and
    a control device which rotates said first rotation portion so as to cause said second rotation portion to revolve around said first rotation portion to a position where said second rotation portion engages a predetermined operation system of said plurality of operation systems when said first rotation portion finishes a driving operation, and controls said restriction device so as to regulate revolution of said second rotation portion through to the position where said second rotation portion engages the predetermined operation system in accordance with a determination of said determination device.

2. A power transmission apparatus according to claim 1, further comprising a motor which generates the driving power.

3. A power transmission apparatus according to claim 1, wherein said determination device includes an optical detection device which detects the revolution position of said second rotation portion.

4. A power transmission apparatus according to claim 1, wherein said restriction device includes an electromagnetic driving devices.

5. A power transmission apparatus according to claim 1, wherein said restriction device holds said second rotation portion so as to prevent revolution of said second rotation portion around said first rotation portion.

6. A power transmission apparatus according to claim 1, wherein said predetermined operation system includes an optical unit driving system.

7. A power transmission apparatus according to claim 1, wherein said predetermined operation system includes a lens driving system.

8. A power transmission apparatus according to claim 1, wherein said predetermined operation system includes a focal length changing system.

9. A power transmission apparatus according to claim 1, wherein said predetermined operation system includes a zoom system.

10. A power transmission apparatus according to claim 1, wherein said predetermined operation system includes a lens barrel system.

11. A power transmission apparatus according to claim 1, wherein said predetermined operation system includes an image recording medium transportation system.

12. A power transmission apparatus according to claim 1, wherein said predetermined operation system includes a camera.

13. A power transmission apparatus, comprising:
    a first rotation portion which is rotatable and transmits a driving power by rotation thereof;
    a second rotation portion which is rotatable and revolves around said first rotation portion in association with rotation of said first rotation portion;
    a plurality of operation systems, each of which is selectively engagable with said second rotation portion by revolution of said second rotation portion around said first rotation portion, so as to receive the driving power from said first rotation portion;
    a restriction device which restricts revolution of said second rotation portion around said first rotation portion;
    a determination device which determines a revolution position of said second rotation portion relative to said first rotation portion; and
    a control device which rotates said first rotation portion so as to cause said second rotation portion to revolve around said first rotation portion to a position where said second rotation portion engages a predetermined operation system of said plurality of operation systems when said first rotation portion finishes a driving operation, and causes said restriction device to inhibit further revolution of said second rotation portion at the position where said second rotation portion engages said predetermined operation system, wherein said control device controls said restriction device so as not to prevent revolution of said second rotation portion at a position where said second rotation portion engages an operation system different from said predetermined operation system of said plurality of operation system in accordance with a determination of said determination device.

14. A power transmission apparatus according to claim 13, further comprising a motor which generates the driving power.

15. A power transmission apparatus according to claim 13, wherein said determination device includes an optical detection device which detects the revolution position of said second rotation portion.

16. A power transmission apparatus according to claim 13, wherein said regulation device includes an electromagnetic driving device.

17. A power transmission apparatus according to claim 13, wherein said restriction device holds said second rotation portion so as to prevent revolution of said second rotation portion around said first rotation portion.

18. A power transmission apparatus according to claim 13, wherein said predetermined operation system includes an optical unit driving system.

19. A power transmission apparatus according to claim 13, wherein said predetermined operation system includes a lens driving system.

20. A power transmission apparatus according to claim 13, wherein said predetermined operation system includes a focal length changing system.

21. A power transmission apparatus according to claim 13, wherein said predetermined operation system includes a zoom system.

22. A power transmission apparatus according to claim 13, wherein said predetermined operation system includes a lens barrel system.

23. A power transmission apparatus according to claim 13, wherein said predetermined operation system includes an image recording medium transporting system.

24. A power transmission apparatus according to claim 13, wherein said predetermined operation system includes a camera.

25. A power transmission apparatus, comprising:
a first rotation portion which is rotatable and transmits a driving power by rotation thereof;
a second rotation portion which is rotatable and revolves around said first rotation portion in association with rotation of said first rotation portion;
at least three operation systems, each of which is selectively engagable with said second rotation portion by revolution of said second rotation portion around said first rotation portion, so as to receive the driving power from said first rotation portion;
a control device which causes said first rotation portion to rotate so as to cause said second rotation portion to revolve around said first rotation portion to a position where said second rotation portion engages a predetermined operation system of the at least three operation systems when said first rotation portion finishes a driving operation; and
a restriction device which inhibits further revolution of said second rotation portion at the position to which said second rotation portion is caused to revolve by said control device so as to engage the predetermined operation system.

26. A power transmission apparatus according to claim 25, further comprising a motor which generates the driving power.

27. A power transmission apparatus according to claim 25, wherein said restriction device includes an electromagnetic driving device.

28. A power transmission apparatus according to claim 25, wherein said restriction device holds said second rotation portion so as to prevent revolution of said second rotation portion around said first rotation portion.

29. A power transmission apparatus according to claim 25, wherein said predetermined operation system includes an optical unit driving system.

30. A power transmission apparatus according to claim 25, wherein said predetermined operation system includes a lens driving system.

31. A power transmission apparatus according to claim 25, wherein said predetermined operation system includes a focal length changing system.

32. A power transmission apparatus according to claim 25, wherein said predetermined operation system includes a zoom system.

33. A power transmission apparatus according to claim 25, wherein said predetermined operation system includes a lens barrel system.

34. A power transmission apparatus according to claim 25, wherein said predetermined operation system includes an image recording medium transporting system.

35. A power transmission apparatus according to claim 25, wherein said predetermined operation system includes a camera.

* * * * *

UNITED STATES PATENT AND TRADEMARK OFFICE
CERTIFICATE OF CORRECTION

PATENT NO. : 6,175,694 B1
DATED : January 16, 2001
INVENTOR(S) : Kazushige Ichino, et al.

It is certified that error appears in the above-identified patent and that said Letters Patent is hereby corrected as shown below:

Column 2,
Line 1, "only" should read -- only makes --.

Column 4,
Line 40, "114d" should read -- 114d, --.

Column 6,
Line 16, "no" should be deleted.

Column 7,
Line 16, "of" (second occurrence) should be deleted.

Column 16,
Line 47, "the-first" should read -- the first --.
Line 67, "transmitted" should read -- transmitted, --.

Column 41,
Line 22, "de scribed" should read -- described --.
Line 42, "s lot" should read -- slot --.

Column 44,
Line 22, "abnormality" should read -- abnormality, --.

Column 45,
Line 17, "abnormality" should read -- abnormality, --.
Line 19, "step" should read -- to step --.

UNITED STATES PATENT AND TRADEMARK OFFICE
CERTIFICATE OF CORRECTION

PATENT NO. : 6,175,694 B1
DATED : January 16, 2001
INVENTOR(S) : Kazushige Ichino, et al.

It is certified that error appears in the above-identified patent and that said Letters Patent is hereby corrected as shown below:

Column 47,
Line 15, "#216" should read -- #216 to --.

Column 56,
Line 20, "devices." should read -- device. --.

Signed and Sealed this

Ninth Day of October, 2001

*Attest:*

*Attesting Officer*

NICHOLAS P. GODICI
*Acting Director of the United States Patent and Trademark Office*